(12) United States Patent　(10) Patent No.: US 7,142,224 B2
Funakubo et al.　(45) Date of Patent: Nov. 28, 2006

(54) POLYGON DRAWING APPARATUS AND METHOD, AND STORAGE MEDIUM FOR IMPLEMENTING THE SAME METHOD

(75) Inventors: Noriyuki Funakubo, Hamamatsu (JP); Yasuhiro Enomoto, Hamamatsu (JP)

(73) Assignee: Yamaha Corporation, Tokyo (JP)

( * ) Notice: Subject to any disclaimer, the term of this patent is extended or adjusted under 35 U.S.C. 154(b) by 693 days.

(21) Appl. No.: 09/932,810

(22) Filed: Aug. 20, 2001

(65) Prior Publication Data

US 2001/0055024 A1　Dec. 27, 2001

Related U.S. Application Data

(63) Continuation of application No. 09/112,151, filed on Jul. 9, 1998, now abandoned.

(30) Foreign Application Priority Data

| Jul. 10, 1997 | (JP) | 9-185581 |
| Jul. 10, 1997 | (JP) | 9-185590 |
| Sep. 16, 1997 | (JP) | 9-250198 |

(51) Int. Cl.
*G09G 5/00* (2006.01)

(52) U.S. Cl. ............... 345/611; 345/441; 345/426; 345/617; 348/597

(58) Field of Classification Search ............... 345/426, 345/441, 589, 617, 611, 612, 613, 614, 615, 345/616; 348/597, 673
See application file for complete search history.

(56) References Cited

U.S. PATENT DOCUMENTS

| 5,253,335 | A |   | 10/1993 | Mochizuki et al. |
| 5,278,949 | A | * | 1/1994  | Thayer ............ 345/426 |
| 5,287,438 | A | * | 2/1994  | Kelleher .......... 345/613 |
| 5,392,385 | A | * | 2/1995  | Evangelisti et al. ... 345/611 |
| 5,418,901 | A |   | 5/1995  | Omori et al. |
| 5,841,439 | A | * | 11/1998 | Pose et al. ........ 345/418 |
| 6,005,580 | A | * | 12/1999 | Donovan ........... 345/428 |

FOREIGN PATENT DOCUMENTS

| JP | 05-143743 |   | 6/1993 |
| JP | 07-105390 | * | 4/1995 |
| JP | 08-235380 |   | 9/1996 |

OTHER PUBLICATIONS

Japanese Office Action of JP 9-185581 dated Mar. 31, 2000, 2 pages, with 2 pages of English translation.
Japanese Office Action of 9-250198 dated Dec. 19, 2001, 2 pages, with 3 pages of English translation.

* cited by examiner

*Primary Examiner*—Kee M. Tung
*Assistant Examiner*—Michelle K. Lay
(74) *Attorney, Agent, or Firm*—Reed Smith LLP; Stanley P. Fisher, Esq.; Juan Carlos A. Marquez, Esq.

(57) ABSTRACT

A polygon drawing apparatus and method draws a polygon by performing intensity processing on a polygon to be drawn so as to smoothly draw each edge portion of the polygon, by performing intensity processing on a polygon to be drawn so as to smoothly draw each edge portion of the polygon. Line intersection data associated with an intersecting portion between each edge of the polygon to be drawn, and each scan line is derived, which includes a first pair of outside intersection and inside intersection that represent intersecting positions between each scan line and one edge located on an upstream side as viewed in a scanning direction, a second pair of outside intersection and inside intersection that represent intersection positions between each scan line and one edge located on a downstream side as viewed in the scanning direction, an increasing rate at which an intensity value increases from the outside intersection to the inside intersection of the first pair, and a decreasing rate at which the intensity value decreases from the inside intersection to the outside intersection of the second pair. The intensity value to be given to each portion of the polygon in the scanning direction with respect to each scan line is sequentially calculated based on the line intersection data obtained for each scan line.

70 Claims, 36 Drawing Sheets

- • :PIXELS WHEN TRIANGLE ABC IS DRAWN
- o :PIXELS WHEN TRIANGLE BCD IS DRAWN

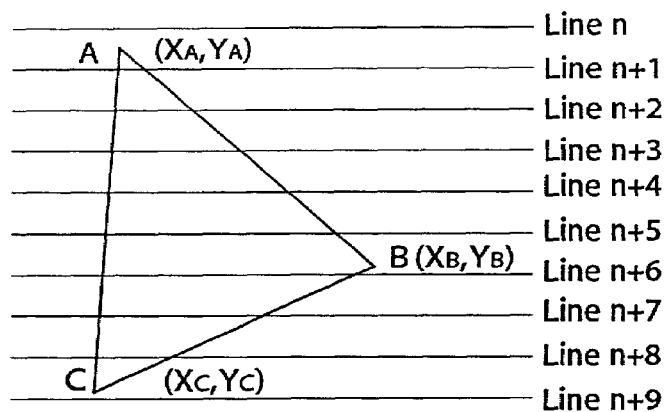

FIG.24A
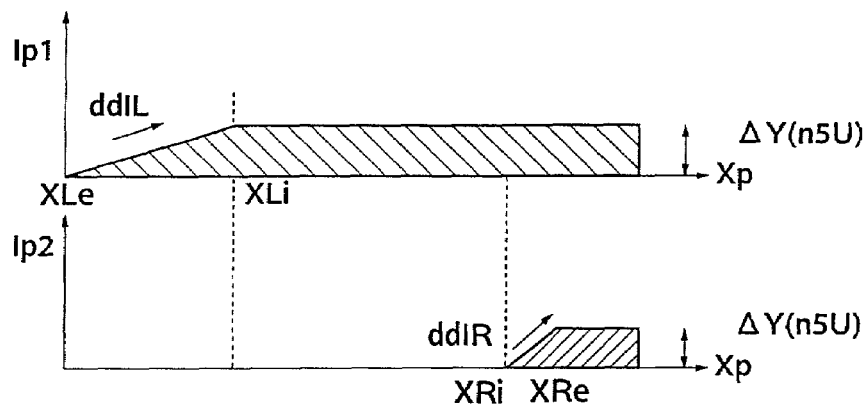
FIG.24B
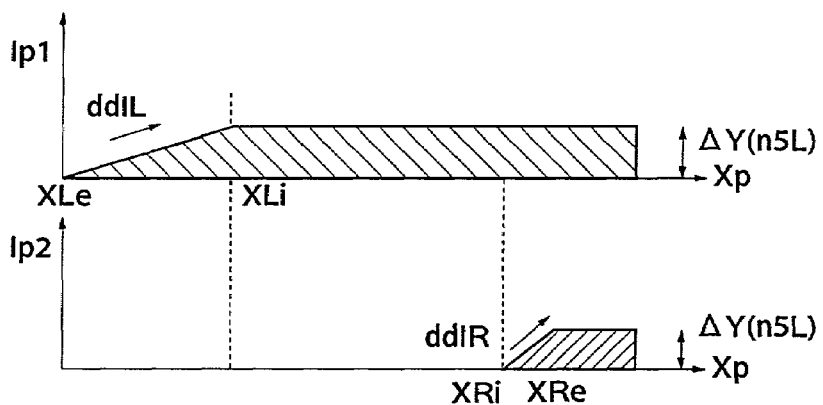
FIG.25
| PATTERN G | PATTERN H | PATTERN I |
|---|---|---|
| n ─╲╱── ↕ΔY <br> n+1 ──── | n ──╲╱── ↕ΔY <br> n+1 ──── | n ──╲╱── ↕ΔY <br> n+1 ──── |

1. Move $[X_1, Y_1, C_1]$
2. Move $[X_2, Y_2, C_2]$
3. Triangle_Fill $[X_3, Y_3, C_3]$
4. Triangle_Fill $[X_4, Y_4, C_4]$
5. Triangle_Fill $[X_5, Y_5, C_5]$ 1. Move $[X_1, Y_1, C_1]$
2. Move $[X_2, Y_2, C_2]$
3. Triangle_Fill $[X_3, Y_3, C_3]$
4. Triangle_Fill $[X_4, Y_4, C_4]$
5. Triangle_Fill $[X_5, Y_5, C_5]$

| +++++++ | EDGE WHICH IS SUBJECTED TO INTENSITY PROCESSING |
| --- | --- |
| ——— | EDGE WHICH IS DRAWN BUT NOT SUBJECTED TO INTENSITY PROCESSING |
| - - - - - | EDGE WHICH IS NOT DRAWN |

┼┼┼┼┼┼  EDGE WHICH IS SUBJECTED TO INTENSITY PROCESSING
───────  EDGE WHICH IS DRAWN BUT NOT SUBJECTED TO INTENSITY PROCESSING
- - - - -  EDGE WHICH IS NOT DRAWN

| OPTION BIT | MOD | AC 2-3 | AC 1-3 | AC 1-2 | EC 2-3 | EC 1-3 | EC 1-2 |
|---|---|---|---|---|---|---|---|
| Tri | 0 | 0 | 1 | 1 | 0 | 0 | 0 |
| Trm | 0 | 0 | 1 | 0 | 0 | 0 | 1 |
| Tre | 0 | 1 | 1 | 0 | 0 | 0 | 1 |

| —+++++++— | EDGE WHICH IS SUBJECTED TO INTENSITY PROCESSING |
| --- | --- |
| ——— | EDGE WHICH IS DRAWN BUT NOT SUBJECTED TO INTENSITY PROCESSING |
| ---------- | EDGE WHICH IS NOT DRAWN |

| OPTION BIT | MOD | AC 2-3 | AC 1-3 | AC 1-2 | EC 2-3 | EC 1-3 | EC 1-2 |
| --- | --- | --- | --- | --- | --- | --- | --- |
| Tri | 0 | 1 | 0 | 1 | 0 | 0 | 0 |
| Trm | 1 | 1 | 0 | 0 | 0 | 0 | 1 |
| Tre | 1 | 1 | 1 | 0 | 0 | 0 | 1 |

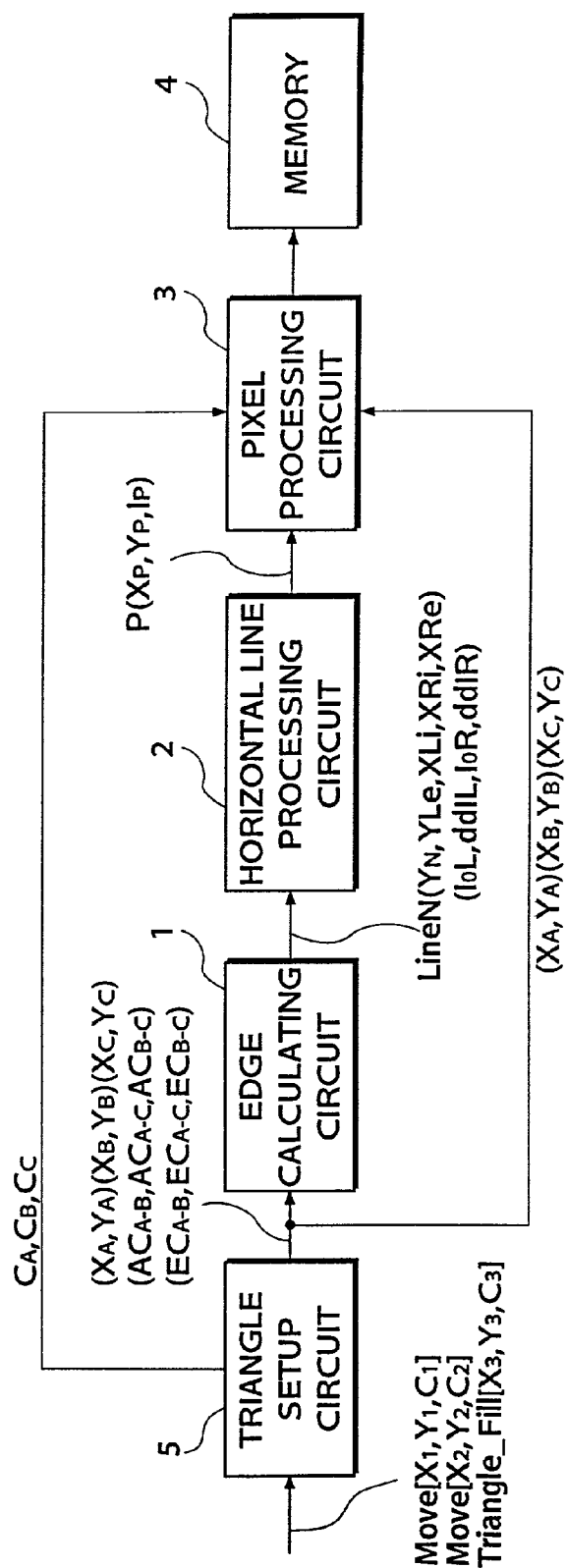

FIG.40

| $Y_1-Y_2$ | $Y_2-Y_3$ | $Y_1-Y_3$ | MULTIPLEXER CONTROL | FORM OF TRIANGLE |
|---|---|---|---|---|
| = | = | = | SORT1 | •—•—• |
| = | = | < | — | |
| = | = | > | — | |
| = | < | = | — | |
| = | < | < | SORT1 | $P_1$◣$P_2$ / $P_3$  ;  $P_2$◢$P_1$ / $P_3$ |
| = | < | > | — | |
| = | > | = | — | |
| = | > | < | — | |
| = | > | > | SORT5 | $P_1$ /$P_3$\ $P_2$  ;  $P_2$ /$P_3$\ $P_1$ |
| < | = | = | — | |
| < | = | < | SORT1 | $P_2$ /$P_1$\ $P_3$  ;  $P_3$ /$P_1$\ $P_2$ |
| < | = | > | — | |
| < | < | = | — | |
| < | < | < | SORT1 | $P_2$ /$P_1$\ $P_3$  ;  $P_3$ /$P_1$\ $P_2$ |
| < | < | > | — | |
| < | > | = | SORT2 | $P_1$◣$P_3$ / $P_2$  ;  $P_3$◢$P_1$ / $P_2$ |
| < | > | < | SORT2 | $P_3$ /$P_1$\ $P_2$  ;  $P_2$ /$P_1$\ $P_3$ |
| < | > | > | SORT5 | $P_1$ /$P_3$\ $P_2$  ;  $P_3$ /$P_2$\ $P_1$ |
| > | = | = | — | |
| > | = | < | — | |
| > | = | > | SORT4 | $P_2$◣$P_3$ / $P_1$  ;  $P_3$◢$P_2$ / $P_1$ |
| > | < | = | SORT3 | $P_1$ /$P_2$\ $P_3$  ;  $P_3$ /$P_2$\ $P_1$ |
| > | < | < | SORT3 | $P_1$ /$P_2$\ $P_3$  ;  $P_3$ /$P_2$\ $P_1$ |
| > | < | > | SORT4 | $P_3$ /$P_2$\ $P_1$  ;  $P_1$ /$P_2$\ $P_3$ |
| > | > | = | — | |
| > | > | < | — | |
| > | > | > | SORT6 | $P_2$ /$P_3$\ $P_1$  ;  $P_1$ /$P_3$\ $P_2$ |

FIG.41

|  | MULTIPLEXER CONTROL | | | | | |
|---|---|---|---|---|---|---|
| SORT1 | A=$P_1$ | B=$P_2$ | C=$P_3$ | A-B=1-2 | A-C=1-3 | B-C=2-3 |
| SORT2 | A=$P_1$ | B=$P_3$ | C=$P_2$ | A-B=1-3 | A-C=1-2 | B-C=2-3 |
| SORT3 | A=$P_2$ | B=$P_1$ | C=$P_3$ | A-B=1-2 | A-C=2-3 | B-C=1-3 |
| SORT4 | A=$P_2$ | B=$P_3$ | C=$P_1$ | A-B=2-3 | A-C=1-2 | B-C=1-3 |
| SORT5 | A=$P_3$ | B=$P_1$ | C=$P_2$ | A-B=1-3 | A-C=2-3 | B-C=1-2 |
| SORT6 | A=$P_3$ | B=$P_2$ | C=$P_1$ | A-B=2-3 | A-C=1-3 | B-C=1-2 |

POLYGON DRAWING APPARATUS AND METHOD, AND STORAGE MEDIUM FOR IMPLEMENTING THE SAME METHOD

This application is a continuation of U.S. application Ser. No. 09/112,151 filed on Jul. 9, 1998 now abandoned.

BACKGROUND OF THE INVENTION

1. Field of the Invention

The present invention relates to a polygon drawing apparatus and method of drawing a polygon by combining a plurality of triangles, which apparatus and method may be used in an image display system, or the like, for drawing graphics on a memory and displaying the graphics on a monitor.

2. Prior Art

In a conventional method of drawing graphics on a memory, an ideal straight line is expressed by points (displayed grid boxes) on a displayed grid in which vertical and horizontal lines are arranged at equal intervals, and therefore results in a rough, uneven line called jaggy, as shown in FIG. 1. To reduce the jaggedness or roughness, an anti-aliasing method has been proposed, which will be described with reference to FIGS. 2A and 2B.

In this method, where one pixel is considered as one square or displayed grid box in the grid, and a straight line extends over a plurality of pixels, the intensity value of each pixel is determined depending upon the area of the pixel which is covered by the straight line, as shown in FIG. 2A. FIG. 2B shows an example in which the intensity of each pixel is determined on this basis. In this example, a single straight line can be smoothly drawn by expressing the straight line by differences in the intensity.

In the known anti-aliasing method, however, the area of each pixel which is covered by the ideal straight line must be calculated in a complicated manner. Further, in a known method of drawing a triangle, special processing must be performed only on each edge portion of the triangle, which results in reduction in the speed of drawing a triangle.

Also, when three-dimensional graphics or the like are drawn on a memory, a graphical pattern (polygon) is drawn by combining triangles which are the most primitive or fundamental elements. When drawing a quadrangle ABCD as shown in FIG. 3, a triangle ABC and a triangle BCD are separately drawn. In this case, an edge BC common to the two triangles ABC, BCD is drawn twice.

In this type of polygon drawing processing, logical operations (Exclusive OR and so on) and mixing processing are often performed as processing for drawing pixels. In this case, since a portion of the graphical pattern corresponding to the edge BC is processed twice, the intensity values of pixels in the other portions become largely different from those of the pixels on the edge BC, whereby a band or stripe may appear at the portion corresponding to the edge BC.

SUMMARY OF THE INVENTION

It is therefore a first object of the invention to provide a polygon drawing apparatus and method which is capable of sequentially producing pixel data along each scan line as in normal graphic processing, while using an anti-aliasing method for smoothly drawing edges, so that a desired graphical pattern can be drawn at a high speed, and to provide a storage medium which stores a program which enables implementation of this polygon drawing method.

It is a second object to provide a polygon drawing apparatus and method which is capable of drawing a polygon by combining a plurality of triangles, such that edges that are common to two adjacent ones of the triangles can be naturally drawn, and to provide a storage medium which stores a program which enables the polygon drawing method to be implemented.

To attain the first object, according to a first aspect of the present invention, there is provided a polygon drawing apparatus which draws a polygon by performing intensity processing on a polygon to be drawn so as to smoothly draw each edge portion of the polygon, comprising an edge calculating device which derives line intersection data associated with an intersecting portion between each of edges of the polygon to be drawn, and each scan line, the line intersection data including a first pair of outside intersection and inside intersection that represent intersecting positions between the each scan line and one of the edges that is located on an upstream side as viewed in a scanning direction, a second pair of outside intersection and inside intersection that represent intersection positions between the each scan line and one of the edges that is located on a downstream side as viewed in the scanning direction, an increasing rate at which an intensity value increases from the outside intersection to the inside intersection of the first pair, and a decreasing rate at which the intensity value decreases from the inside intersection to the outside intersection of the second pair, and a scan line processing device which sequentially calculates the intensity value to be given to each portion of the polygon in the scanning direction with respect to the each scan line, based on the line intersection data obtained for the each scan line by the edge calculating device.

According to the first aspect of the present invention, line intersection data associated with an intersecting portion between each of edges of the polygon to be drawn and each scan line are obtained by edge calculation, which data include a first pair of outside intersection and inside intersection that represent intersecting positions between each scan line and one of the edges that is located on an upstream side as viewed in a scanning direction, a second pair of outside intersection and inside intersection that represent intersection positions between each scan line and one of the edges that is located on a downstream side as viewed in the scanning direction, an increasing rate at which an intensity value increases from the outside intersection to the inside intersection of the first pair, and a decreasing rate at which the intensity value decreases from the inside intersection to the outside intersection of the second pair. Therefore, the intensity value of each pixel along each scan line can be sequentially obtained by progressively increasing the intensity value at the increasing rate, from the outer intersection to the intersection of the first pair, and progressively decreasing the intensity value at the decreasing rate from the inside intersection to the outside section of the second pair, thus permitting sequential processing along each scan line. Thus, high-speed drawing processing can be realized.

Preferably, the edge calculating device comprises means for calculating a first pair of positions on lattice points of displayed grid boxes that are located adjacent, respectively, to a pair of real intersections between the each scan line and the one of the edges that is located on the upstream side as viewed in the scanning direction, on the downstream side as viewed in the scanning direction, to obtain the first pair of outside intersection and inside intersection, means for calculating a second pair of positions on lattice points of the displayed grid boxes that are located adjacent, respectively, to a pair of real intersections between the each scan line and the one of the edges that is located on the downstream side as viewed in the scanning direction, on the upstream side as viewed in the scanning direction, to obtain the second pair of outside intersection and inside intersection, and means for calculating a first initial value from the intensity value at the outside intersection of the first pair, and a second initial value from the intensity value at a lattice point of one of the displayed grid boxes that is located adjacent to the inside intersection of the second pair on the downstream side as viewed in the scanning direction.

With the above arrangement, all of the edge calculations are accomplished by calculating intensity values of lattice points on the grid, thus enabling high-speed processing.

The first pair of outside intersection and inside intersection and the second pair of outside intersection and inside intersection may be calculated based on trajectories obtained by dragging a diamond-like block between vertices of the polygon to be drawn, which diamond-like block has vertical and horizontal dimensions each corresponding to an interval of a displayed grid.

Preferably, the scan line processing device may generate each intensity value by progressively increasing the intensity value at the increasing rate, so as to provide intensity values in a range from the outside intersection to the inside intersection of the first pair for each scan line, and generate a constant intensity value in a range from the inside intersection of the first pair to the inside intersection of the second pair. The scan processing device may also generate each intensity value, by progressively decreasing the intensity value at the decreasing rate, so as to provide intensity values in a range from the inside intersection to the outside intersection of the second pair for each scan line. In this manner, the intensity values on each scan line can be calculated only by adding and subtracting operations, thus enabling high-speed drawing processing.

It is advantageous that the increasing rate is determined based on a slope of the edge on the upstream side as viewed in the scanning direction, and the decreasing rate is determined based on a slope of the edge on the downstream side as viewed in the scanning direction.

To attain the first object, according to the first aspect of the invention, there is also provided a polygon drawing method of drawing a polygon by performing intensity processing on a polygon to be drawn so as to smoothly draw each edge portion of the polygon, comprising an edge calculating step of deriving line intersection data associated with an intersecting portion between each of edges of the polygon to be drawn, and each scan line, the line intersection data including a first pair of outside intersection and inside intersection that represent intersecting positions between the each scan line and one of the edges that is located on an upstream side as viewed in a scanning direction, a second pair of outside intersection and inside intersection that represent intersection positions between the each scan line and one of the edges that is located on a downstream side as viewed in the scanning direction, an increasing rate at which an intensity value increases from the outside intersection to the inside intersection of the first pair, and a decreasing rate at which the intensity value decreases from the inside intersection to the outside intersection of the second pair, and a scan line processing step of sequentially calculating the intensity value to be given to each portion of the polygon in the scanning direction with respect to the each scan line, based on the line intersection data for the each scan line obtained by the edge calculating step.

To attain the first object, according to the first aspect of the invention, there is also provided a storage medium which stores a program that enables implementation of the above-indicated polygon drawing method.

To attain the first object, according to a second aspect of the invention, there is provided a polygon drawing apparatus which draws a polygon by performing intensity processing on a polygon to be drawn so as to smoothly draw each edge portion of the polygon, comprising an edge calculating device which derives line intersection data associated with an intersecting portion between each of edges of the polygon to be drawn, and each scan line, the line intersection data including a first pair of outside intersection and inside intersection that represent intersecting positions between the each scan line and one of the edges that is located on an upstream side as viewed in a scanning direction, a second pair of outside intersection and inside intersection that represent intersection positions between the each scan line and one of the edges that is located on a downstream side as viewed in the scanning direction, an increasing rate at which an intensity value increases from the outside intersection to the inside intersection of the first pair, and a decreasing rate at which the intensity value decreases from the inside intersection to the outside intersection of the second pair, and a scan line processing device which sequentially calculates the intensity value to be given to each portion of the polygon in the scanning direction with respect to the each scan line, based on the line intersection data for the each scan line obtained by the edge calculating device, by performing first processing for calculating changes in the intensity value from the inside intersection to the outside intersection of the first pair for each scan line, second processing for calculating changes in the intensity value from the inside intersection to the outside intersection of the second pair for each scan line, and third processing for combining results obtained in the first processing and the second processing, the first processing, the second processing and the third processing being performed in parallel with each other.

According to the second aspect of the invention, line intersection data associated with an intersecting portion between each of edges of the polygon to be drawn and each scan line are obtained by edge calculation, which data include a first pair of outside intersection and inside intersection that represent intersecting positions between each scan line and one of the edges that is located on an upstream side as viewed in a scanning direction, a second pair of outside intersection and inside intersection that represent intersection positions between each scan line and one of the edges that is located on a downstream side as viewed in the scanning direction, an increasing rate at which an intensity value increases from the outside intersection to the inside intersection of the first pair, and a decreasing rate at which the intensity value decreases from the inside intersection to the outside intersection of the second pair. Further, the intensity value to be given to each portion of the polygon in the scanning direction with respect to the each scan line is sequentially calculated, based on the line intersection data for the each scan line obtained by the edge calculating device, by performing first processing for calculating changes in the intensity value from the outside intersection to the inside intersection of the first pair for each scan line, second processing for calculating changes in the intensity value from the inside intersection to the outside intersection of the second pair for each scan line, and third processing for combining results obtained in the first processing and the second processing, the first processing, the second processing and the third processing being performed in parallel with each other. As a result, it is possible to perform sequential processing along each scan line and hence realize high-speed drawing processing . In this case, particularly, even if a vertex at the upper or lower ends of the polygon, or a vertex in the middle of the polygon does not exist on one of scan lines, the intensity value can be easily calculated by the same processing method, thus enabling high-speed drawing processing.

Preferably, the edge calculating device comprises means for calculating a first pair of positions on lattice points of displayed grid boxes that are located adjacent, respectively, to a pair of real intersections between the each scan line and the one of the edges that is located on the upstream side as viewed in the scanning direction, on the downstream side as viewed in the scanning direction, to obtain the first pair of outside intersection and inside intersection, means for calculating a second pair of positions on lattice points of the displayed grid boxes that are located adjacent, respectively, to a pair of real intersections between the each scan line and the one of the edges that is located on the downstream side as viewed in the scanning direction, on the upstream side as viewed in the scanning direction, to obtain the second pair of outside intersection and inside intersection, and means for calculating a first initial value from the intensity value at the outside intersection of the first pair, and a second initial value from the intensity value at a lattice point of one of the displayed grid boxes that is located adjacent to the inside intersection of the second pair on the downstream side as viewed in the scanning direction.

With this arrangement, the intensity value on each scan line can be calculated only by addition and subtraction, permitting a high-speed drawing processing.

When a vertex of the polygon is located between two adjacent scan lines, the scan processing device may set the constant intensity value to a value that depends upon a distance from one of the two adjacent scan lines to the vertex.

Further, when a vertex other than vertices at upper and lower ends of the polygon is located between two adjacent scan lines, the scan processing device may separately perform processing based on a first distance from the upper one of the two adjacent scan lines to said vertex, and performs processing based on a second distance from the lower one of the two adjacent scan lines to said vertex, and calculates the intensity value by combining results of the processing based on the first distance and the processing based on the second distance. This can simplify the processing, enabling the intensity value to be calculated through simple calculations.

To attain the first object, according to the second aspect of the invention, there is also provided a polygon drawing method of drawing a polygon by performing intensity processing on a polygon to be drawn so as to smoothly draw each edge portion of the polygon, comprising an edge calculating step of deriving line intersection data associated with an intersecting portion between each of edges of the polygon to be drawn, and each scan line, the line intersection data including a first pair of outside intersection and inside intersection that represent intersecting positions between the each scan line and one of the edges that is located on an upstream side as viewed in a scanning direction, a second pair of outside intersection and inside intersection that represent intersection positions between the each scan line and one of the edges that is located on a downstream side as viewed in the scanning direction, an increasing rate at which an intensity value increases from the outside intersection to the inside intersection of the first pair, and a decreasing rate at which the intensity value decreases from the inside intersection to the outside intersection of the second pair, and a scan line processing step of sequentially calculating the intensity value to be given to each portion of the polygon in the scanning direction with respect to the each scan line, based on the line intersection data for the each scan line obtained by the edge calculating step, by performing first processing for calculating changes in the intensity value from the inside intersection to the outside intersection of the first pair for each scan line, second processing for calculating changes in the intensity value from the outside intersection to the inside intersection of the second pair for each scan line, and third processing for combining results obtained in the first processing and the second processing, the first processing, the second processing and the third processing being performed in parallel with each other.

To attain the first object, according to the second aspect of the invention, there is also provided a storage medium which stores a program that enables implementation of the above-indicated polygon drawing method of the second aspect.

To attain the second object, according to a third aspect of the invention, there is provided a polygon drawing apparatus which draws a polygon by performing intensity processing on a plurality of triangles to be drawn so as to smoothly draw edge portions of the triangles, and combining the triangles, comprising an edge calculating device which receives a drawing command including a control bit which indicates whether each edge of each of the triangles is to be drawn, and derives line intersection data relating to a position of an intersecting portion between the each edge of each of the triangles and each scan line, and an intensity value of the intersecting portion, based on the control bit, and a scan line processing device which sequentially calculates the intensity value to be given to each portion of each of the triangles in a scanning direction with respect to the each scan line, based on the line intersection data obtained for the each scan line by the edge calculating device.

Further, according to the third aspect, there are provided a polygon drawing method of drawing a plurality of triangles so as to draw a polygon by combining the plurality of triangles, comprising the steps of inputting a drawing command including a control bit which indicates whether each edge of each of the triangles is to be drawn, and drawing an interior of each of the triangles with a predetermined intensity based on the drawing command, while determining an intensity value of the each edge of each of the triangles by referring to the control bit when drawing the each edge of each of the triangles, and a storage medium that stores a program that enables implementation of this polygon drawing method.

In the polygon drawing apparatus and method and storage medium according to the third aspect, a drawing command including a control bit which indicates whether each edge of each of the triangles is to be drawn is entered, so that intensity values of the edge is determined based on this drawing command, during drawing processing of the triangle. If the drawing command for the edge that may be drawn twice contains a control bit that instructs that the edge should not be drawn, therefore, this edge portion is not drawn twice. Thus, even if the intensity values of the pixels at an adjoining edge portion are determined according to logic operation or mixing processing, the intensity value of this portion is not so different from those of the other portions, thus realizing the processing for naturally and smoothly drawing a polygon.

To attain the second object, according to another or second form of the third aspect, there is also provided a polygon drawing apparatus which draws a polygon by performing intensity processing on a plurality of triangles to be drawn so as to smoothly draw edge portions of the triangles, and combining the triangles, comprising an edge calculating device which receives a drawing command including a control bit which indicates whether intensity processing is to be performed on each edge of each of the triangles, and derives line intersection data associated with an intersecting portion between each edge of each of the triangles to be drawn and each scan line, the line intersection data including a first pair of outside intersection and inside intersection that represent intersecting positions between the each scan line and one of the edges that is located on an upstream side as viewed in a scanning direction, a second pair of outside intersection and inside intersection that represent intersection positions between the each scan line and one of the edges that is located on a downstream side as viewed in the scanning direction, an increasing rate at which an intensity value increases from the outside intersection to the inside intersection of the first pair, a decreasing rate at which the intensity value decreases from the inside intersection to the outside intersection of the second pair, and an intensity value that is set to 1 when the control bit indicates that no intensity processing is to be performed on the each edge of each of the triangles, and a scan line processing device which sequentially calculates the intensity value to be given to each portion of the each of the triangles in the scanning direction with respect to each scan line, based on the line intersection data obtained for the each scan line by the edge calculating device.

According to the second form of the third aspect, there are also provided a polygon drawing method of drawing a polygon by performing intensity processing on a plurality of triangles to be drawn so as to smoothly draw edge portions of the triangles, and combining the triangles, comprising the steps of inputting a drawing command including a control bit which indicates whether intensity processing is to be performed on each edge of each of the triangles, and drawing an interior of each of the triangles with a predetermined intensity based on the drawing command, while determining an intensity value of the each edge of each of the triangles by referring to the control bit when drawing the each edge of each of the triangles, and a storage medium that stores a program that enables implementation of this polygon drawing method.

In the polygon drawing apparatus and method and storage medium of the second form, the drawing command includes a control bit which instructs that intensity processing should not be performed on an edge that is common to adjoining triangles. As a result, even when intensity processing is performed on edge portions of a polygon, using an anti-aliasing method (which will be described later) for smoothly drawing the edge portions, the intensity processing is not performed on such an edge, so as to enable drawing processing in which the adjoining triangles can be smoothly connected to each other, while permitting only edges that provide outline portions of the polygon to be processed in terms of the intensity.

To attain the second object, according to a third form of the third aspect of the invention, there is also provided a polygon drawing apparatus which draws a polygon by performing intensity processing on a plurality of triangles to be drawn so as to smoothly draw edge portions of the triangles, and combining the triangles, comprising an edge calculating device which receives a drawing command including a first control bit which indicates whether each edge of each of the triangles is to be drawn, and a second control bit which indicates whether intensity processing is to be performed on each edge of each of the triangles, and derives line intersection data associated with an intersecting portion between each edge of the each of the triangles to be drawn and each scan line, the line intersection data including a first pair of outside intersection and inside intersection that represent intersecting positions between the each scan line and one of the edges that is located on an upstream side as viewed in a scanning direction, a second pair of outside intersection and inside intersection that represent intersection positions between the each scan line and one of the edges that is located on a downstream side as viewed in the scanning direction, an increasing rate at which an intensity value increases from the outside intersection to the inside intersection of the first pair, a decreasing rate at which the intensity value decreases from the inside intersection to the outside intersection of the second pair, and an intensity value that is set to 0 when the first control bit indicates that the each edge of each of the triangles is not to be drawn, the intensity value being set to 1 when the second control bit indicates that the intensity processing is not to be performed on the each edge of each of the triangles, and a scan line processing device that sequentially calculates the intensity value to be given to each portion of the each of the triangles in the scanning direction with respect to each scan line, based on the line intersection data obtained for the each scan line by the edge calculating device.

Further, according to the third form, there are also provided a polygon drawing method of drawing a polygon by performing intensity processing on a plurality of triangles to be drawn so as to smoothly draw edge portions of the triangles, and combining the triangles, comprising the steps of inputting a drawing command including a first control bit which indicates whether each edge of each of the triangles is to be drawn, and a second control bit which indicates whether intensity processing is to be performed on each edge of each of the triangles, and drawing an interior of each of the triangles with a predetermined intensity based on the drawing command, while determining an intensity value of the each edge of each of the triangles by referring to the first and second control bits when drawing the each edge of each of the triangles, and a storage medium that stores a program that enables implementation of this polygon drawing method.

The intensity value may be determined by a mixture ratio of an intensity value of a pixel that is to be drawn, to an intensity value of a pixel that is originally located at a position where the pixel to be drawn exists, and when the control bit indicates that the each edge of each of the triangles is not to be drawn, the intensity value of the pixel to be drawn is set to 0, and further, when the control bit indicates that the intensity processing is not to be performed on the each edge of each of the triangles, the intensity value of the pixel to be drawn is set to 1.

In the above-indicated polygon drawing apparatus and method and storage medium according to the third form, the edge calculating device receives a drawing command including a first control bit which indicates whether each edge of each of the triangles is to be drawn or not, so that the intensity value of each edge portion can be determined according to the drawing command. Where the intensity value is determined by the ratio of the intensity value of a pixel that is to be drawn to the intensity value of a pixel that is originally located at a position where the pixel to be drawn exists, an edge that is shared by adjoining triangles is processed according to a command to inhibit intensity processing on the edge of one of these triangles (for example, the intensity value is set to 1), and a command to inhibit drawing of the edge of the other triangle (for example, the intensity value is set to 0). This enables boundary portions of adjoining triangles to be smoothly drawn, and intensity processing can be performed on outline portions of the polygon.

Where intensity processing is performed on edge portions of triangles which constitute a polygon to be drawn a drawing plane, In a preferred form, the polygon drawing method further comprises an edge calculating step of deriving line intersection data associated with an intersecting portion between each edge of each of the triangles to be drawn and each scan line, the line intersection data including a first pair of outside intersection and inside intersection that represent intersecting positions between the each scan line and one of the edges that is located on an upstream side as viewed in a scanning direction, a second pair of outside intersection and inside intersection that represent intersection positions between the each scan line and one of the edges that is located on a downstream side as viewed in the scanning direction, an increasing rate at which an intensity value increases from the outside intersection to the inside intersection of the first pair, and a decreasing rate at which the intensity value decreases from the inside intersection to the outside intersection of the second pair, and a scan line processing step of sequentially calculating the intensity value to be given to each portion of the each of the triangles in the scanning direction with respect to each scan line, based on the line intersection data obtained for the each scan line by the edge calculating step.

With this arrangement, since the first pair of outside intersection and inside intersection corresponding to the upstream-side edge as viewed in the scanning direction, the second pair of outside intersection and inside intersection corresponding to the downstream-side edge, an increasing rate at which an intensity value increases from the outside intersection to the inside intersection of the first pair, and a decreasing rate at which the intensity value decreases from the inside intersection to the outside intersection of the second pair are calculated with respect to each scan line, and therefore the intensity value can be sequentially calculated from the upstream side to the downstream side of the scan line, by progressively increasing the intensity value at the above increasing rate, from the outside intersection to the inside intersection of the first pair, and progressively decreasing the intensity value at the above decreasing rate, from the inside intersection to the outside intersection of the second pair, thus enabling sequential processing along each scan line. Thus, high-speed drawing processing can be realized.

The above and other objects, features, and advantages of the invention will become more apparent from the following detailed description taken in conjunction with the accompanying drawings.

BRIEF DESCRIPTION OF THE DRAWINGS

FIG. 16 is a view showing a polygon which is processed according to a second embodiment of the present invention;

FIG. 17 is a view showing patterns of vertex portions of the polygon between scan lines;

FIG. 24A is a view useful in explaining the operation of the horizontal line processing circuit in the case of FIG. 23;

FIG. 24B is a view useful in explaining the operation of the horizontal line processing circuit in the case of FIG. 23;

FIG. 25 is a view useful in explaining the processing of lower end portions of polygons;

FIG. 35 is a block diagram showing the construction of a polygon drawing apparatus according to the third embodiment;

FIG. 40 is a view showing the content of a sort table used in the sort circuit of FIG. 39;

FIG. 41 is a view useful in explaining multiplexer control performed in the setup circuit of FIG. 38;

DETAILED DESCRIPTION OF THE PREFERRED EMBODIMENTS

The invention will be described in detail with reference to the drawings showing preferred embodiments thereof.

Figure 4:
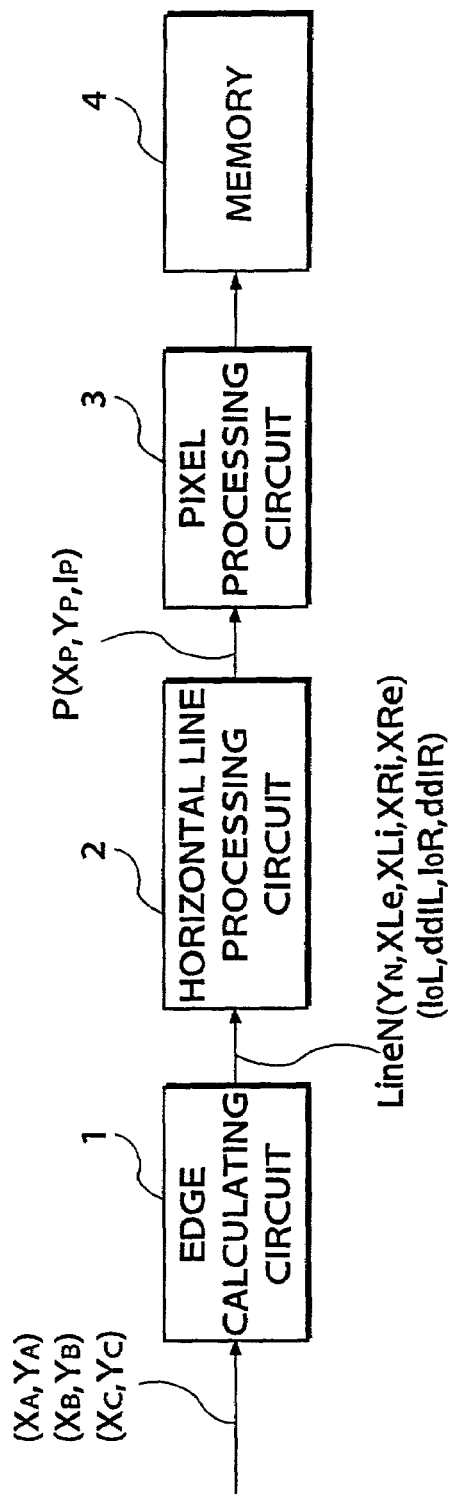
FIG. 4 is a block diagram showing the construction of a polygon drawing apparatus according to a first embodiment of the present invention.

FIG. 4 shows the construction of a triangle drawing apparatus according to the first embodiment of the invention. This apparatus is comprised of an edge calculating circuit 1, a horizontal line processing circuit 2, a pixel processing circuit 3, and a memory 4.

The edge calculating circuit 1 calculates line intersection data associated with intersecting portions between a given triangle and each scan line, based on vertex coordinates (XA, YA), (XB, YB) and (XC, YC) of the triangle. In this embodiment, the line intersection data obtained with respect to a scan line N is information on coordinates values (YN, XLe, XLi, XRi, XRe) and intensity values I (I0R, ddIL, I0R, ddIR). The horizontal line processing circuit 2 produces coordinate values ($X_P$, $Y_P$) of each of pixels present on each scan line, for example, from the left to the right, and an intensity value IP which corresponds to that pixel, and supplies these values to the pixel processing circuit 3. The pixel processing circuit 3 produces pixel data (drawing data) corresponding to the intensity value IP, with respect to the coordinate values ($X_P$, $Y_P$) of each pixel obtained by the horizontal line processing circuit 2, and write the pixel data into the memory 4. In the present embodiment, the pixel intensity value IP ranges from 0 to 1. While the thus obtained value (IP) may be used as it is as intensity value I, this value (IP) may be used as an intensity correction coefficient for correcting a separately calculated intensity value.

Figure 5:
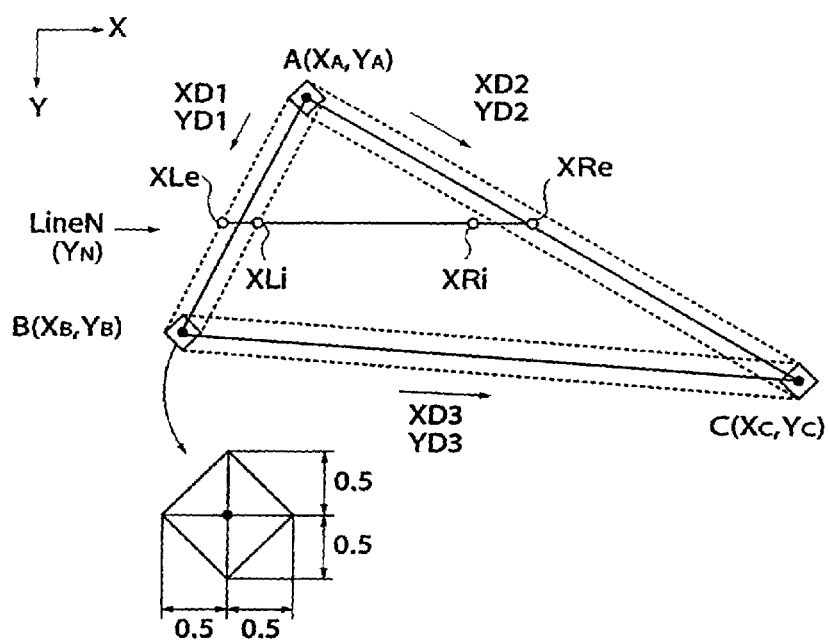
FIG. 5 is a view useful in explaining the content of processing performed by an edge calculating circuit of the apparatus of FIG. 4.

FIG. 5 shows coordinate values obtained by the edge calculating circuit 1. In the example of FIG. 5, the Knuth-Bendix algorithm is employed so that three edges of a triangle having vertices A, B, C are formed by trajectories or tracks of a diamond-like box as indicated by broken lines in FIG. 5 when this box is dragged between the vertices A and B, B and C, and C and A. The diamond-like box has a grid width of ±0.5 in the horizontal (X) and vertical (Y) directions, which grid width is set to be equal to one pixel. For each horizontal line (scan line), four intersections between left and right edges of the triangle and the scan line are obtained which consist of outside and inside intersections for each of the left and right edges. These intersections are not real intersections between the triangle and the scan line, but points (lattice points) on displayed grid boxes located immediately inside the real intersections are selected as the above-indicated four intersections. Thus, the line intersection data for each scan line include coordinate values as follows:

YN: Y coordinate of line N

Figure 6:
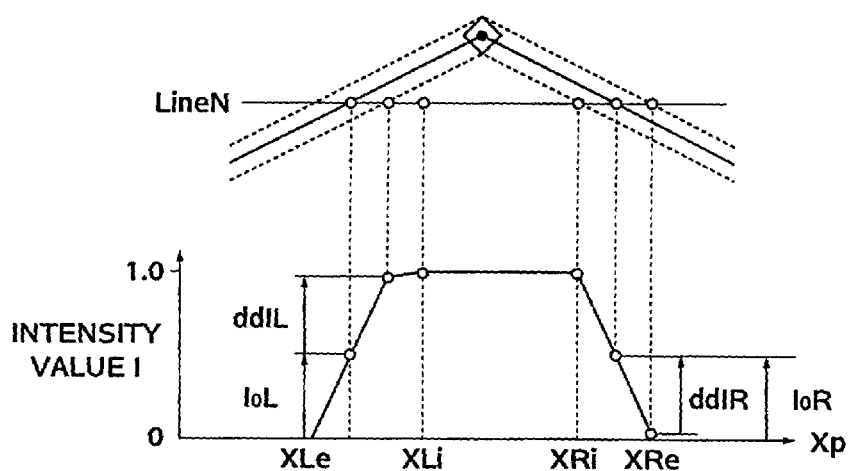
FIG. 6 is a view useful in explaining the operation of a horizontal line processing circuit of the apparatus of FIG. 4.

XLe: X coordinate of line N at a lattice point located outside the left-side edge XLi: X coordinate of line N at a lattice point located inside the left-side edge XRi: X coordinate of line N at a lattice point located outside the right-side edge XRe: X coordinate of line N at a lattice point located inside the right-side edge Based on the respective coordinate values obtained in this manner, the intensity value I of the interior of the triangle is determined such that the intensity value I gradually increases from XLe to XLi, and the intensity value I gradually decreases from XRi to XRe, as shown in FIG. 6. To this end, the initial value I0L of the intensity at XLe and its increasing rate ddIL, and the initial value I0R of the intensity at a pixel next to XRi as viewed in the X direction and its decreasing rate ddIR are obtained in manners as described later.

Figure 7A:
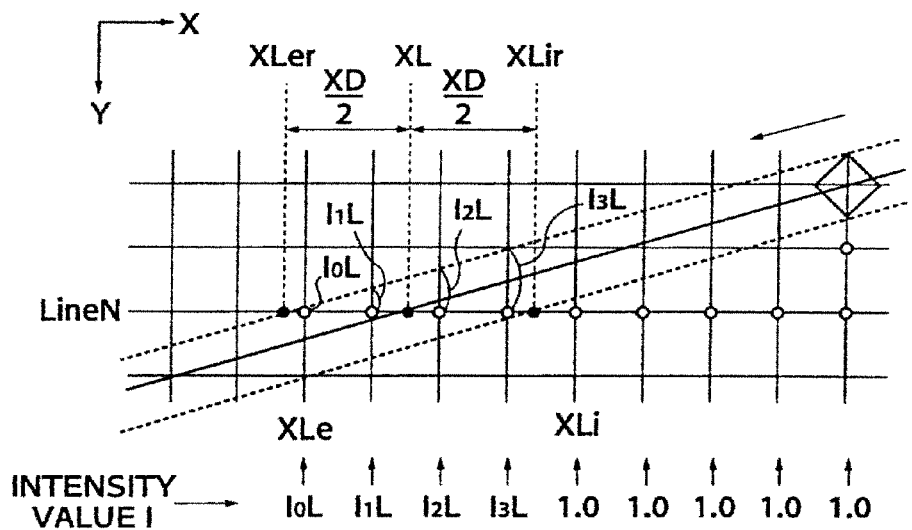
FIG. 7A is a view useful in explaining a method employed by the edge calculating circuit, for calculating various data for a left-side edge.
Figure 7B:
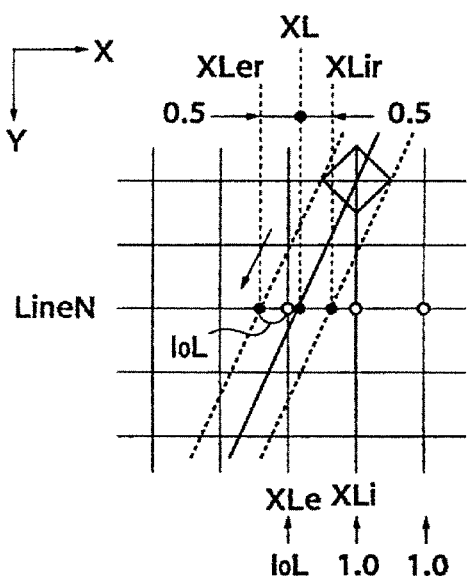
FIG. 7B is a view useful in explaining another method employed by the edge calculating circuit, for calculating various data for a left-side edge.
Figure 8A:
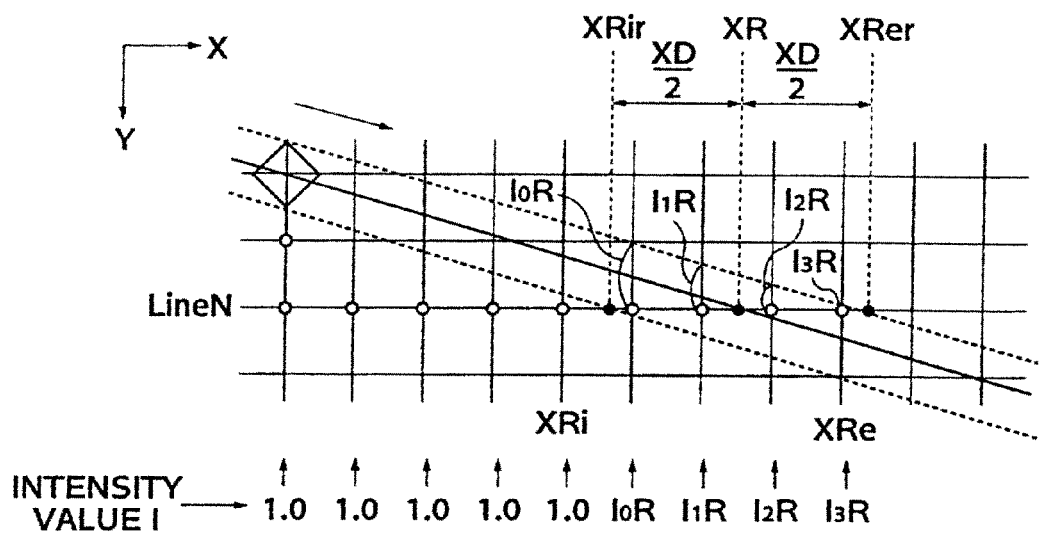
FIG. 8A is a view useful in explaining a method employed by the edge calculating circuit, for calculating various data for a right-side edge.
Figure 8B:
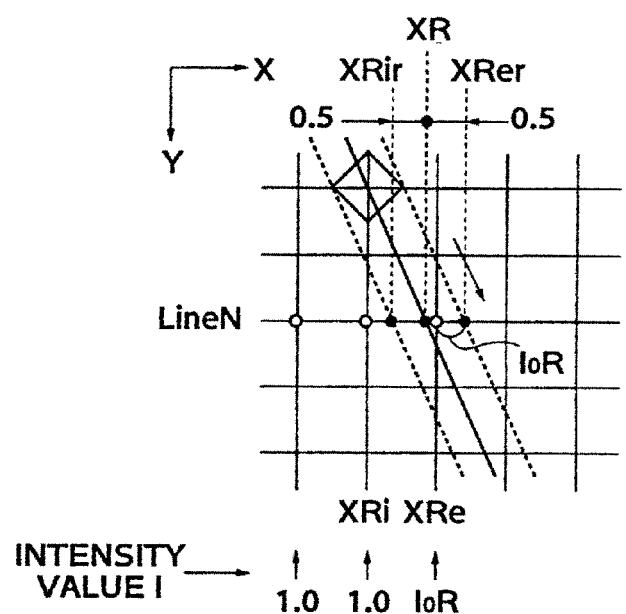
FIG. 8B is a view useful in explaining a method employed by the edge calculating circuit, for calculating various data for a right-side edge.

Referring to FIGS. 7A, 7B and FIGS. 8A, 8B, there will be explained a method of obtaining each of these coordinate values and intensity values. FIGS. 7A and 7B show methods of obtaining the coordinate and intensity values for left-side edges, and FIGS. 8A and 8B show methods of obtaining the coordinate and intensity values for right-side edges. In these figures, "XD" represents X-direction distance relative to a Y-direction distance between vertices at opposite ends of an edge (an amount of shift of the X coordinate when the Y coordinate moves by a distance between two adjacent scan lines), and "YD" represents Y-direction distance relative to a given X-direction distance (an amount of shift of Y coordinate when the X coordinate moves by a distance corresponding to one pixel). For each of the left-side and right-side edges, somewhat different methods are employed for obtaining the coordinate values and intensity values, depending upon the case (a) where |YD|<|XD|, and the case (b) where |YD|≧|XD|.

The case where |YD| of a left-side edge is smaller than |XD|, namely, where the left-side edge is closer to a horizontal line than to a vertical line, will be first described.

In FIG. 7A, the X coordinate XL of the real intersection between the line N and the left-side edge is obtained by adding the product of the slope XD and the number of scan lines the edge crosses, to the X coordinate of the upper vertex of this edge. A point which is separated by |XD|/2 in the X negative direction from the intersection XL provides a real outside intersection XLer, and a point which is separated by |XD|/2 in the X positive direction from the intersection XL provides a real inside intersection XLir. Values obtained by rounding up these real outside intersection XLer and real inside intersection XLir provide an outside intersection XLe on a lattice point in a displayed grid shown in FIG. 7A, and an inside intersection XLi on a lattice point in the grid.

The intensity value I of each of pixels on the line L from XLe to XLi is determined so that the intensity value I at the real outside intersection XLer becomes equal to 0, and the intensity value I at the real inside intersection XLir becomes equal to 1. To this end, the initial intensity value and following values are obtained according to the following equations:

$$I_0L=(XLe-XLer)*ddIL$$

$$I_nL=I_{n-1}L+ddIL \ (n \ne 0),$$

where ddIL=|YD|. The intensity value of pixels located to the right of XLi is equal to 1.

The case where |YD| of the left-side edge is equal to or greater than |XD|, namely, where the left edge is closer to a vertical line than to a horizontal line, will be now described.

In FIG. 7B, the X coordinate XL of the real intersection between the line N and the left-side edge is obtained by adding the product of the slope XD and the number of scan lines the edge crosses, to the X coordinate of the upper vertex of this edge. A point which is separated by 0.5 in the X negative direction from the intersection XL provides a real outside intersection XLer, and a point which is separated by 0.5 in the X positive direction from the intersection XL provides a real inside intersection XLir. Values obtained by rounding up these real outside intersection XLer and real inside intersection XLir provide an outside intersection XLe on a lattice point in a displayed grid shown in FIG. 7B, and an inside intersection XLi on a lattice point in the grid. In this case, XLe and XLi should be positioned at pixels which are located adjacent to each other in the X direction.

The intensity value IOL at the pixel position XLe is determined according to the following equation, so that the intensity value I at the real outside intersection XLer becomes equal to 0, and the intensity value I at the real inside intersection XLir becomes equal to 1.

$$I_0L=XLe-XLer$$

The intensity value I at the next pixel position XLi becomes equal to 1. In this case, there is no particular need to obtain ddIL.

The case where |YD| of a right-side edge is smaller than |XD|, namely, where the right-side edge is closer to a horizontal line than to a vertical line, will be now described.

In FIG. 8A, the X coordinate of the real intersection XR between the line N and the right-side edge is obtained by adding the product of the slope XD and the number of scan lines the edge crosses, to the X coordinate of the upper vertex of this edge. A point which is separated by |XD|/2 in the X negative direction from the intersection XR provides a real inside intersection XRir, and a point which is separated by |XD|/2 in the X positive direction from the intersection XR provides a real outside intersection XRer. Values obtained by rounding down the real inside intersection XRir and real outside intersection XRer provide an inside intersection XRi on a lattice point in a displayed grid shown in FIG. 8A, and an outside intersection XRe on a lattice point in the grid, respectively.

The intensity value I of each of pixels on the line N from XRi +1 to XRe is determined so that the intensity value I at the real inside intersection XRir becomes equal to 1, and the intensity value I at the real outside intersection XRer becomes equal to 0. To this end, the initial intensity value and following values are obtained according to the following equations:

$$I_0R=(XRer-XRi-1)*ddIR$$

$$I_nR=I_{n-1}R-ddIR \ (n=0),$$

where ddIL =|YD|. The intensity value of pixels located to the right of XRe+1 is equal to 0.

The case where |YD| of a right-side edge is equal to or greater than |XD|, namely, where the right-side edge is closer to a vertical line than to a horizontal line, will be now described.

In FIG. 8B, the X coordinate of the real intersection XL between the line N and the right-side edge is obtained by adding the product of the slope XD and the number of scan lines the edge crosses, to the X coordinate of the upper vertex of this edge. A point which is separated by 0.5 in the X negative direction from the intersection XR provides a real inside intersection XRir, and a point which is separated by 0.5 in the X positive direction from the intersection XR provides a real outside intersection XRer. Values obtained by rounding down the real inside intersection XRir and real outside intersection XRer provide an inside intersection XRi on a lattice point in a displayed grid shown in FIG. 8B, and an outside intersection XRe on a lattice point in the grid. In this case, XRe and XRi should be positioned at pixels which are located adjacent to each other in the X direction.

The intensity value $I_0R$ at the pixel position XRe is determined according to the following equation, so that the intensity value I at the real inside intersection XRir becomes equal to 1, and the intensity value I at the real outside intersection XRer becomes equal to 0:

$$I_0R=XRer-XRe$$

The intensity value I at the next pixel position XRi becomes equal to 1. In this case, there is no particular need to obtain ddIR.

Figure 9:
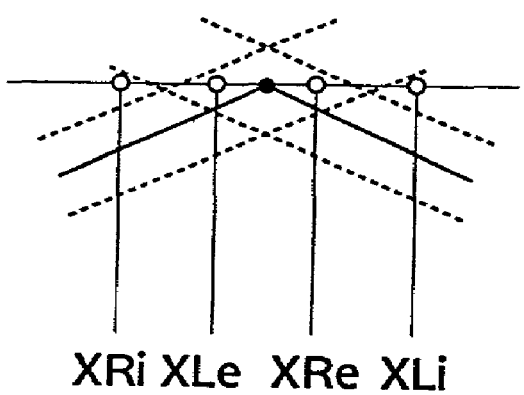
FIG. 9 is a view useful in explaining an operation performed by the horizontal line processing circuit for processing a vertex portion formed by two edges.

Once the line intersection data are obtained in the manner as described above, the intensity value is gradually increased from the initial intensity value $I_0L$ at the outside intersection XLe of the left-side edge to the intensity value 1 at the inside intersection XLi, with the increment value of the intensity being set to ddIL, and is gradually decreased from the initial intensity value $I_0R$ at the pixel to the right of the inside intersection XRi of the right-side edge to the intensity value 0 at the outside intersection XRe, with the decrement value of the intensity being set to ddIR. In this manner, the intensity value I of each of pixels on the scan line can be obtained by performing normal sequential processing for sequentially obtaining the intensity value I along a given scan line. Since the left and right edges adjoins each other at around their vertex, the positional relationship between the outside intersection XLe of the left edge and the inside intersection XRi of the right edge, and the positional relationship between the inside intersection XLi of the left edge and the outside intersection XRe of the right edge may be respectively reversed in the X direction, as shown in FIG. 9. In view of this situation, plotting of the intensity value I is limited to the range from XLe to XRe, and where XLi and XRi do not appear between XLe and XRe, such processing that ignores these intersections is required.

Next, the edge calculating circuit 1 will be described in detail.

Figure 10:
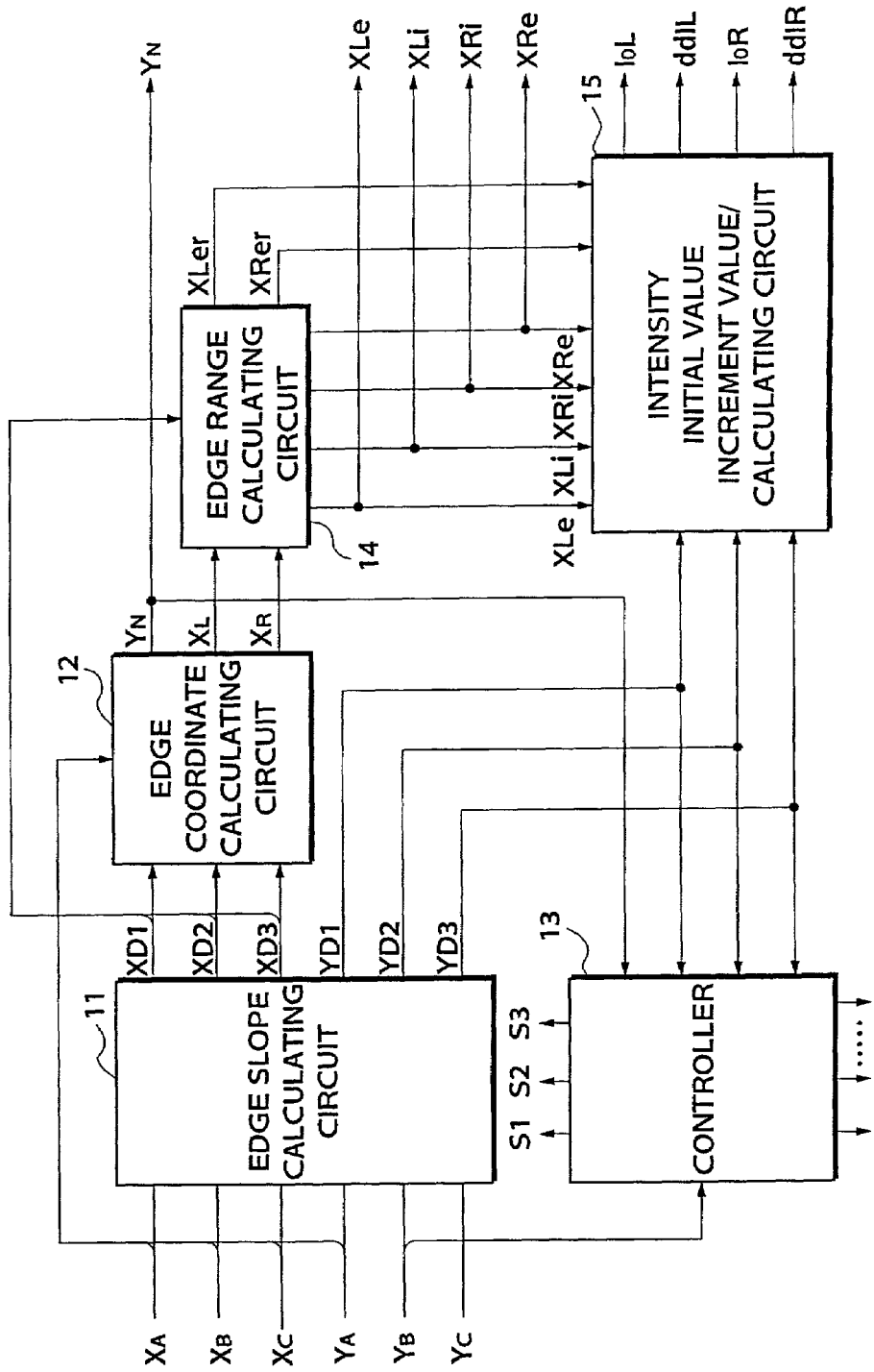
FIG. 10 is a block diagram showing in detail the construction of the edge calculating circuit of the apparatus of FIG. 4.

FIG. 10 shows an example of the construction of the edge calculating circuit 1.

Figure 11:
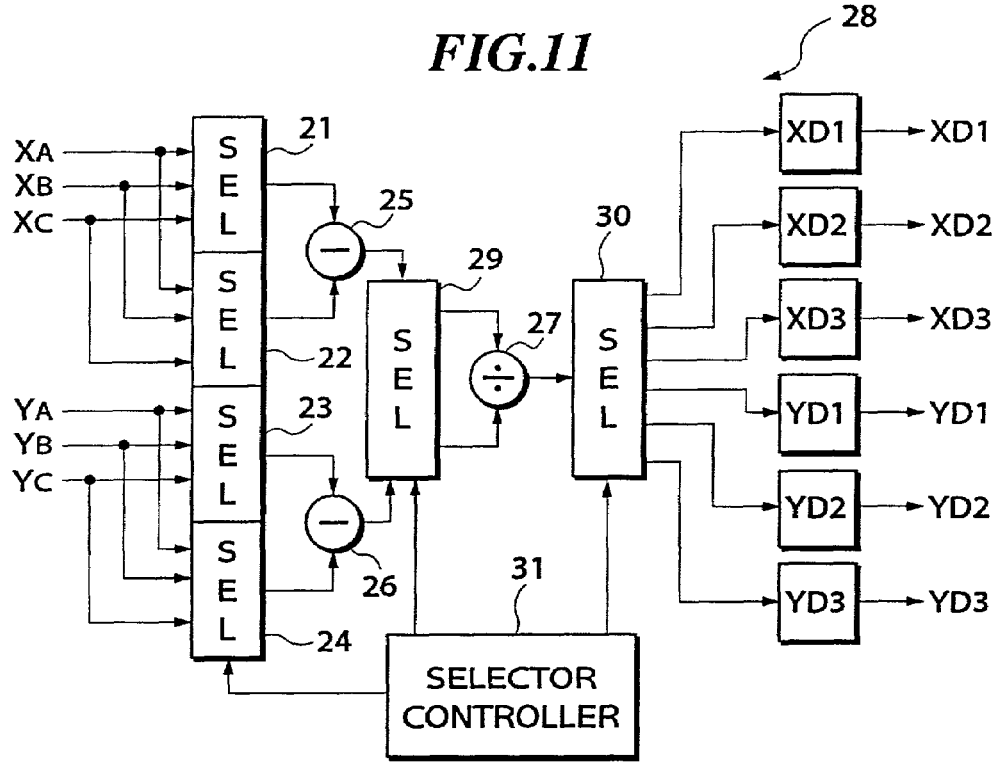
FIG. 11 is a block diagram showing the construction of an edge slope calculating circuit of the edge calculating circuit of FIG. 10.

When coordinates of vertices $(X_1, Y_1)$, $(X_2, Y_2)$, $(X_3, Y_3)$ of a triangle are given to this circuit 1, one of these vertices having the smallest Y coordinate value is named A $(X_A, Y_A)$, and one of the remaining two vertices is named B $(X_B, Y_B)$ which is connected to the vertex A with an edge between these vertices located to the left of the vertex A, while the other vertex is named C $(X_C, Y_C)$ which is connected to the vertex A with an edge between these vertices located to the right of the vertex A. These coordinates of the vertices A, B, C are supplied to an edge slope calculating circuit 11. The edge slope calculating circuit 11 is constructed as shown in FIG. 11 by way example, wherein each of selectors 21, 22 selects one of X coordinates $X_A$–$X_C$, and each of selectors 23, 24 selects one of Y coordinates $Y_A$–$Y_C$. The outputs of the selectors 21, 22 and the outputs of the selectors 23, 24 are respectively subtracted from each other by subtracters 25, 26, and the results of subtraction are divided by a divider 27, to thereby calculate slopes of straight lines AB, AC, BC based on the coordinates of the vertices, according to the following equations.

$XD1=(X_B-X_A)/(Y_B-Y_A)$ $XD2=(X_C-X_A)/(Y_C-Y_A)$ $XD3=(X_C-X_B)/(Y_C-Y_B)$ $YD1=(Y_B-Y_A)/(X_B-X_A)$ $YD2=(Y_C-Y_A)/(X_C-X_A)$ $YD3=(Y_C-Y_B)/(X_C-X_B)$

Figure 12:
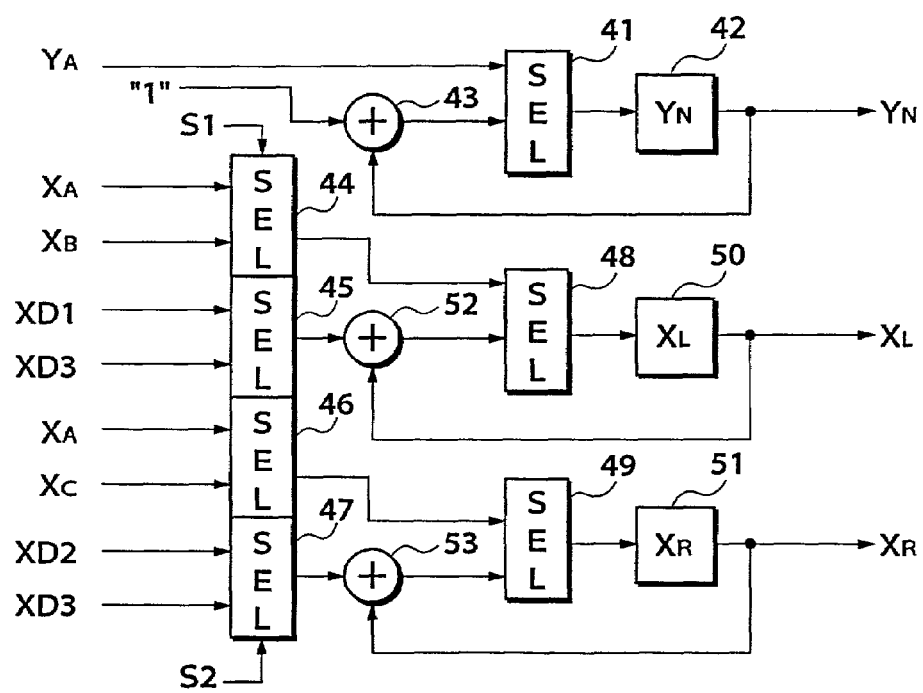
FIG. 12 is a block diagram showing the construction of an edge coordinate calculating circuit of the edge calculating circuit of FIG. 10.

These slope data are stored in respective registers 28. The edge slope calculating circuit 11 further includes a selector 29 for selecting one of the outputs of the subtracters 25, 26 as a denominator and selecting the other as a numerator before the outputs are supplied to the divider 27, and a selector 30 for selecting one of the registers 28 in which the result of calculation obtained by the divider 27 is to be stored. The circuit 11 also includes a selector controller 31 for controlling the selectors 21 through 24, 29, and 30. The edge calculating circuit 1 of FIG. 10 further includes an edge coordinate calculating circuit 12 to which are supplied the slop data XD1–XD3 and vertex data $X_A$, $X_B$, $X_C$, and $Y_A$. In this circuit 12, the Y coordinate value $Y_N$ of each scan line, and the real edge positions $X_L$, $X_R$ are obtained. This edge coordinate calculating circuit 12 is constructed as shown in FIG. 12, for example. Initially, $Y_A$ as an initial value of the Y coordinate value $Y_N$ is selected by a selector 41, and stored in a $Y_N$ register 42. Thereafter, an adder 43 adds one at a time to the value $Y_N$ currently stored in the $Y_N$ register 42 so as to update the Y coordinate value $Y_N$. For each line, the vertex $X_A$ is initially selected by selectors 44, 46, and the slopes XD1, XD2 are selected by the selectors 45, 46, respectively. Then, the coordinates of the vertex $X_A$ are first selected by selectors 48, 49 as edge coordinates $X_L$, $X_R$, which are then stored in $X_L$ register 50 and $X_R$ register 51, respectively. Thereafter, adders 52, 53 sequentially add the slopes XD1, XD2 to the edge coordinates $X_L$, $X_R$ currently stored in the registers 50, 51, respectively, so as to provide updated edge coordinates $X_L$, $X_R$.

The edge calculating circuit 1 of FIG. 10 further includes a controller 13 which generates a control signal S1 when the Y coordinate value $Y_N$ first becomes equal to $Y_B$, and generates a control signal S2 when the value $Y_N$ first becomes equal to $Y_C$, based on the relationship between $Y_N$ and $Y_B$, and between $Y_N$ and $Y_C$. Where the control signal S1 is generated, the selectors 44, 45 of the edge coordinate calculating circuit 12 select $X_B$, XD3, respectively, and, when the control signal S2 is generated, the selectors 46, 47 of the circuit 12 select $X_C$, XD3, respectively. Thus, switching or selection of the straight lines constituting the triangle is performed.

Figure 13:
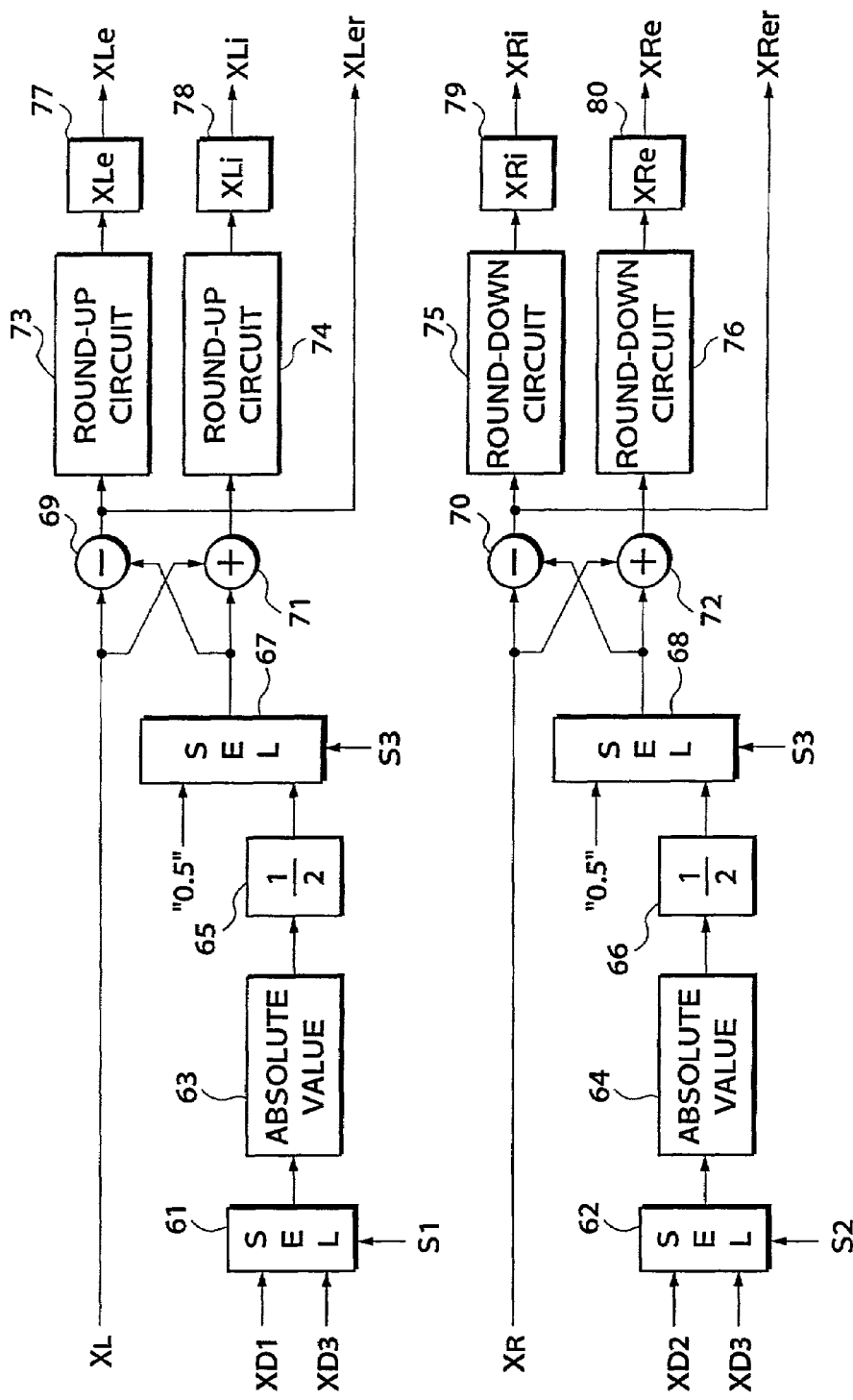
FIG. 13 is a block diagram showing the construction of an edge range calculating circuit of the edge calculating circuit of FIG. 10.

The edge coordinates $X_L$, $X_R$ thus obtained are supplied, along with the slopes XD1–XD3, to an edge range calculating circuit 14 as shown in FIG. 10. This edge range calculating circuit 14 is constructed as shown in FIG. 13, for example. The upper portion of this circuit 14 is provided by a circuit for calculating the outside intersection XLe and inside intersection XLi of the left-side edge, and the lower portion of the circuit 14 is provided by a circuit for calculating the inside intersection XRi and outside intersection XRe of the right-side edge.

Initially, selectors 61, 62 select slope data XD1, XD2, respectively, and absolute value circuits 63, 64 obtain absolute values of these data XD1, XD2. Then, ½ circuits 65, 66 calculate values which are halves of the respective absolute values of the slop data XD1, XD2. Selectors 67, 68 receive the respective outputs of the ½ circuits 65, 66 on one hand, and receive "0.5" on the other hand, and select one of these values according to a control signal S3. The controller 13 of FIG. 10 generates the control signal S3 which indicates whether the edge that is being processed forms a small angle with respect to a corresponding horizontal line (the edge has a gentle slope) (|YD|<|XD|), or whether the edge forms a large angle with respect to the horizontal line (the edge has a steep slope) (|YD|≧|XD|), based on slope data YD1–YD3. The outputs of the selectors 67, 68 are supplied to subtracters 69, 70 and adders 71, 72, for subtraction and addition with the edge coordinates $X_L$, $X_R$, respectively. The results of calculation for the left-side edge are rounded up by round-up circuits 73, 74, while the results of calculation for the right-side edge are rounded down by round-down circuits 75, 76, so that the intersection coordinates XLe, XLi, XRi, XRe are respectively calculated, and stored in respective registers 77, 78, 79, 80. Also, real outside intersections XLer, XRer are obtained from the results of calculation before they are rounded up and rounded down. When another edge is newly selected for processing, the selectors 61, 62 each select slope data XD3 instead of the slope data XD1 or XD2 according to the control signal S1, S2.

Figure 14:
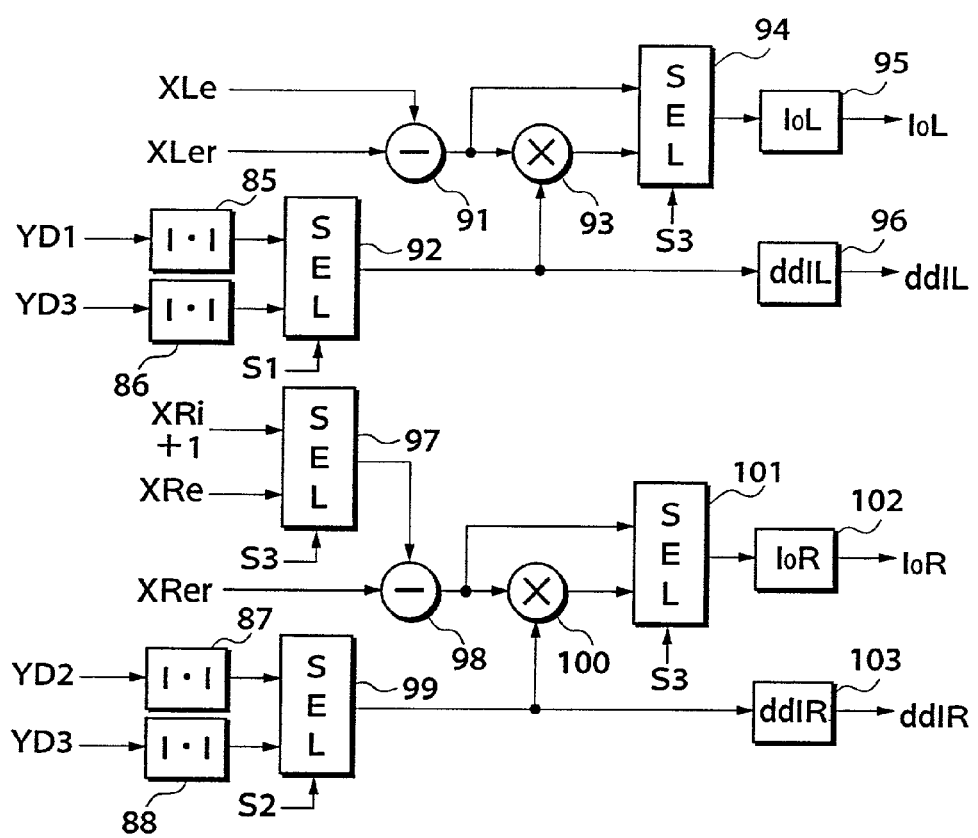
FIG. 14 is a block diagram showing the construction of an intensity initial value/increment value calculating circuit of the edge calculating circuit of FIG. 10.

The intersection coordinates XLe, XLi, XRe, XRe, XLer, XRer thus determined are supplied, along with the slope data YD1–YD3, to a circuit 15 for calculating the initial value and increment value of the intensity. This intensity initial value and increment value calculating circuit 15 is constructed as shown in FIG. 14, for example. Initially, absolute values of the slope data YD1–YD3 are obtained by respective absolute value circuits 85–88, and supplied to selectors 92, 99. In FIG. 14, the upper portion of the circuit 15 serves to calculate the intensity of the left-side edge, while the lower portion of the circuit 15 serves to calculate the intensity of the right-side edge. More specifically, a subtracter 91 calculates a difference between the real outside intersection XLer of the left-side edge and the outside intersection XLe on a lattice point in the grid, and a multiplier 93 multiplies this difference by |YD1| or |YD3| selected by the selector 92. Where the left-side edge has a gentle slope, namely, where the left-side edge forms a small angle with respect to a horizontal line, the selector 94 selects this result of multiplication as the initial value $I_0L$. Where the left-side edge has a steep slope, namely, where the left-side edge forms a large angle with respect to the horizontal line, the selector 94 selects the difference between XLer and XLe before the multiplication, as the initial value $I_0L$. The initial value I0L thus selected by the selector 94 is stored in an $I_0L$ register 95, and |YD1| or |YD3| selected by the selector 92 is stored in a ddIL register 96.

In the lower portion of the circuit 15 of FIG. 14, on the other hand, a subtracter 98 calculates a difference between the real outside intersection XRer of the right-side edge and the outside intersection XRe or inside intersection XRi+1 on a lattice point in the grid, which is selected by a selector 97, and a multiplier 100 multiplies this difference by |YD2| or |YD3| selected by a selector 99. Where the right-side edge has a gentle slope, namely, where the right-side edge forms a small angle with respect to a horizontal line, a selector 101 selects this result of multiplication as the initial value $I_0R$ of the intensity. Where the right-side edge has a steep slope, namely, where the right-side edge forms a large angle with respect to the horizontal line, the selector 101 selects the difference between XRer and XRe or XRi +1 before the multiplication, as the initial value $I_0R$. The initial value $I_0R$ thus selected by the selector 101 is stored in an $I_0R$ register 99, and |YD2| or |YD3| selected by the selector 99 is stored in a ddIR register 103.

Next, the horizontal line processing circuit 2 will be described in detail.

Figure 15A:
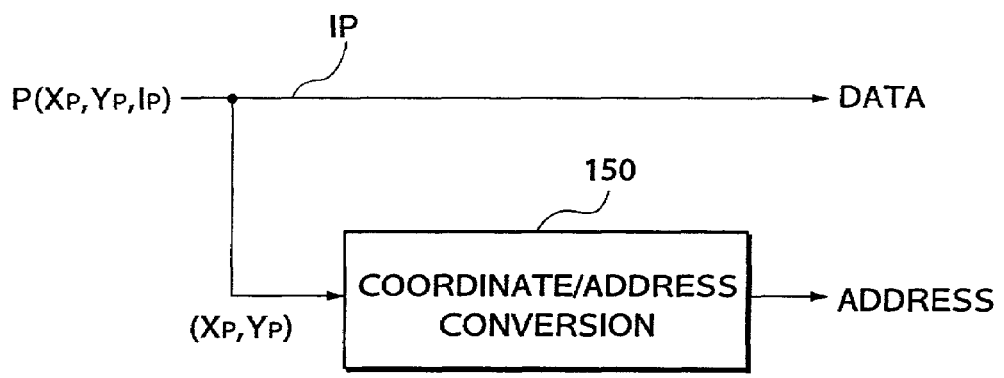
FIG. 15 is a block diagram showing the construction of the horizontal line processing circuit in detail.
FIG. 15B is a block diagram showing the construction of the horizontal line processing circuit in detail.
Figure 15B:
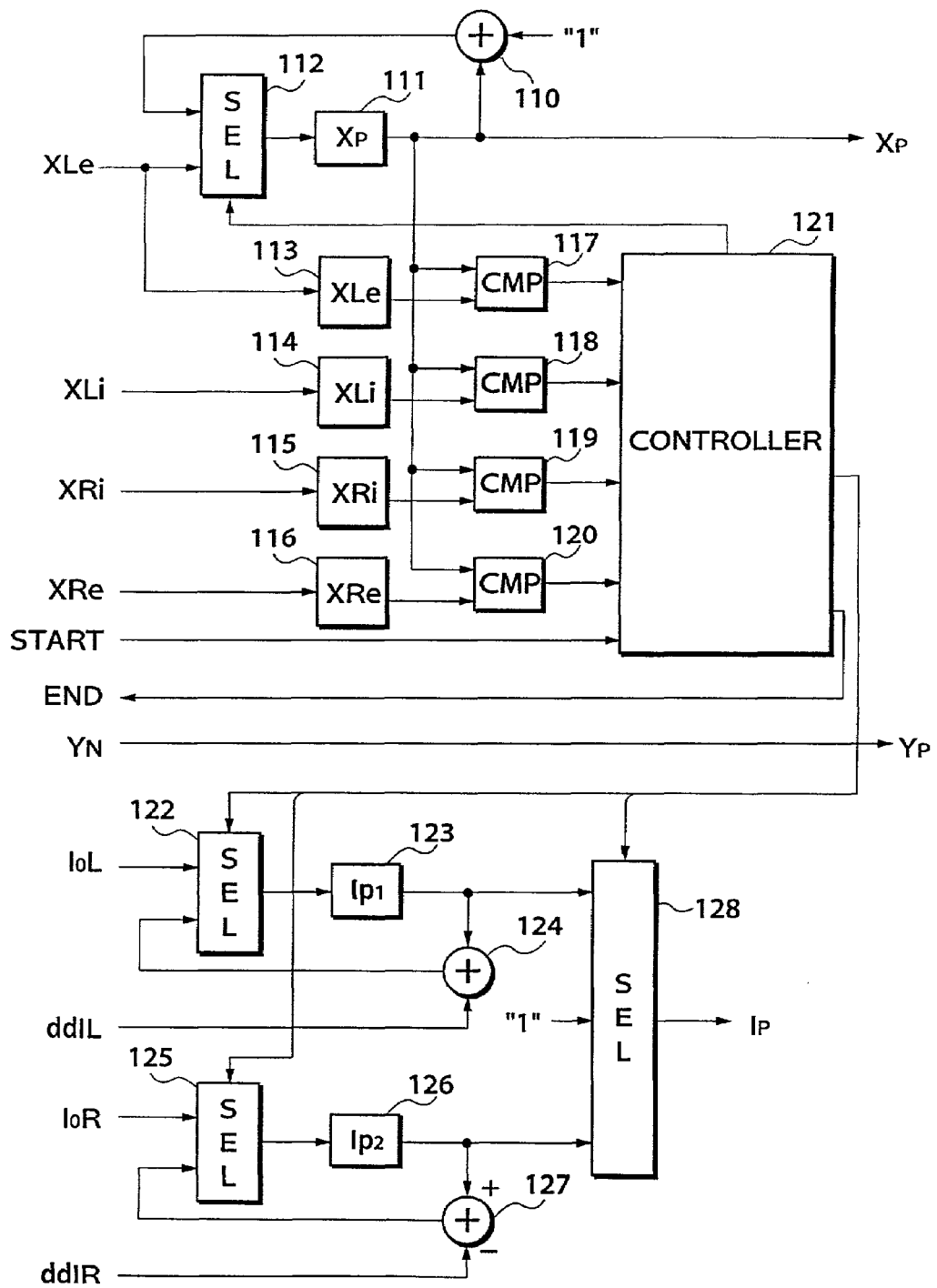

FIG. 15B shows an example of the construction of the horizontal line processing circuit 2. In this example, the Y coordinate value $Y_N$ provides as it is a pixel Y coordinate $Y_P$. Upon the start of processing of one scan line, the X coordinate $X_P$ of the initially processed pixel on the scan line is stored in an $X_P$ register 111. This X coordinate $X_P$ is selected by a selector 112, and its initial value is XLe. Also, XLe, XLi, XRi, XRe are respectively set in corresponding registers 113, 114, 115 and 116. An adder 110 sequentially adds "1" to the X coordinate $X_P$ so that the X coordinate $X_P$ is shifted to the right by one at a time along the scan line. Comparators 117, 118, 119 and 129 compare this X coordinate $X_P$ with XLe, XLi, XRi and XRe, respectively, and a controller 121 controls respective portions of the circuit 2 based on the results of comparison.

More specifically, when $X_P$ is equal to XLe, a selector 122 selects the initial intensity value $I_0L$, and this value $I_0L$ is stored in an $I_{P1}$ register 123. When $X_P$ is larger than XLe and smaller than XLi, the selector 122 selects a value obtained from an adder 124 by accumulatively adding an increment value ddIL to the current value of the $I_{P1}$ register 123, and the selected value is then stored in the $I_{P1}$ register 123. When $X_P$ exceeds XRi, a selector 125 selects the initial intensity value $I_0R$, and this value $I_0R$ is stored in an $I_{P2}$ register 126. When $X_P$ is larger than XRi+1, and smaller than XRe, the selector 125 selects a value obtained from a subtracter 127 by sequentially subtracting an increment value (decrement value) ddIR from the current value of the $I_{P2}$ register 126, and the selected value is then stored in the $I_{P2}$ register 126. The values of the registers 123, 126 and "1" are supplied to a selector 128 where the output of the register 123 is selected as the intensity value $I_P$ if $X_P$ is in the range of XLe to XLi−1, and "1" is selected as the intensity value $I_P$ if $X_P$ is in the range of XLi to XRi, while the output of the register 126 is selected as the intensity value $I_P$ if $X_P$ is in the range of XRi+1 to XRe. Also, the controller 121 starts processing for one scan line when receiving a START signal from a circuit in the previous stage, and generates an END signal to the previous-stage circuit when $X_P$ exceeds XRe.

FIG. 15A shows the construction of the pixel processing circuit 3. The pixel processing circuit 3 is comprised of a coordinate/address conversion circuit 150. When data ($X_P$, $Y_P$, $I_P$), i.e. coordinate data ($X_P$, $Y_P$) of each pixel and the intensity value $I_P$ corresponding to the pixel are received, the coordinate data ($X_P$, $Y_P$) is converted to an address value, and the intensity value IP is written into the memory 4 at an address location corresponding to the address value.

According to the present embodiment as described above, the intensity of pixels are successively obtained along each scan line, thus permitting high-speed processing.

In the present embodiment, line intersection data associated with an intersecting portion between each of edges of the polygon to be drawn and each scan line are calculated, which data include a first pair of outside intersection and inside intersection that represent intersecting positions between each scan line and one of the edges that is located on an upstream side as viewed in a scanning direction, a second pair of outside intersection and inside intersection that represent intersection positions between each scan line and one of the edges that is located on a downstream side as viewed in the scanning direction, an increasing rate at which the intensity value increases from the outside intersection to the inside intersection of the first pair, and a decreasing rate at which the intensity value decreases from the inside intersection to the outside intersection of the second pair. Therefore, the intensity value of each pixel along each scan line can be sequentially obtained by gradually increasing the intensity value at the increasing rate, from the outer intersection to the intersection of the first pair, and gradually decreasing the intensity value at the decreasing rate, from the inside intersection to the outside section of the second pair, thus permitting sequential processing along each scan line. Thus, high-speed drawing processing can be realized.

Next, a second embodiment of the invention will be described.

While it is assumed in the first embodiment described above that the Y coordinate of each vertex of the polygon exits on one of scan lines, the polygon drawing apparatus of the second embodiment is able to draw a polygon in the case where coordinates ($X_A$, $Y_A$), ($X_B$, $Y_B$), ($X_C$, $Y_C$) of vertices A, B and C do not exist on scan lines, as shown in FIG. 16 by way of example. In this case, the decimal place (hereinafter called $Y_{LSB}$) of the Y coordinate of each vertex is taken into consideration, so that the polygon can be smoothly expressed. With respect to three vertex patterns in which vertices are present between adjacent scan lines as shown in FIG. 17, a reference intensity value $\Delta Y$ is determined for each case in the manner as described below, and the intensity value is multiplied by the reference intensity value ΔY, so as to provide the final intensity value $I_P$.

Pattern A where a vertex formed by the upper ends of two edges exists between two adjacent scan lines:

$$\Delta Y = 1 - Y_{LSB}$$

Pattern B where no vertex exists between two adjacent scan lines:

$$\Delta Y = Y_{LSB} = 1$$

Pattern C where a vertex formed by the lower ends of two edges exists between two adjacent scan lines:

$$\Delta Y = Y_{LSB}$$

Figure 18:
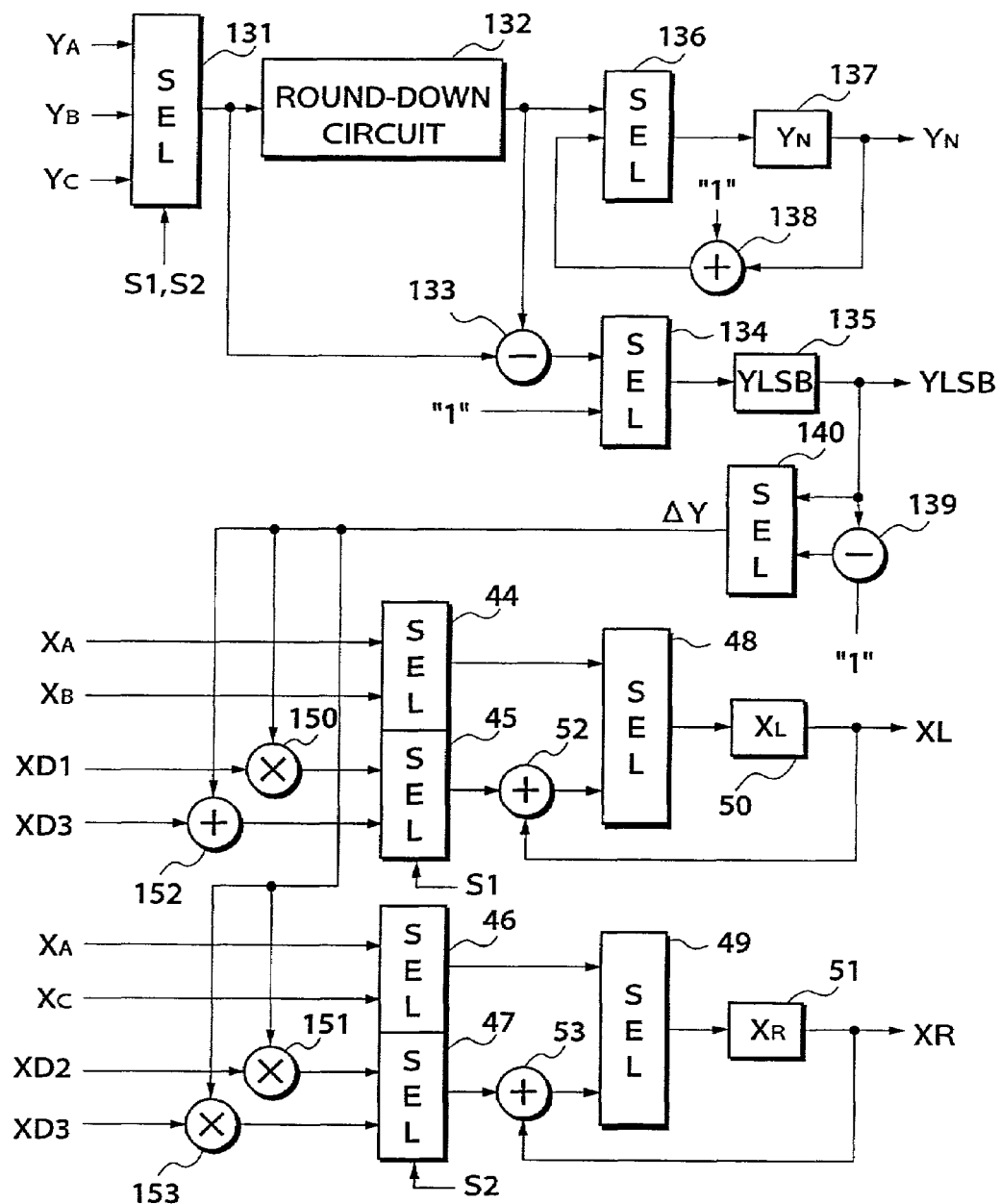
FIG. 18 is a block diagram showing the construction of an edge coordinate calculating circuit of the second embodiment.

In the present embodiment, therefore, the edge coordinate calculating circuit 12 of the first embodiment as shown in FIG. 12 is replaced by a circuit which is constructed as shown in FIG. 18. In this circuit, a selector 131 selects one of Y coordinates $Y_A$, $Y_B$, $Y_C$ of the vertices A, B and C according to control signals S1, S2, and a subtracter 133 subtracts a value that is discarded by a round-down circuit 132 that rounds down the output of the selector 131, from the output of the selector 131, to thereby calculate $Y_{LSB}$ of the presently-processed vertex. A selector 134 selects one of the output of the subtracter 133 and "1", so that a $Y_{LSB}$ register 135 stores a value smaller than 1 with respect to the vertex, and "1" with respect to the other portions. The output of the round-down circuit 132 is also supplied to a $Y_N$ register 137 through a selector 136, and stored as the initial value $Y_N$ in this register 137. Thereafter, an adder 138 sequentially adds "1" to the current value $Y_N$ to provide an updated value, and the $Y_N$ register 137 stores the updated value selected by the selector 136. A subtracter 139 subtracts $Y_{LSB}$ stored in the $Y_{LSB}$ register 135 from "1". A selector 140 outputs the value of ΔY which is determined depending upon each of Patterns A, B, C as described above.

Although the circuit for obtaining the X coordinates $X_L$, $X_R$ of edge intersections is basically similar to the circuit as shown in FIG. 12, the circuit of the present embodiment is different from that of FIG. 12 in that multipliers 150, 151, 152, 153 respectively multiply the slopes XD1, XD2, XD3 by the reference intensity value ΔY, whereby increment values used when determining $X_L$, $X_R$ at the line next to the vertex are different from the increment values for the other lines.

Figure 19:
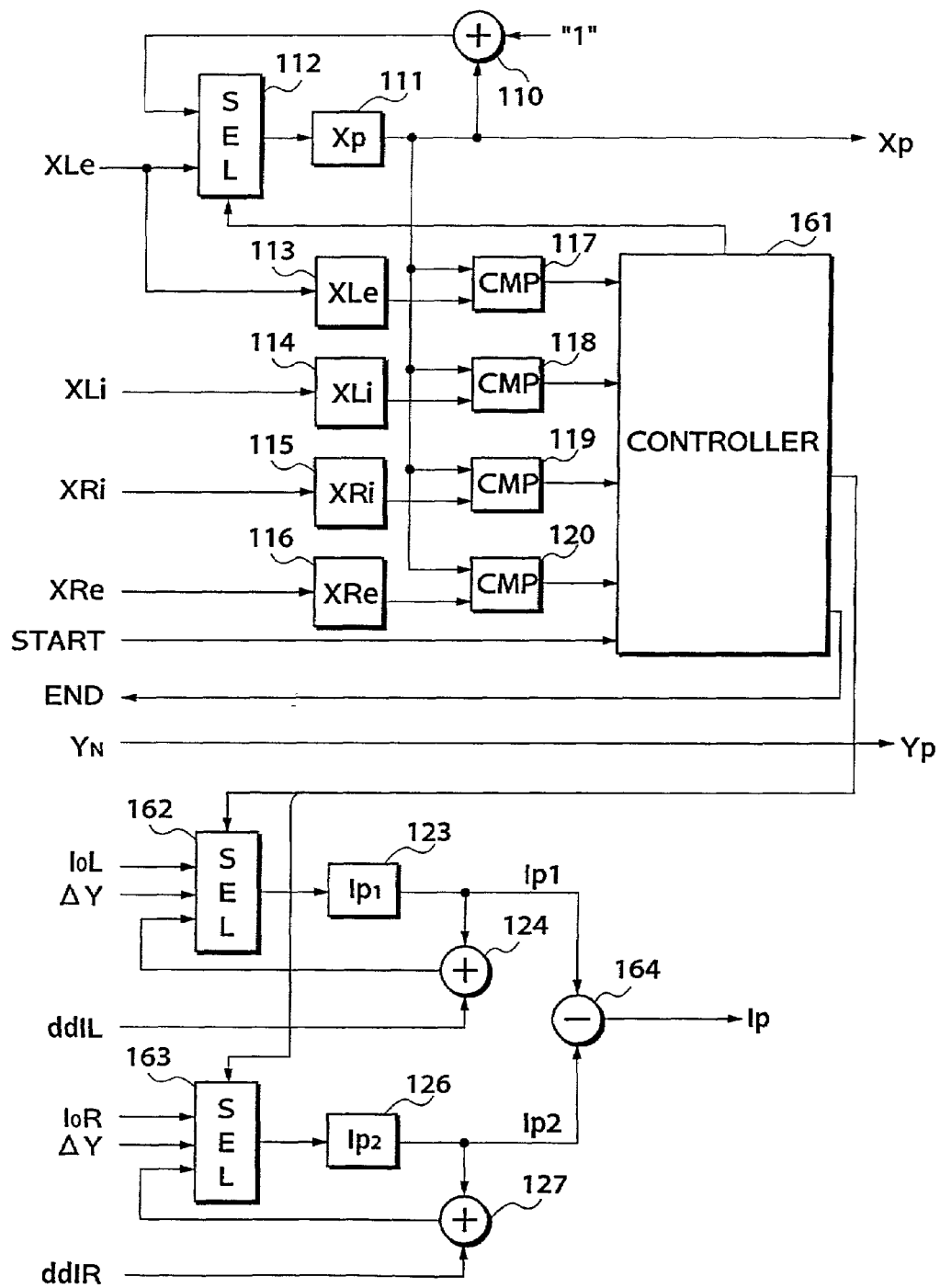
FIG. 19 is a block diagram showing the construction of a horizontal line processing circuit of the second embodiment.

FIG. 19 shows the construction of the horizontal line processing circuit 2 of the present embodiment. In FIG. 19, the same reference numerals as used in FIG. 15 are used for identifying corresponding elements, of which detailed description is omitted.

In the present embodiment, the intensity values $I_{P1}$, $I_{P2}$ as a result of separate processing of the left edge and right edge are subtracted from each other by a subtracter 164, so as to simplify the processing of a portion of the polygon including a vertex formed by these edges. Selectors 162, 163 also receive the value of ΔY, and a controller 161 causes the selector 162 to select the ΔY value when the coordinate value $X_P$ for each pixel becomes equal to or larger than the inside X coordinate XLi of the left edge, and causes the selector 163 to select the ΔY value when the coordinate value $X_P$ for each pixel exceeds the outside X coordinate XRe of the right edge. The values $I_0L$, ddIL, $I_0R$, and ddIR are determined in advance on the basis of the ΔY value. This embodiment is also different from the previous embodiment in that $I_0R$ and ddIR are the initial value of the decrement value of the intensity and the increment value (decrement value) to be applied at and from the inside of the right edge, respectively. Needless to say, the weighting by the use of the ΔY value may be performed with respect to the intensity values $I_{P1}$, $I_{P2}$, or the intensity value $I_P$ as the final result (the output of the subtracter 164).

Figure 20:
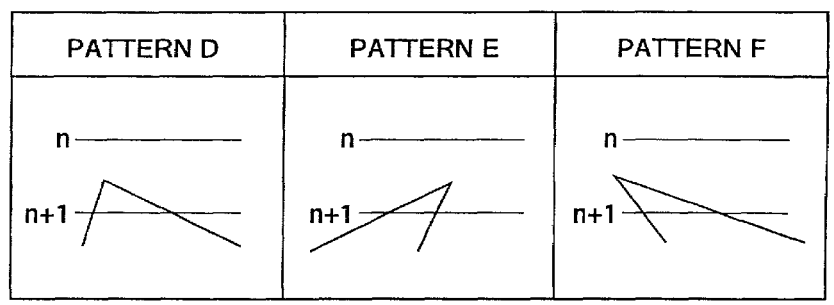
FIG. 20 is a view showing different patterns or forms of polygon vertices.
Figure 21A:
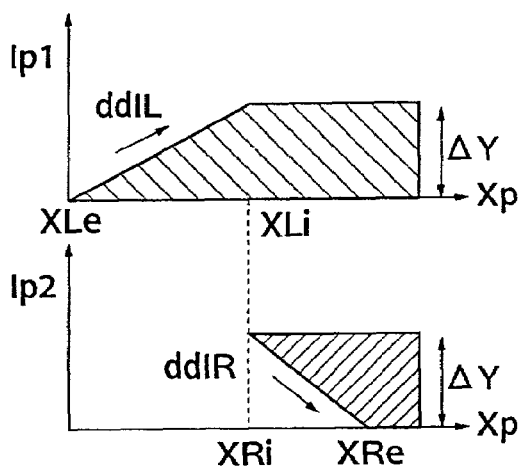
FIG. 21A is a view useful in explaining the operation of the horizontal line processing circuit corresponding to a pattern D shown in FIG. 20.
Figure 21B:
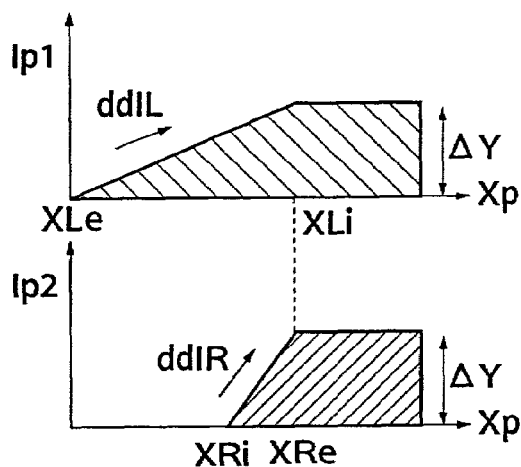
FIG. 21B is a view similar to that of FIG. 21A, which corresponds to a pattern E of FIG. 20.
Figure 21C:
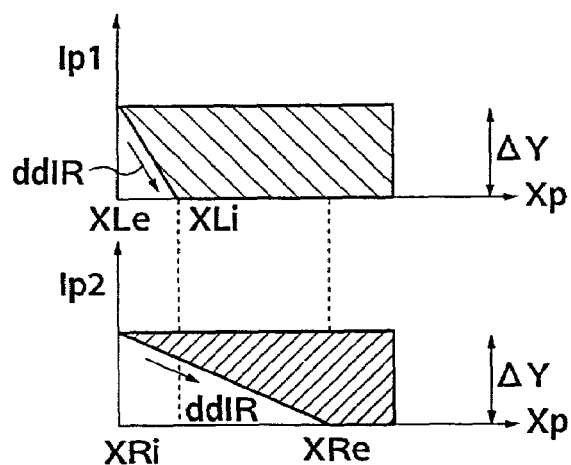
FIG. 21C is a view similar to that of FIG. 22A, which corresponds to a pattern F of FIG. 20.
Figure 22A:
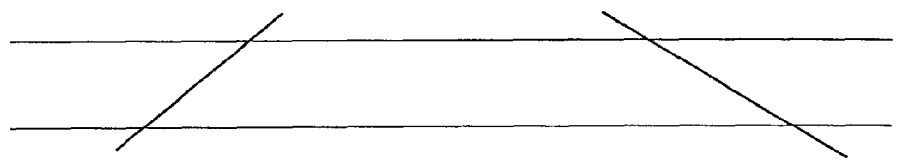
FIG. 22A is a view useful in explaining the operation of the horizontal line processing circuit for an intermediate portion of a polygon in which no vertex is present.
Figure 22B:
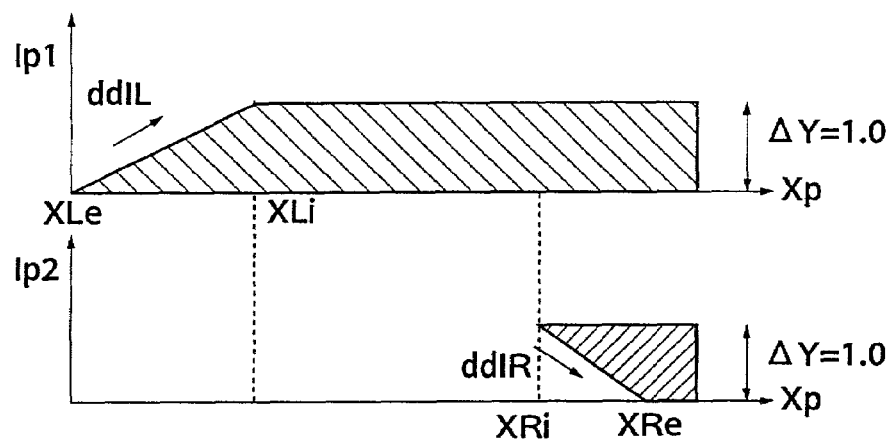
FIG. 22B is a view useful in explaining the operation of the horizontal line processing circuit for processing the intermediate portion of the polygon shown in FIG. 22A.
Figure 23:
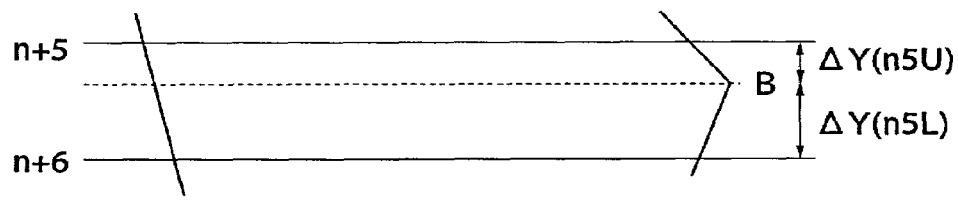
FIG. 23 is a view showing an example in which an end portion or vertex of a polygon is present between two adjacent scan lines.
Figure 26:
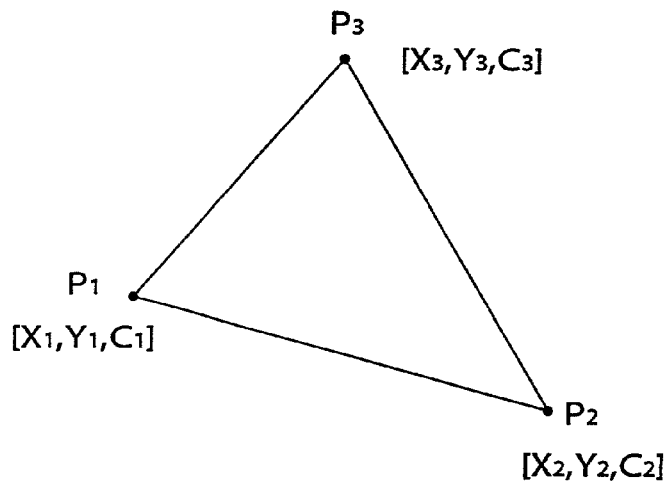
FIG. 26 is a view showing a triangle as a part of a polygon to be drawn.

Initially, the circuit of FIG. 19 performs processing as follows on a scan line near which the upper vertex of the polygon is present. More specifically, two edges that lead to the upper vertex are classified into three patterns as shown in FIG. 20, depending upon the manner of slope of the edges. In this figure, a pattern D indicates the case where the slopes of the left and right edges have difference signs (positive and negative signs), and a pattern E indicates the case where the slopes of both of the left and right edges have negative signs, while a pattern F indicates the case where the slopes of both of the left and right edges have positive signs. With respect to these patterns, the outputs $IP_1$, $I_{P2}$ of the adders 124, 127 are represented by areas of darkened regions in FIGS. 21A through 21C, respectively. By causing the subtracter 164 to subtract $I_{P2}$ from $I_{P1}$, therefore, the intensity $I_P$ at the vertex portion which exists between two scan lines can be easily obtained.

Where no vertex is present between scan lines as shown in FIG. 22A, the value ΔY is set to 1 as shown in FIG. 22B. In this case, too, the intensity $I_P$ at the X coordinate $X_P$ of each pixel can be calculated by exactly the same operations as described above.

Where a vertex B other than vertices formed by upper and lower ends of edges of a triangle is present between two adjacent scan lines as shown in FIG. 23, the edge or segment having the vertex B is divided into upper and lower portions, and processing is performed with respect to each portion in the same manner as described above. Initially, the intensity $I_P$ of the upper portion is calculated in the manner as shown in FIG. 24A, and then the intensity $I_P$ of the lower portion is calculated in the manner as shown in FIG. 24B. For these calculations, the same Y coordinate value ΔY is used. The results of calculations are then added together, so as to obtain the intensity value $I_P$ for the same pixel.

In the case where the lower vertex, i.e., a vertex formed by lower ends of two edges, is present between two adjacent scan lines, as shown in FIG. 25, the intensity value $I_P$ at the X coordinate $X_P$ of each pixel can be obtained for respective patterns G, H and I, according to exactly the same processing as described above with respect to the respective patterns D, E and F as shown in FIG. 20.

In the second embodiment, line intersection data associated with an intersecting portion between each of edges of the polygon to be drawn and each scan line are calculated, which data include a first pair of outside intersection and inside intersection that represent intersecting positions between each scan line and one of the edges that is located on an upstream side as viewed in a scanning direction, a second pair of outside intersection and inside intersection that represent intersection positions between each scan line and one of the edges that is located on a downstream side as viewed in the scanning direction, an increasing rate at which the intensity value increases from the outside intersection to the inside intersection of the first pair, and a decreasing rate at which the intensity value decreases from the inside intersection to the outside intersection of the second pair. Further, first processing for calculating changes in the intensity value from the outside intersection to the inside intersection of the first pair, second processing for calculating changes in the intensity value from the inside intersection to the outside intersection of the second pair, and third processing for combining results obtained in the first processing and second processing are performed in parallel with each other, based on the line intersection data for each scan line, to thereby sequentially calculate the intensity value to be given to each portion of the polygon in the scanning direction with respect to each scan line. Thus, sequential processing along each scan line can be accomplished. In this case, in particular, the same processing method for easily calculating the intensity value can be employed even for the case where a vertex at the upper or lower ends of the polygon, or a vertex in the middle of the polygon, does not exist on one of scan lines. Accordingly, high-speed drawing processing can be realized.

Next, a third embodiment of the invention will be described in detail.

Initially, a method of drawing a polygon according to the present embodiment will be described.

Suppose that vertex data representing each vertex $P_i$ (i=1, 2, 3, ) of a triangle which constitutes a polygon are provided by drawing addresses $X_i$, $Y_i$, and attribute data $C_i$ (for example, color information, depth information and others) set for the vertex $P_i$. Drawing commands for successively drawing triangles so as to draw a polygon are generated in one of two modes as shown in FIGS. 27A and 27B.

Figure 27A:
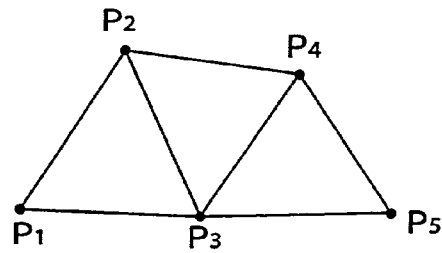
FIG. 27A is a view useful in explaining STRIP mode as a mode of drawing a polygon according to a third embodiment of the present invention.

(1) STRIP mode (FIG. 27A)

A triangle that is drawn in this STRIP mode is produced by connecting three latest vertices, out of vertex data that are given in time sequence. As shown in FIG. 27A, vertex data for two vertices $P_1$, $P_2$ are retrieved and held in response to two Move commands, and vertex data for a vertex $P_3$ are retrieved and held in response to a Triangle_Fill command that follows the Move commands, so that a triangle $P_1P_2P_3$ is drawn which is formed by the two vertices $P_1$, $P_2$ that have been just held, and the vertex $P_3$ that is currently held. Subsequently, triangles $P_2P_3P_4$, $P_3P_4P_5$, are drawn in this order in the same manner.

Figure 27B:
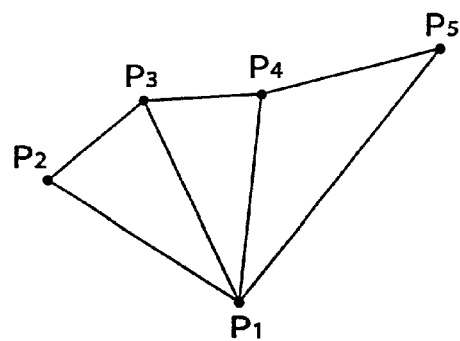
FIG. 27B is a view useful in explaining FAN mode as another mode of drawing a polygon according to the third embodiment of the invention.

(2) FAN mode (FIG. 27B)

A triangle that is drawn in this FAN mode is produced by connecting the oldest vertex and two latest vertices, out of vertex data that are given in time sequence. As shown in FIG. 27B, vertex data for two vertices $P_1$, $P_2$ are retrieved and held in response to two Move commands, and vertex data for a vertex P3 are retrieved and held in response to a Triangle_Fill command that follows the Move commands, so that a triangle $P_1P_2P_3$ is drawn which is formed by the oldest vertex $P_1$ and the latest two vertices $P_2$ and $P_3$. Subsequently, triangles $P_1P_3P_4$, $P_1P_4P_5$, are drawn in this order in the same manner.

When a polygon is drawn by successively drawing the triangles in the above manner, it is necessary to draw an edge which is common to adjoining triangles, for example, edge $P_2P_3$ or edge $P_3P_4$, when drawing one of triangles $Tr_1$, $Tr_2$, but not to draw such an edge when drawing the other triangle $Tr_2$, $Tr_3$.

Figure 1:
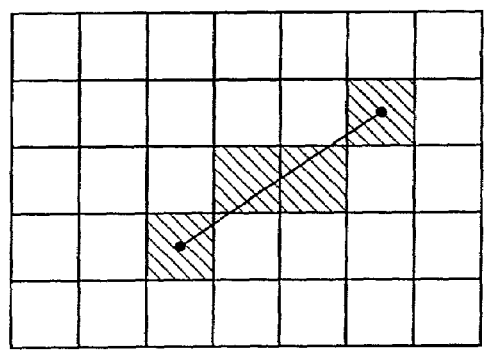
FIG. 1 is a view showing a conventional method for drawing a straight line.
Figure 2A:
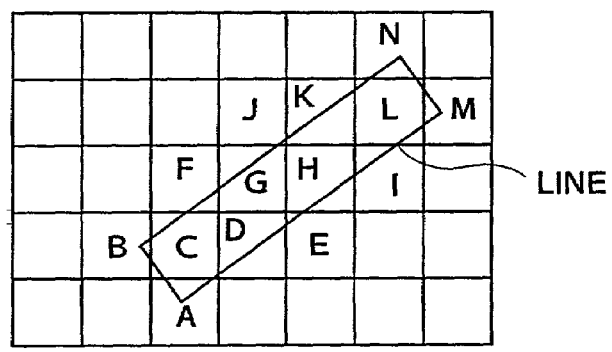
FIGS. 2A and 2B are views useful in explaining a conventional anti-aliasing method for drawing a straight line.
Figure 2B:
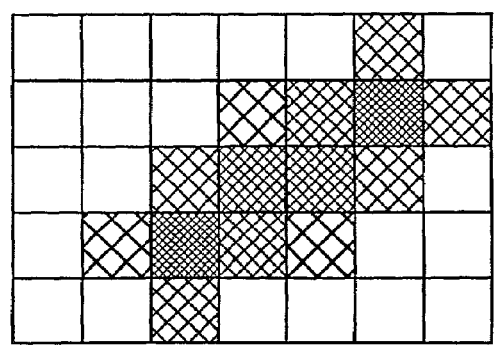
Figure 3:
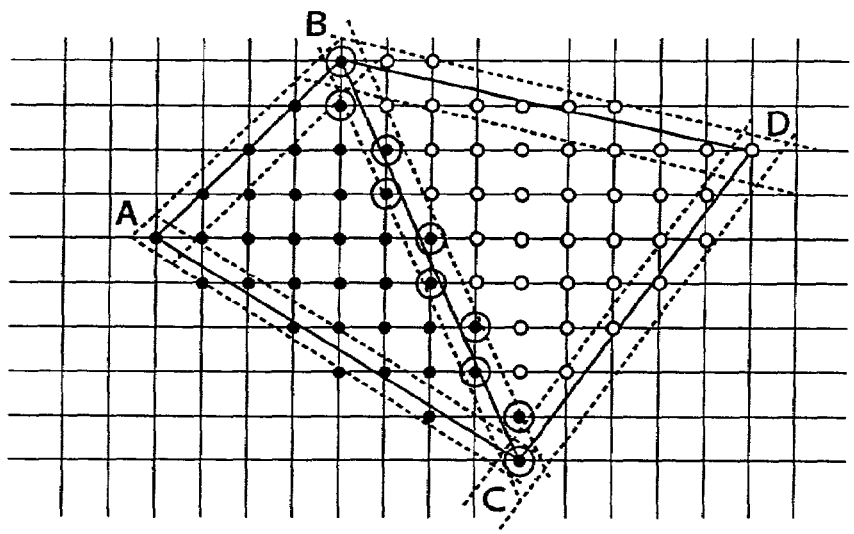
FIG. 3 is a view useful in explaining a known method of drawing a polygon.
Figure 28:
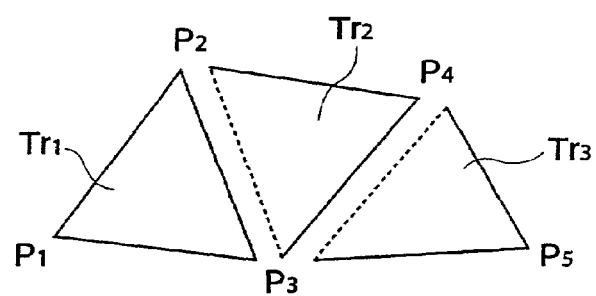
FIG. 28 is a view useful in explaining a need to draw each edge of a plurality of triangles that are successively drawn.
Figure 29:
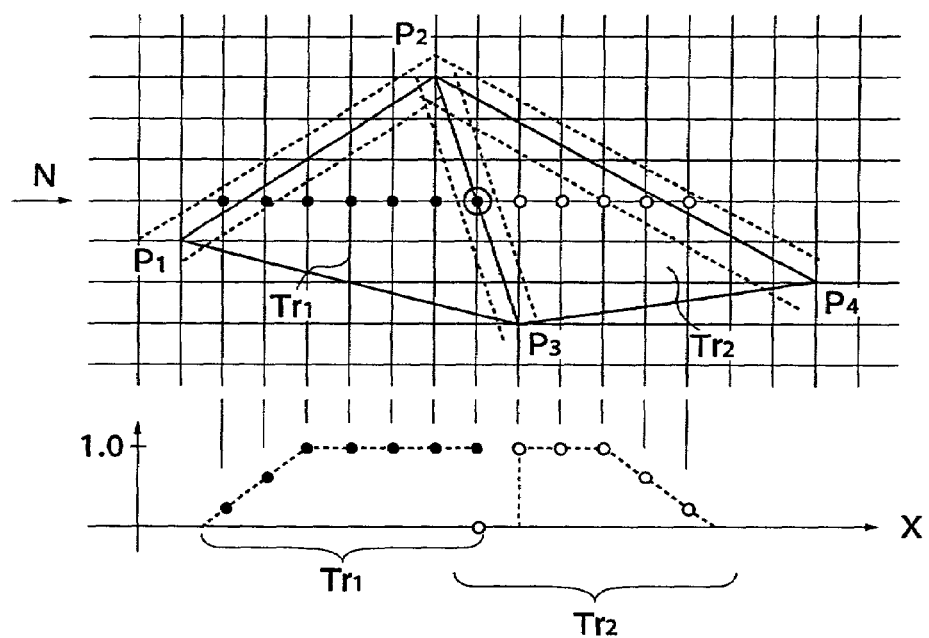
FIG. 29 is a view useful in explaining the relationship between each edge of adjoining triangles and a need to perform intensity processing according to the method of the third embodiment.
Figure 30:
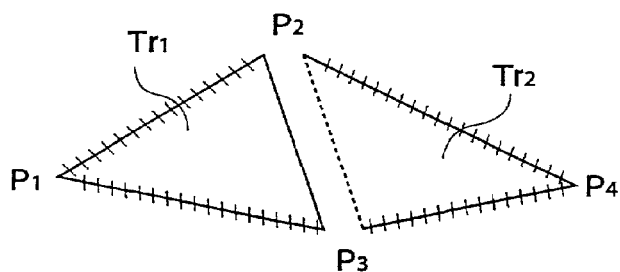
FIG. 30 is a view useful in explaining different types of drawing each edge of triangles.

When a polygonal pattern is drawn on a memory, ideal lines that constitute the polygonal pattern are expressed by points on a displayed grid in which horizontal and vertical lines are arranged at equal intervals, and therefore straight lines of the original pattern are normally formed into rough, uneven lines called jaggies, as described above referring to FIG. 1. Where the method of the first embodiment for reducing the jag or roughness of the lines is applied to an adjoining portion of two triangles $Tr_1$, $Tr_2$ as shown in FIG. 28, intensity processing is not performed on an edge portion of the triangle $Tr_1$ that is located on the downstream side as viewed in the scanning direction, and the intensity value of this edge portion is set to 1, while drawing processing is not performed on an edge portion of the triangle $Tr_2$ that is located on the upstream side as viewed in the scanning direction, and the intensity value of this edge portion is set to 0, as shown in FIG. 29.

In this method for drawing a polygonal pattern wherein intensity processing is performed on edge portions of the pattern in the above manner, edges of each triangle $T_1$, $Tr_2$ are classified into three types: (1) edges (for example, $P_1P_2$ of the triangle $Tr_1$) which are processed in terms of the intensity, (2) edges (for example, $P_2P_3$ of the triangle $Tr_1$) which are drawn but not processed in terms of the intensity, and (3) edges (for example, $P_2P_3$ of the triangle $Tr_2$) which are not drawn.

Figure 31:
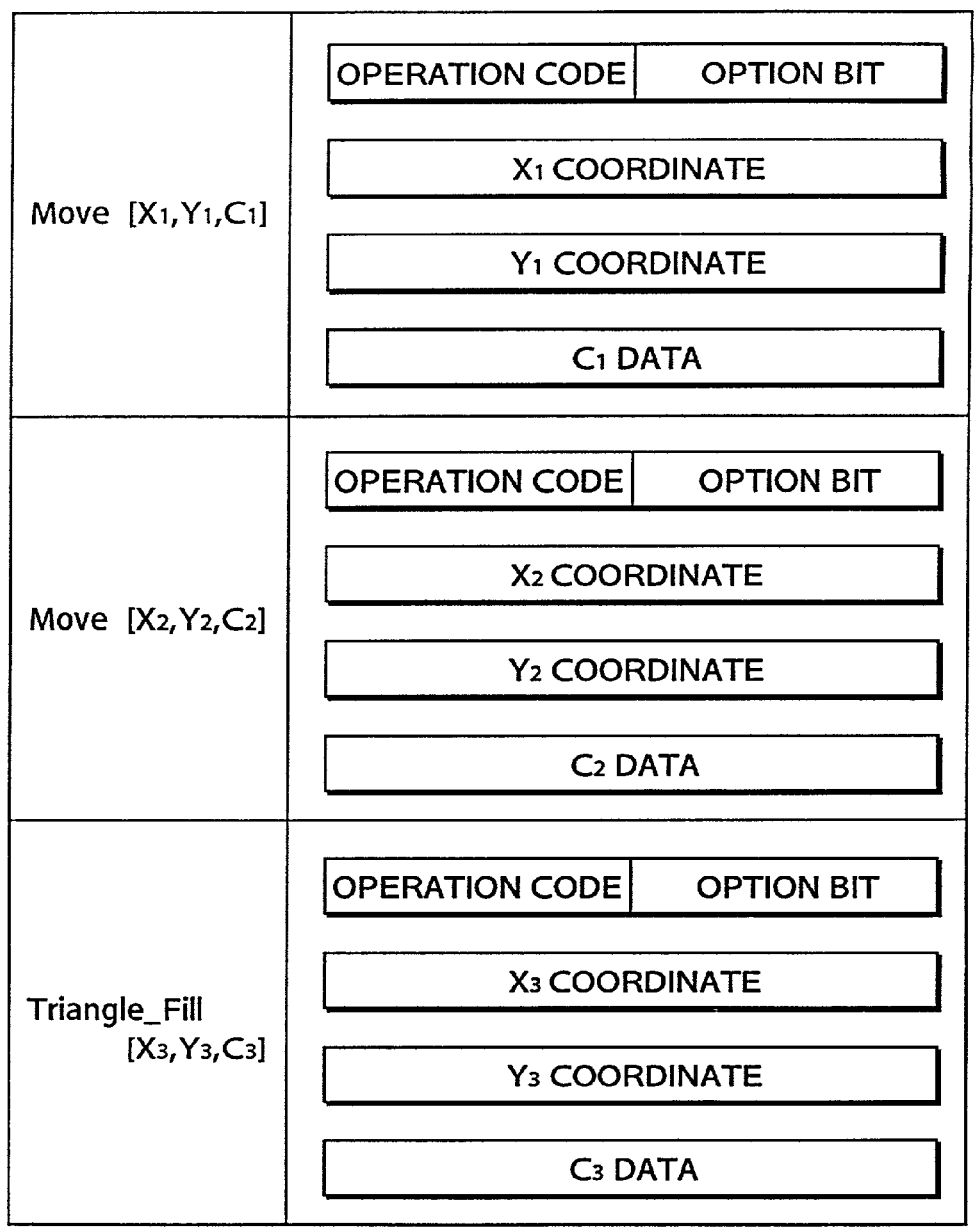
FIG. 31 is a view showing the formats of drawing commands for drawing a triangle.
Figure 32:
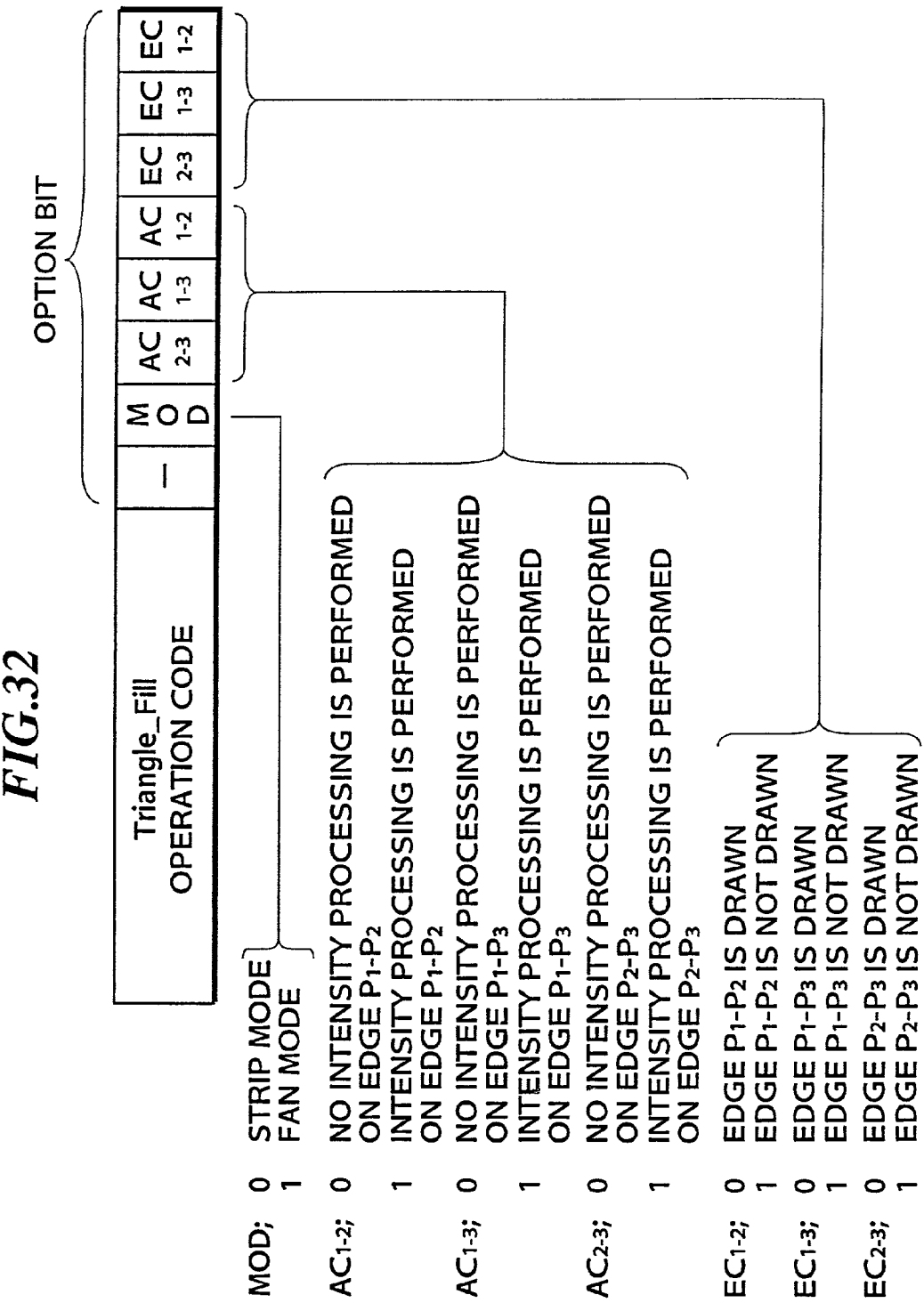
FIG. 32 is a view showing a command code of a Triangle_Fill command in detail.
Figures 33A, 33B:
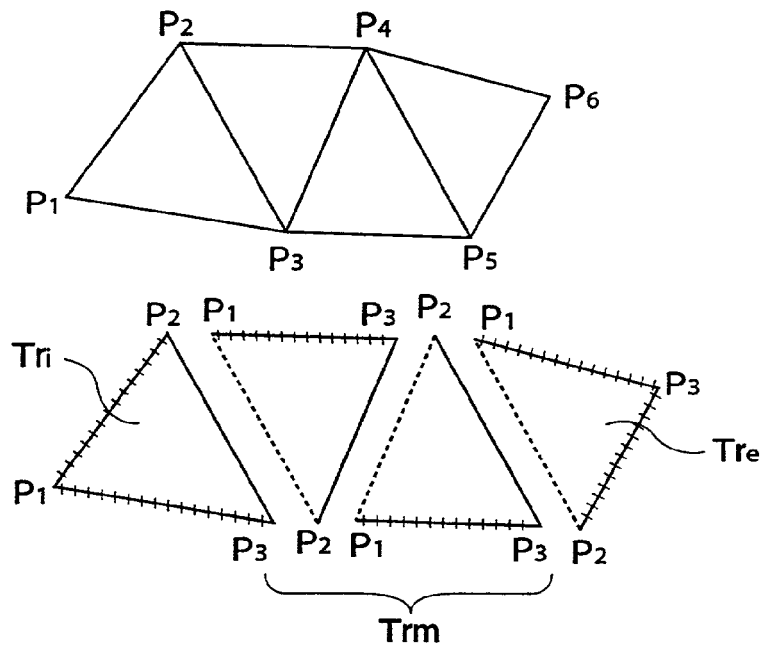
FIG. 33A is a view useful in explaining a method for drawing triangles in STRIP mode.
FIG. 33B is a view showing option bits associated with the triangles of FIG. 33A.

Referring to FIG. 31, the formats of triangle drawing commands Move, Triangle_Fill will be described in more detail. Each command is formed of an operation code which indicates the type of command, such as Move or Triangle_Fill, option bits which serve as control bits, and respective vertex data X, Y, C. Of these commands, a command code of the Triangle_Fill command is illustrated in detail in FIG. 32 by way of example. The option bits which provide control data include: a mode designation bit MOD whose value is 0 when the STRIP mode is selected, and 1 when the FAN mode is selected, intensity processing control bits $AC_{i-j}$ whose value is 0 when intensity processing is not performed on edge $P_iP_j$, and 1 when intensity processing is performed on edge $P_iP_j$, drawing control bits $EC_{i-j}$ whose value is 0 when edge $P_iP_j$ is drawn, and 1 when edge $P_iP_j$ is not drawn. Three control bits $AC_{i-j}$ and three control bits $EC_{i-j}$ are respectively provided for three edges $P_2P_3$, $P_1P_3$, and $P_1P_2$ of a triangle.

Where four triangles are drawn in the STRIP mode as shown in FIG. 33A, therefore, a set of option bits for the first triangle Tri that is first drawn is "–0011000", and a set of option bits for each of the second and third triangles $Tr_m$ that are drawn in the second and third places is "–0010001", while a set of option bits for the last triangle $Tr_e$ that is drawn last is "–0110001", as indicated in the table of FIG. 33B.

Figures 34A, 34B:
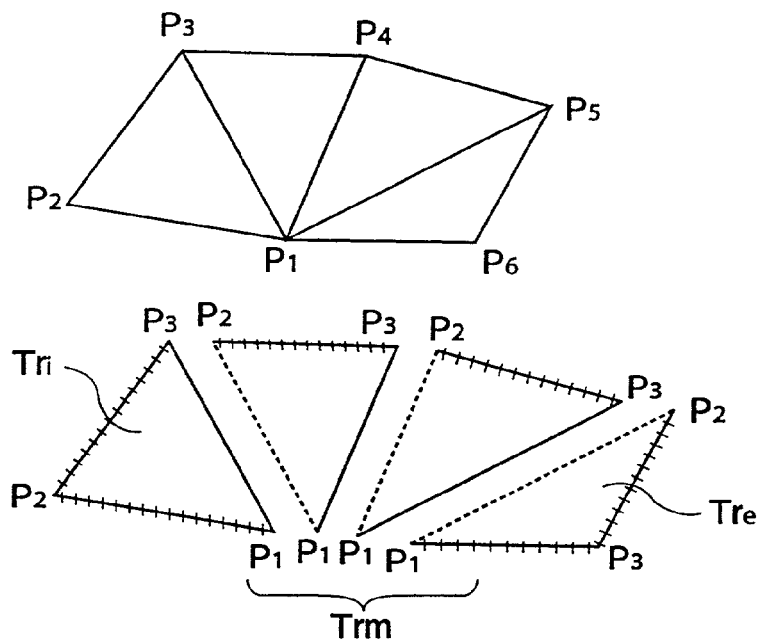
FIG. 34A is a view useful in explaining a method for drawing triangles in FAN mode.
FIG. 34B is a view showing option bits associated with the triangles of FIG. 34A.

Similarly, where four triangles are drawn in the FAN mode as shown in FIG. 34A, a set of option bits for the first triangle Tri that is first drawn is "–0101000", and a set of option bits for each of the second and third triangles $Tr_m$ that are drawn in the second and third places is "–1100001", while a set of option bits for the last triangle $Tr_e$ that is drawn last is "–1110001".

Next, a triangle pattern drawing apparatus according to the third embodiment will be described in detail, which apparatus is adapted to receive polygonal pattern drawing commands as described above so as to draw triangles which provide a polygonal pattern.

FIG. 35 shows the construction of the polygon drawing apparatus of the present embodiment. This apparatus includes a triangle setup circuit 5, an edge calculating circuit 1, a horizontal line processing circuit 2, a pixel processing circuit 3, and a memory 4.

In the polygon drawing apparatus which aims at high-speed processing by means of a hardware, triangles are sequentially drawn along horizontal lines, starting with the uppermost horizontal line, for example. However, drawing commands for drawing a triangle are generated irrespective of this order of drawing the triangles. For this reason, the setup circuit 5 receives the triangle drawing commands Move [$X_1$, $Y_1$, $C_1$], Move [$X_2$, $Y_2$, $C_2$], Triangle_Fill [$X_3$, $Y_3$, $C_3$], and sorts coordinate and attribute data of respective vertices and option bits of respective edges, in accordance with the drawing order, so as to produce vertex data ($X_A$, $Y_A$, $C_A$), ($X_B$, $Y_B$, $C_B$), ($X_C$, $Y_C$, $C_C$), and option bits ($AC_{A-B}$, $AC_{A-C}$, $AC_{B-C}$), ($EC_{A-B}$, $EC_{A-C}$, $EC_{B-C}$).

The edge calculating circuit 1 receives the vertex coordinates $(X_A, Y_A)$, $(X_B, Y_B)$, $(X_C, Y_C)$ of a triangle from the setup circuit 5, and calculates line intersection data associated with intersections between this triangle and each scan line. In this example, the line intersection data for line N is comprised of information in the form of coordinate values $(Y_N, XLe, XLi, XRi, XRe)$ and intensity values $(I_0L, ddIL, I_0R, ddIR)$. The edge calculating circuit 1 determines whether drawing processing and intensity processing should be performed on each edge, according to the option bits $(AC_{A-B}, AC_{A-C}, AC_{B-C})$ and $(EC_{A-B}, EC_{A-C}, EC_{B-C})$ received from the setup circuit 5. The horizontal line processing circuit 2 receives the line intersection data, and produces, for each scan line, coordinate values $(X_P, Y_P)$ for each pixel in the order from the left along the scan line, and intensity value $I_P$ corresponding to that pixel, to supply these values to the pixel processing circuit 3.

The pixel processing circuit 3 produces pixel data corresponding to the intensity value $I_P$, in association with the coordinate values $(X_P, Y_P)$ obtained for each pixel in the horizontal line processing circuit 2, based on attribute data $C_A, C_B, C_C$ of the vertices supplied from the setup circuit 5, and writes the pixel data into the memory 4. In the present embodiment, the intensity value $I_P$ of the pixel ranges from 0 to 1. While the thus obtained value $(I_P)$ may be used as it is as intensity value I, this value $(I_P)$ may be used as an intensity correction coefficient for correcting a dseparately calculated intensity value.

Next, the triangle setup circuit 5 will be described in detail.

Figure 36:
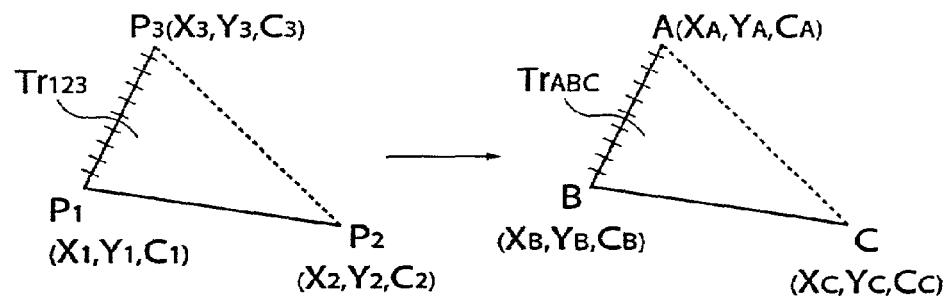
FIG. 36 is a view useful in explaining the function of a triangle setup circuit of the apparatus of FIG. 35.
Figure 37:
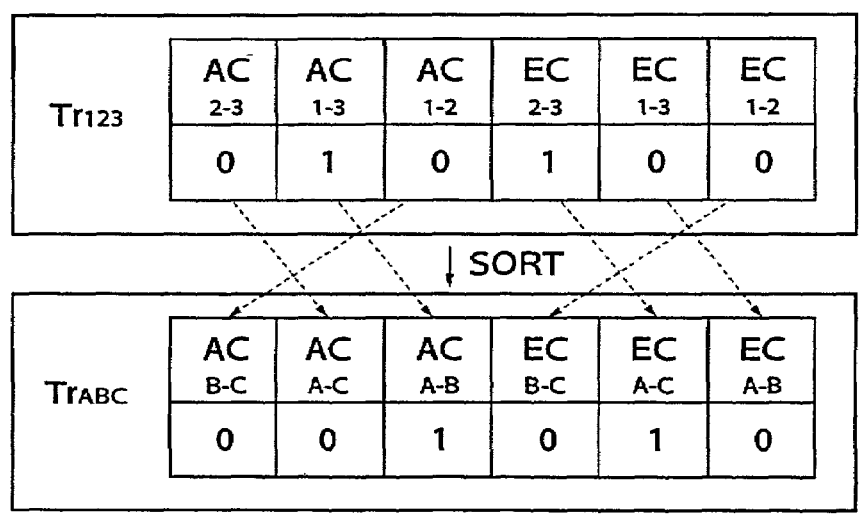
FIG. 37 is a view useful in explaining sorting of optional bits in the triangle setup circuit of FIG. 36.

Referring to FIG. 36, when vertex data P1 $(X_1, Y_1, C_1)$, P2 $(X_2, Y_2, C_2)$ and P3 $(X_3, Y_3, C_3)$ for a triangle $Tr_{123}$ are given, the triangle setup circuit 5 rearranges the given vertex data so as to provide a corresponding triangle $Tr_{ABC}$ in which $Y_A \leq Y_B \leq Y_C$, and produces new vertex data $A(X_A, Y_A, C_A)$, $B(X_B, Y_B, C_B)$ and $C(X_C, Y_C, C_C)$. In accordance with this rearrangement, the option bits for each edge are also rearranged. With regard to the triangle $Tr_{123}$ shown in FIG. 36, for example, edge $P_2P_3$ is determined as an edge that is not drawn, and edge $P_1P_3$ is determined as an edge that is subjected to intensity processing, while edge $P_1P_2$ is determined as an edge that is drawn but not processed in terms of the intensity. Therefore, a set of option bits for this triangle $Tr_{123}$ are set to "010100" as shown in FIG. 37, and this sets of data is sorted or rearranged into "001010" as shown in FIG. 37, in accordance with sorting or rearrangement of the vertex data.

Figure 38:
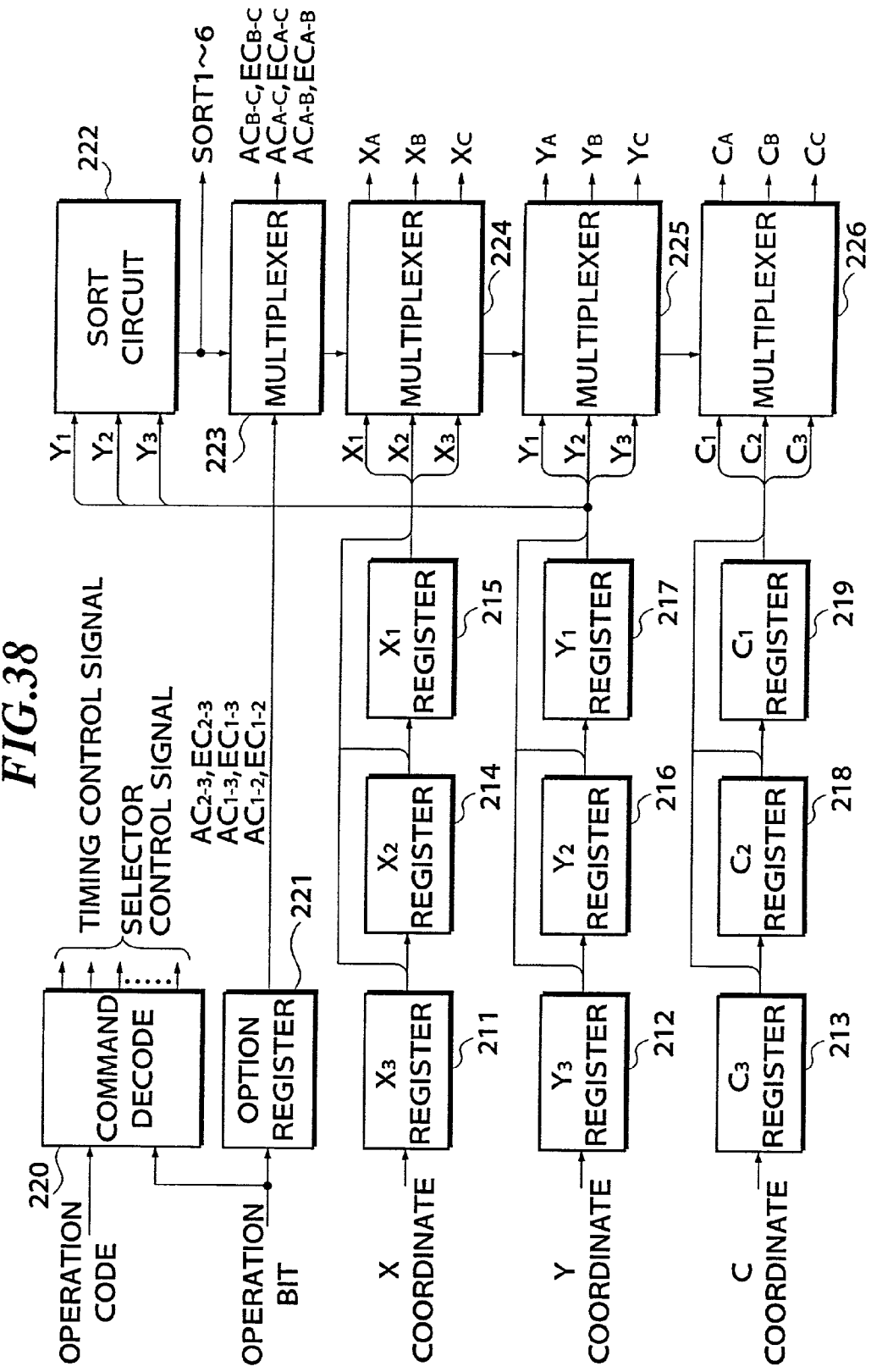
FIG. 38 is a block diagram showing the construction of the triangle setup circuit of the apparatus of FIG. 35.

FIG. 38 shows in detail the construction of the triangle setup circuit 5 which realizes the above-described processing.

Upon receipt of the Move command and Triangle_Fill command, X coordinate data, Y coordinate data and C data are written into a $X_3$ register 211, a $Y_3$ register 212, and a $C_3$ register 213, respectively. If the Triangle Fill command is not generated in the FAN mode, data transmission is performed from the $X_3$ register 211 to an $X_2$ register 214, from the $X_2$ register 214 to an $X_1$ register 215, from the $Y_3$ register 212 to a $Y_2$ register 216, from the $Y_2$ register 216 to a $Y_1$ register 217, from the $C_3$ register 213 to a $C_2$ register 218, and from the $C_2$ register 218 to a $C_1$ register 219. In the FAN mode, data transmission is only performed from the $X_3$ register 211 to the $X_2$ register 214, from the $Y_3$ register 212 to the $Y_2$ register 216, and from the $C_3$ register 213 to the $C_2$ register 218 while the contents of the $X_1$ register 215, $Y_1$ register 217 and $C_1$ register 219 are maintained as they are. These operations are controlled by a command decoding circuit 220 for decoding operation codes. The option bits are stored in an option register 221. A sort circuit 222 determines vertices A, B, C based on the results of comparison between $Y_1, Y_2$ and $Y_3$, and controls multiplexers 223, 224, 225, and 226. As a result, vertex data $(X_A, Y_A, C_A)$, $(X_B, Y_B, C_B)$, $(X_C, Y_C, C_C)$ and option bits $(AC_{A-B}, AC_{A-C}, AC_{B-C})$, $(EC_{A-B}, EC_{A-C}, EC_{B-C})$ which are sorted are generated from the multiplexers 223–226.

Figure 39:
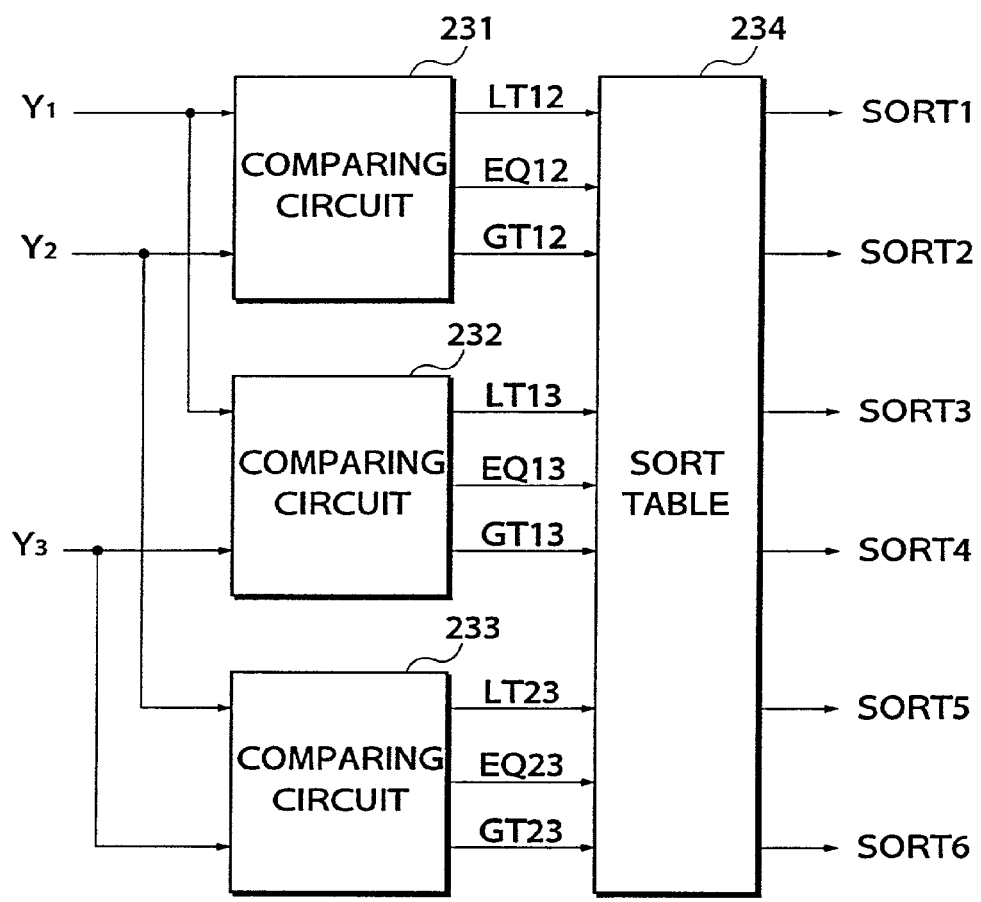
FIG. 39 is a block diagram showing the construction of a sort circuit of the triangle setup circuit of the apparatus of FIG. 35.

As shown in FIG. 39, the sort circuit 222 is comprised of three comparator circuits 231, 232, 233, and a sort table 234 that generates control signals SORT1–SORT6 for controlling the multiplexers 223–226, based on the results of comparison received from the comparator circuits 231–233. The comparator circuit 231 receives coordinate data $Y_1, Y_2$, and sets a flag LT12 to 1 when $Y_1$ is smaller than $Y_2$, sets a flag EQ12 to 1 when $Y_1$ is equal to $Y_2$, and sets a flag GT12 to 1 when $Y_1$ is larger than $Y_2$. The comparator circuits 232, 233 also conduct similar comparison with respect to the coordinate data $Y_1$ and $Y_3$, and $Y_2$ and $Y_3$, respectively, so as to generate flags LT, EQ, GT representing the relationship between these coordinate data. The sort table 234 contains contents as shown in FIG. 40, and generates one of the control signals SORT1–SORT6, based on the relationship in value between the Y coordinate data $Y_1, Y_2$ and $Y_3$. In FIG. 40, the output "—" of the sort table 234 indicates that no triangle can be formed from the corresponding combination of Y1, Y2 and Y3 having relationships as shown in FIG. 40. Then, multiplexer control is performed as shown in the table of FIG. 41, according to each of the control signals SORT1–SORT6.

Next, the edge calculating circuit 1 will be described. The method of calculating coordinate values by the edge calculating circuit 1 and obtaining the coordinate values and intensity values is similar to that of the first embodiment as described with reference to FIG. 5 through FIG. 8, and therefore description thereof is omitted herein.

Figure 42:
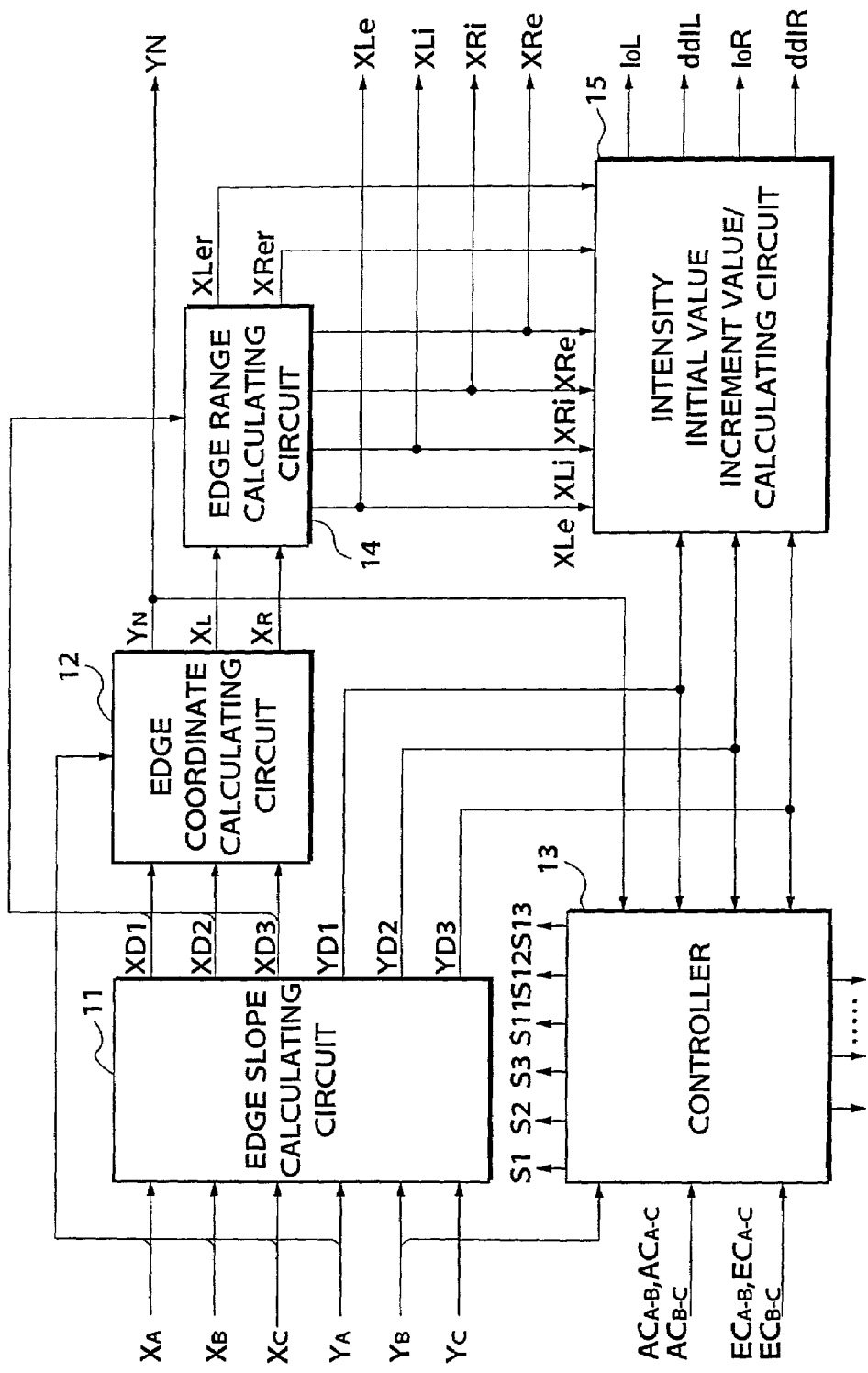
FIG. 42 is a block diagram showing the construction of an edge calculating circuit of the circuit of FIG. 35.
Figure 43:
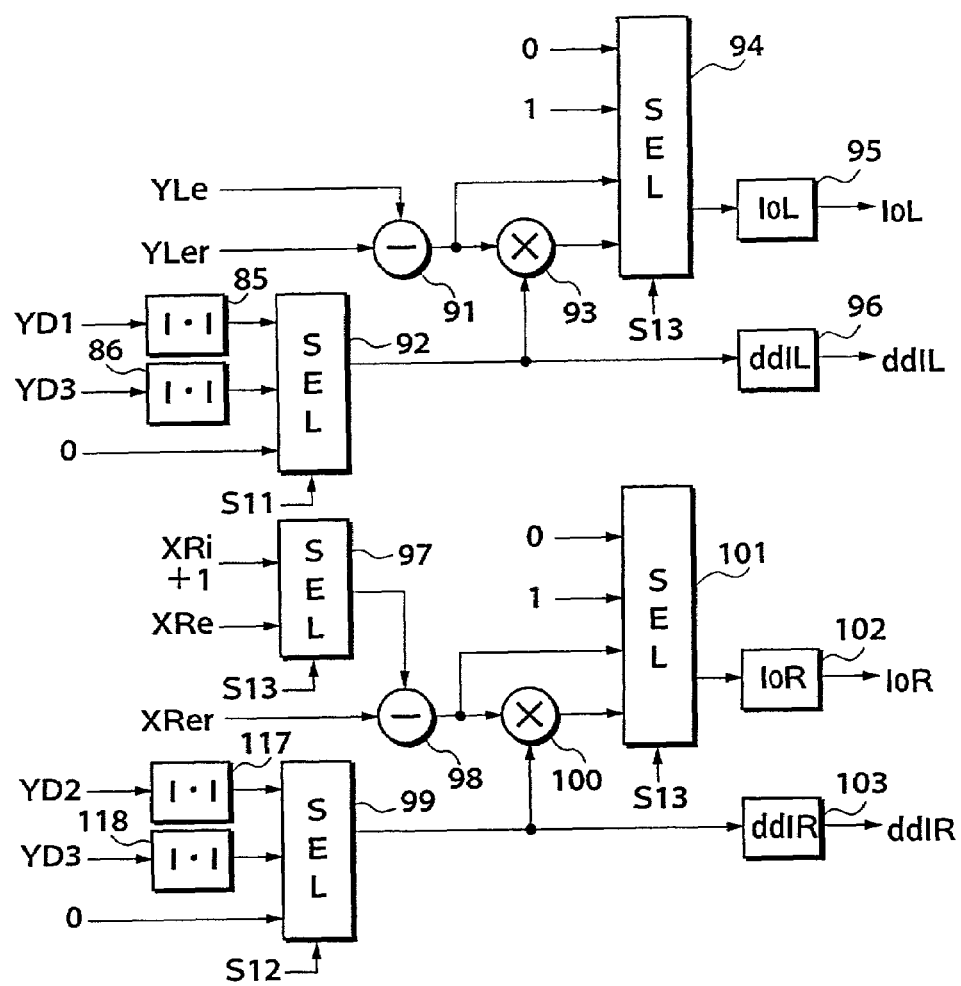
FIG. 43 is a block diagram showing the construction of an intensity initial value/increment value calculating circuit of the circuit of FIG. 42.

The construction of the edge calculating circuit 1 of the present embodiment is basically identical with that of the first embodiment explained above with reference to FIG. 10 through FIG. 14. Referring to FIG. 42 and FIG. 43, only differences between the edge calculating circuit 1 of the present embodiment and that of the first embodiment will be described. In these figures, the same reference numerals as used in FIG. 10 through FIG. 14 showing the first embodiment are used for identifying corresponding elements, of which no detailed description will be provided. FIG. 42 shows the overall construction of the edge calculating circuit 1. The controller 13 receives option bits $(AC_{A-B}, AC_{A-C}, AC_{B-C})$, $(EC_{A-B}, EC_{A-C}, EC_{B-C})$, in addition to the vertex coordinates $Y_B, Y_C$.

In the intensity initial value/increment value calculating circuit 15 as shown in FIG. 43, a selector 92 or 99 selects data "0" for ddIL or ddIR, and a selector 94 or 101 selects data "0" for the initial value $I_0L$ or $I_0R$, in the case where it is determined that the right edge or left edge that is presently processed is not to be drawn. Where it is determined that the right edge or left edge is drawn but not to be processed in terms of the intensity, the selector 92 or 99 selects data "0" for ddIL or ddIR, and the selector 94 or 101 selects data "1" for the initial value $I_0L$ or $I_0R$. The controller 13 generates control signals S11, S12, S13 for controlling the selectors 92, 99, 94 and 101, based on the relationship in value between $Y_N$ and $Y_B$ and $Y_N$ and $Y_C$, and the option bits $(AC_{A-B}, AC_{A-C}, AC_{B-C})$, $(EC_{A-B}, EC_{A-C}, EC_{B-C})$.

The construction of the horizontal line processing circuit 2 is similar to that of the first embodiment as described above with reference to FIG. 15, and therefore description thereof is omitted herein.

Figure 44:
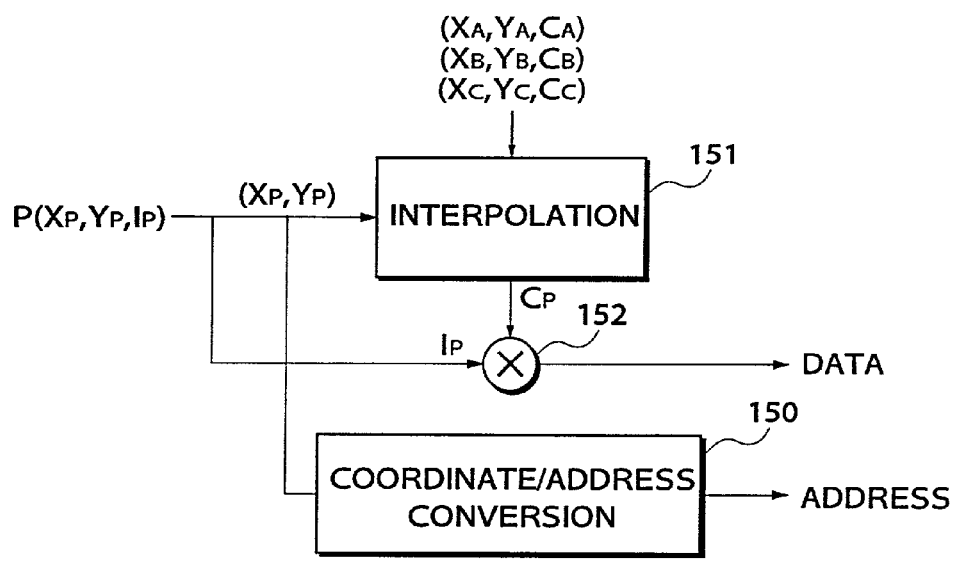
FIG. 44 is a block diagram showing the construction of a pixel processing circuit of the apparatus of FIG. 35.

FIG. 44 shows the construction of the pixel processing circuit 3 of the apparatus of FIG. 35. The pixel processing circuit 3 is comprised of a coordinate/address conversion circuit 150, an interpolation circuit 151, and a multiplier 152. The pixel processing circuit 3 receives data $(X_P,Y_P,I_P)$, i.e. coordinate data $(X_P,Y_P)$ of each pixel and the intensity value $I_P$ corresponding to the pixel from the horizontal line processing circuit 2, and coordinate data representing coordinates of vertices of a triangle and attribute (color) data $(X_A,Y_A,C_A)$, $(X_B,Y_B,C_B)$, $(X_C,Y_C,C_C)$ from the triangle setup circuit 5, respectively. The coordinate/address conversion circuit 150 converts the coordinate data $(X_P,Y_P)$ to an address value. The interpolation circuit 151 performs an interpolation according to a conventional shading method as known e.g. from U.S. Pat. No. 5,418,901 to calculate color data $C_P$ for each pixel corresponding to the coordinate data $(X_P,Y_P)$ of each pixel, based on the data $(X_A,Y_A,C_A)$, $(X_B,Y_B,C_B)$, $(X_C,Y_C,C_C)$. The multiplier 152 multiplies the calculated color data $C_P$ by the intensity value $I_P$, and writes the result of multiplication into the memory 4 at an address location corresponding to the address value from the coordinate/address conversion circuit 150.

According to the present embodiment as described above, the intensity values of pixels can be sequentially calculated along each scan line, thus permitting high-speed processing. With respect to such edges that are determined not to be subjected to intensity processing and such edges that are determined not to be drawn, according to the drawing commands, the initial value of the intensity value is set to 1 and 0, respectively, and the increment value is set to 0, whereby the control for selectively drawing or performing intensity processing can be performed in the same processing that is performed for edges that are subjected to intensity processing.

Furthermore, a triangle drawing command including a control bit that indicates whether each edge of a triangle is to be drawn or not is received, and an intensity value of the edge is determined based on this drawing command, during drawing processing of the triangle. If the drawing command for the edge that may be drawn twice contains a control bit that instructs that the edge should not be drawn, therefore, this edge portion is not drawn twice. Thus, even if the intensity values of the pixels at an adjoining edge portion are determined according to logic operation or mixing processing, the intensity value of this portion is not so different from those of the other portions, thus realizing the processing for naturally and smoothly drawing a polygon.

While edge processing for a triangle has been explained in each of the illustrated embodiments, it is to be understood that this processing may be applied to edge processing for other polygonal patterns. Also, while the intensity values of points on a grid are calculated in the illustrated embodiments, the intensity values of real intersecting points may be calculated, and correction may be made to these values during horizontal line processing.

While polygon drawing processing of each of the illustrated embodiment is accomplished by performing respective operations in corresponding elements of a hardware, these operations may be realized by means of software. In this case, it is possible to provide a suitable recording or storage medium, such as a floppy disk, optical disk, or HDD, in which is recorded a program that executes the method of performing the polygon drawing processing as described above.

What is claimed is:

1. A polygon drawing apparatus which draws a polygon by performing intensity processing on a polygon to be drawn using an anti-aliasing method based on an intensity value generated by an intensity value generating device, said intensity value generating device comprising:

an edge calculating device which calculates line intersection data associated with an intersecting portion between each of edges of the polygon to be drawn, for a given one scan line, using vertex coordinates of the polygon to be drawn, the line intersection data including a first pair of outside intersection and inside intersection that represent intersecting positions between said given one scan line and one of the edges that is located on an upstream side as viewed in a scanning direction, a second pair of outside intersection and inside intersection that represent intersection positions between said given one scan line and one of the edges that is located on a downstream side as viewed in the scanning direction, an increasing rate at which an intensity value increases from the outside intersection to the inside intersection of said first pair, and a decreasing rate at which the intensity value decreases from the inside intersection to the outside intersection of said second pair, wherein the line intersection data is determined based on trajectories obtained by dragging a diamond-like box between vertices of the polygon to be drawn, said diamond-like box having diagonal dimensions in two coordinate axis directions and each of the diagonal dimensions being equal to a arid width; and a scan line processing device which calculates with respect to said given one scan line the intensity value to be given to each portion of the polygon in the scanning direction, based on the line intersection data calculated for said given one scan line by said edge calculating devices, wherein said edge calculating device and said scan line processing device operate alternately during processing for said given one scan line, whereby a polygon is drawn.

2. A polygon drawing apparatus according to claim 1, wherein said edge calculating device comprises:

means for calculating a first pair of positions on lattice points of displayed grid boxes that are located adjacent, respectively, to a pair of real intersections between said given one scan line and said one of said edges that is located on the upstream side as viewed in the scanning direction, on the downstream side as viewed in the scanning direction, to obtain said first pair of outside intersection and inside intersection;

means for calculating a second pair of positions on lattice points of the displayed grid boxes that are located adjacent, respectively, to a pair of real intersections between said given one scan line and said one of said edges that is located on the downstream side as viewed in the scanning direction, on the upstream side as viewed in the scanning direction, to obtain said second pair of outside intersection and inside intersection; and means for calculating a first initial value from the intensity value at the outside intersection of said first pair, and a second initial value from the intensity value at a lattice point of one of the displayed grid boxes that is located adjacent to the inside intersection of said second pair on the downstream side as viewed in the scanning direction.

3. A polygon drawing apparatus according to claim 2, wherein said scan line processing device comprises:

means for generating the intensity value to be given to each portion of the polygon along the scanning direction in a range from the outside intersection to the inside intersection of said first pair for said given one scan line, by progressively increasing the intensity value at said increasing rate in said range from the outside intersection to the inside intersection of said first pair for said given one scan line;

means for generating a constant intensity value to be given to each portion of said polygon along the scanning direction in a range from the inside intersection of said first pair to the inside intersection of said second pair for said given one scan line; and means for generating the intensity value to be given to each portion of the polygon along the scanning direction in a range from the inside intersection to the outside intersection of said second pair for said given one scan line, by progressively decreasing the intensity value at said decreasing rate in said range from the inside intersection to the outside intersection of said second pair for said given one scan line.

4. A polygon drawing apparatus according to claim 3, wherein said increasing rate is determined based on a slope of the edge on the upstream side as viewed in the scanning direction, and said decreasing rate is determined based on a slope of the edge on the downstream side as viewed in the scanning direction.

5. A polygon drawing apparatus according to claim 1, wherein said scan line processing device comprises:

means for generating the intensity value to be given to each portion of the polygon along the scanning direction in a range from the outside intersection to the inside intersection of said first pair for said given one scan line, by progressively increasing the intensity value at said increasing rate in said range from the outside intersection to the inside intersection of said first pair for said given one scan line;

means for generating a constant intensity value to be given to each portion of said polygon along the scanning direction in a range from the inside intersection of said first pair to the inside intersection of said second pair for said given one scan line; and means for generating the intensity value to be given to each portion of the polygon along the scanning direction in a range from the inside intersection to the outside intersection of said second pair for said given one scan line, by progressively decreasing the intensity value at said decreasing rate in said range from the inside intersection to the outside intersection of said second pair for said given one scan line.

6. A polygon drawing apparatus according to claim 5, wherein said increasing rate is determined based on a slope of the edge on the upstream side as viewed in the scanning direction, and said decreasing rate is determined based on a slope of the edge on the downstream side as viewed in the scanning direction.

7. A polygon drawing method of drawing a polygon by performing intensity processing on a polygon to be drawn using an anti-aliasing method based on an intensity value generated by an intensity value generating step, said intensity value generating step comprising:

an edge calculating step of calculating line intersection data associated with an intersecting portion between each of edges of the polygon to be drawn, for a given one scan line, using vertex coordinates of the polygon to be drawn, said line intersection data including a first pair of outside intersection and inside intersection that represent intersecting positions between said given one scan line and one of the edges that is located on an upstream side as viewed in a scanning direction, a second pair of outside intersection and inside intersection that represent intersection positions between said given one scan line and one of the edges that is located on a downstream side as viewed in the scanning direction, an increasing rate at which an intensity value increases from the outside intersection to the inside intersection of said first pair, and a decreasing rate at which the intensity value decreases from the inside intersection to the outside intersection of said second pair, wherein the line intersection data is determined based on trajectories obtained by dragging a diamond-like box between vertices of the polygon to be drawn, said diamond-like box having diagonal dimensions in two coordinate axis directions and each of the diagonal dimensions being equal to a arid width; and a scan line processing step which calculates with respect to said given one scan line the intensity value to be given to each portion of the polygon in the scanning direction, based on the line intersection data calculated for said given one scan line by said edge calculating step, wherein said edge calculating step and said scan line processing step operate alternately during processing for said given one scan line, whereby a polygon is drawn.

8. A storage medium which stores a program that enables implementation of a method of drawing a polygon by performing intensity processing on a polygon to be drawn using an anti-aliasing method based on an intensity value generated by an intensity value generating module, said intensity value generating module comprising:

an edge calculating module of calculating line intersection data associated with an intersecting portion between each of edges of the polygon to be drawn, for a given one scan line, using vertex coordinates of the polygon to be drawn, said line intersection data including a first pair of outside intersection and inside intersection that represent intersecting positions between said given one scan line and one of the edges that is located on an upstream side as viewed in a scanning direction, a second pair of outside intersection and inside intersection that represent intersection positions between said given one scan line and one of the edges that is located on a downstream side as viewed in the scanning direction, an increasing rate at which an intensity value increases from the outside intersection to the inside intersection of said first pair, and a decreasing rate at which the intensity value decreases from the inside intersection to the outside intersection of said second pair, wherein the line intersection data is determined based on trajectories obtained by dragging a diamond-like box between vertices of the polygon to be drawn, said diamond-like box having diagonal dimensions in two coordinate axis directions and each of the diagonal dimensions being equal to a grid width; and a scan line processing module which sequentially calculates with respect to said given one scan line the intensity value to be given to each portion of the polygon in the scanning direction, based on the line intersection data calculated for said given one scan line by said edge calculating module, wherein said edge calculating module and said scan line processing module operate alternately during processing for said given one scan line, whereby a polygon is drawn.

9. A polygon drawing apparatus which draws a polygon by drawing a polygon by performing intensity processing on a polygon to be drawn using an anti-aliasing method based on an intensity value generated by an intensity value generating device, said intensity value generating device comprising:

an edge calculating device which calculates line intersection data associated with an intersecting portion between each of edges of the polygon to be drawn, for a given one scan line, using vertex coordinates of the polygon to be drawn, said line intersection data including a first pair of outside intersection and inside intersection that represent intersecting positions between said given one scan line and one of the edges that is located on an upstream side as viewed in a scanning direction, a second pair of outside intersection and inside intersection that represent intersection positions between said given one scan line and one of the edges that is located on a downstream side as viewed in the scanning direction, an increasing rate at which an intensity value increases from the outside intersection to the inside intersection of said first pair, and a decreasing rate at which the intensity value decreases from the inside intersection to the outside intersection of said second pair, wherein the line intersection data is determined based on trajectories obtained by dragging a diamond-like box between vertices of the polygon to be drawn, said diamond-like box having diagonal dimensions in two coordinate axis directions and each of the diagonal dimensions being equal to a grid width; and a scan line processing device which calculates with respect to said given one scan line the intensity value to be given to each portion of the polygon in the scanning direction, based on the line intersection data calculated for said given one scan line by said edge calculating device, by performing first processing for calculating changes in the intensity value from the outside intersection to the inside intersection of said first pair for each scan line, second processing for calculating changes in the intensity value from the inside intersection to the outside intersection of said second pair for each scan line, and third processing for combining results obtained in said first processing and said second processing, said first processing, said second processing and said third processing being performed in parallel with each other, wherein said edge calculating device and said scan line processing device operate alternately during processing for said given one scan line, whereby a polygon is drawn.

10. A polygon drawing apparatus according to claim 9, wherein said edge calculating device comprises:

means for calculating a first pair of positions on lattice points of displayed grid boxes that are located adjacent, respectively, to a pair of real intersections between said given one scan line and said one of said edges that is located on the upstream side as viewed in the scanning direction, on the downstream side as viewed in the scanning direction, to obtain said first pair of outside intersection and inside intersection;

means for calculating a second pair of positions on lattice points of the displayed grid boxes that are located adjacent, respectively, to a pair of real intersections between said given one scan line and said one of said edges that is located on the downstream side as viewed in the scanning direction, to obtain said second pair of outside intersection and inside intersection; and means for calculating a first initial value from the intensity value at the outside intersection of said first pair, and a second initial value from the intensity value at a lattice point of one of displayed grid boxes that is located adjacent to the inside intersection of said second pair on the downstream side as viewed in the scanning direction.

11. A polygon drawing apparatus according to claim 10, wherein said scan processing device comprises:

means for performing said first processing by generating the intensity value by progressively increasing the intensity value at said increasing rate in a range from the outside intersection to the inside intersection of said first pair for said given one scan line and generating a constant intensity value in a range following the inside intersection of said first pair;

means for performing said second processing by generating the intensity value by progressively decreasing the intensity value at an absolute value of said decreasing rate in a range from the inside intersection to the outside intersection of said second pair for said given one scan line and generating said constant intensity value in a range following the outside intersection of said second pair; and means for performing said third processing by subtracting a result of said second processing from a result of said first processing.

12. A polygon drawing apparatus according to claim 10, wherein when a vertex other than vertices at upper and lower ends of the polygon is located between two adjacent scan lines, said scan processing device separately performs processing based on a first distance from the upper one of the two adjacent scan lines to said vertex, and performs processing based on a second distance from the lower one of the two adjacent scan lines to said vertex, and calculates the intensity value by combining results of said processing based on said first distance and said processing based on said second distance.

13. A polygon drawing apparatus according to claim 11, wherein said increasing rate is determined based on a slope of the edge on the upstream side as viewed in the scanning direction, and said decreasing rate is determined based on a slope of the edge on the downstream side as viewed in the scanning direction.

14. A polygon drawing apparatus according to claim 11, wherein when a vertex of the polygon is located between two adjacent scan lines, said scan processing device sets said constant intensity value to a value that depends upon a distance from one of the two adjacent scan lines to said vertex.

15. A polygon drawing apparatus according to claim 9, wherein said scan processing device comprises:

means for performing said first processing by generating the intensity value by progressively increasing the intensity value at said increasing rate in a range from the outside intersection to the inside intersection of said first pair for said given one scan line and generating a constant intensity value in a range following the inside intersection of said first pair;

means for performing said second processing by generating the intensity value by progressively decreasing the intensity value at an absolute value of said decreasing rate in a range from the inside intersection to the outside intersection of said second pair for said given one scan line and generating said constant intensity value in a range following the outside intersection of said second pair; and means for performing said third processing by subtracting a result of said second processing from a result of said first processing.

16. A polygon drawing apparatus according to claim 15, wherein said increasing rate is determined based on a slope of the edge on the upstream side as viewed in the scanning direction, and said decreasing rate is determined based on a slope of the edge on the downstream side as viewed in the scanning direction.

17. A polygon drawing apparatus according to claim 15, wherein when a vertex of the polygon is located between two adjacent scan lines, said scan processing device sets said constant intensity value to a value that depends upon a distance from one of the two adjacent scan lines to said vertex.

18. A polygon drawing apparatus according to claim 9, wherein when a vertex other than vertices at upper and lower ends of the polygon is located between two adjacent scan lines, said scan processing device separately performs processing based on a first distance from the upper one of the two adjacent scan lines to said vertex, and performs processing based on a second distance from the lower one of the two adjacent scan lines to said vertex, and calculates the intensity value by combining results of said processing based on said first distance and said processing based on said second distance.

19. A polygon drawing method of drawing a polygon by performing intensity processing on a polygon to be drawn, using an anti-aliasing method based on an intensity value generated by an intensity value generating step, said intensity value generating step comprising:

an edge calculating step of calculating line intersection data associated with an intersecting portion between each of edges of the polygon to be drawn, for a given one scan line, using vertex coordinates of the polygon to be drawn, said line intersection data including a first pair of outside intersection and inside intersection that represent intersecting positions between said given one scan line and one of the edges that is located on an upstream side as viewed in a scanning direction, a second pair of outside intersection and inside intersection that represent intersection positions between said given one scan line and one of the edges that is located on a downstream side as viewed in the scanning direction, an increasing rate at which an intensity value increases from the outside intersection to the inside intersection of said first pair, and a decreasing rate at which the intensity value decreases from the inside intersection to the outside intersection of said second pair, wherein the line intersection data is determined based on trajectories obtained by dragging a diamond-like box between vertices of the polygon to be drawn, said diamond-like box having diagonal dimensions in two coordinate axis direction and each of the diagonal dimensions being equal to a grid width; and a scan line processing step of calculating with respect to said given one scan line the intensity value to be given to each portion of the polygon in the scanning direction, based on the line intersection data calculated for said given one scan line by said edge calculating step, by performing first processing for calculating changes in the intensity value from the outside intersection to the inside intersection of said first pair for each scan line; second processing for calculating changes in the intensity value from the inside intersection to the outside intersection of said second pair for each scan line, and third processing for combining results obtained in said first processing and said second processing, said first processing, said second processing and said third processing being performed in parallel with each other, wherein said edge calculating step and said scan line processing step operate alternately during processing for said given one scan line, whereby a polygon is drawn.

20. A storage medium which stores a program that enables implementation of a method of drawing a polygon by performing intensity processing on a polygon to be drawn using an anti-aliasing method based on an intensity value generated by an intensity value generating module, said intensity value generating module comprising:

an edge calculating module of calculating line intersection data associated with an intersecting portion between each of edges of the polygon to be drawn, for a given one scan line, using vertex coordinates of the polygon to be drawn, said line intersection data including a first pair of outside intersection and inside intersection that represent intersecting positions between said given one scan line and one of the edges that is located on an upstream side as viewed in a scanning direction, a second pair of outside intersection and inside intersection that represent intersection positions between said given one scan line and one of the edges that is located on a downstream side as viewed in the scanning direction, an increasing rate at which an intensity value increases from the outside intersection to the inside intersection of said first pair, and a decreasing rate at which the intensity value decreases from the inside intersection to the outside intersection of said second pair, wherein the line intersection data is determined based on trajectories obtained by dragging a diamond-like box between vertices of the polygon to be drawn, said diamond-like box having diagonal dimensions in two coordinate axis directions and each of the diagonal dimensions being equal to a grid width; and a scan line processing module of calculating with respect to said given one scan line the intensity value to be given to each portion of the polygon in the scanning direction, based on the line intersection data calculated for said given one scan line by said edge calculating module, by performing first processing for calculating changes in the intensity value from the outside intersection to the inside intersection of said first pair for each scan line; second processing for calculating changes in the intensity value from the inside intersection to the outside intersection of said second pair for each scan line, and third processing for combining results obtained in said first processing and said second processing, said first processing, said second processing and said third processing being performed in parallel with each others wherein said edge calculating module and said scan line processing module operate alternately during processing for said given one scan line, whereby a polygon is drawn.

21. A polygon drawing apparatus which draws a polygon by combining a plurality of triangles and by performing intensity processing on a polygon to be drawn using an anti-aliasing method based on an intensity value generated by an intensity value generating device, said intensity value generating device comprising:

an edge calculating device which receives a drawing command including vertex coordinates of each of the triangles to be drawn and a control bit which indicates whether each edge of each of the triangles is to be drawn, and calculates line intersection data relating to a position of an intersecting portion between said each edge of each of the triangles for a given one scan line, using the vertex coordinates of each of the triangles to be drawn and the control bit, and an intensity value of the intersecting portion, based on said control bit, wherein the line intersection data is determined based on trajectories obtained by dragging a diamond-like box between vertices of each of the triangles to be drawn, said diamond-like box having diagonal dimensions in two coordinate axis directions and each of the diagonal dimensions being equal to a grid width; and a scan line processing device which calculates with respect to said given one scan line the intensity value to be given to each portion of each of the triangles in the scanning direction, based on the line intersection data calculated for said given one scan line by said edge calculating device, wherein said edge calculating device and said scan line processing device operate alternately during processing for said given one scan line, whereby a polygon is drawn.

22. A polygon drawing apparatus which draws a polygon by combining a plurality of triangles and by performing intensity processing on the plurality of triangles to be drawn using an anti-aliasing method based on an intensity value generated by an intensity value generating device, said intensity value generating device comprising:

an edge calculating device which receives a drawing command including vertex coordinates of each of the triangles to be drawn and a control bit which indicates whether intensity processing is to be performed on each edge of each of the triangles, and calculates line intersection data associated with an intersecting portion between each edge of each of the triangles to be drawn for a given one scan line, using the vertex coordinates of each of the triangles to be drawn and the control bit, said line intersection data including a first pair of outside intersection and inside intersection that represent intersecting positions between said given one scan line and one of the edges that is located on an upstream side as viewed in a scanning direction, a second pair of outside intersection and inside intersection that represent intersection positions between said given one scan line and one of the edges that is located on a downstream side as viewed in the scanning direction, an increasing rate at which an intensity value increases from the outside intersection to the inside intersection of said first pair, a decreasing rate at which the intensity value decreases from the inside intersection to the outside intersection of said second pair, and an intensity value that is set to 1 when said control bit indicates that no intensity processing is to be performed on said each edge of each of the triangles, wherein the line intersection data is determined based on trajectories obtained by dragging a diamond-like box between vertices of each of the triangles to be drawn, said diamond-like box having diagonal dimensions in two coordinate axis directions and each of the diagonal dimensions being equal to a grid width; and a scan line processing device which calculates with respect to said given one scan line the intensity value to be given to each portion of each of the triangles in the scanning direction, based on the line intersection data calculated for said given one scan line by said edge calculating device, wherein said edge calculating device and said scan line processing device operate alternately during processing for said given one scan line, whereby a polygon is drawn.

23. A polygon drawing apparatus which draws a polygon by combining a plurality of triangles and by performing intensity processing on the plurality of triangles to be drawn using an anti-aliasing method based on an intensity value generated by an intensity value generating device, said intensity value generating device comprising:

an edge calculating device which receives a drawing command including vertex coordinates of each of the triangles to be drawn and a first control bit which indicates whether each edge of each of the triangles is to be drawn, and a second control bit which indicates whether intensity processing is to be performed on each edge of each of the triangles, and calculates line intersection data associated with an intersecting portion between each edge of each of the triangles to be drawn for a given one scan line, using the vertex coordinates of each of the triangles to be drawn and the first and second control bits, said line intersection data including a first pair of outside intersection and inside intersection that represent intersecting positions between said given one scan line and one of the edges that is located on an upstream side as viewed in a scanning direction, a second pair of outside intersection and inside intersection that represent intersection positions between said given one scan line and one of the edges that is located on a downstream side as viewed in the scanning direction, an increasing rate at which an intensity value increases from the outside intersection to the inside intersection of said first pair, a decreasing rate at which the intensity value decreases from the inside intersection to the outside intersection of said second pair, and an intensity value that is set to 0 when said first control bit indicates that said each edge of each of the triangles is not to be drawn, said intensity value being set to 1 when said second control bit indicates that the intensity processing is not to be performed on said each edge of each of the triangles, wherein the line intersection data is determined based on trajectories obtained by dragging a diamond-like box between vertices of each of the triangles to be drawn, said diamond-like box having diagonal dimensions in two coordinate axis directions and each of the diagonal dimensions being equal to a grid width; and a scan line processing device which calculates with respect to said given one scan line the intensity value to be given to each portion of each of the triangles in the scanning direction, based on the line intersection data calculated for said given one scan line by said edge calculating device, wherein said edge calculating device and said scan line processing device operate alternately during processing for said given one scan line, whereby a polygon is drawn.

24. A polygon drawing method of drawing a plurality of triangles so as to draw a polygon by combining the plurality of triangles and by performing intensity processing on a polygon to be drawn using an anti-aliasing method based on an intensity value generated by an intensity value generating step, said intensity value generating step comprising the steps of:

inputting a drawing command including vertex coordinates of each of the triangles to be drawn and a control bit which indicates whether each edge of each of the triangles is to be drawn;

an edge calculating step of calculating line intersection data relating to a position of an intersecting portion between said each edge of each of the triangles for a given one scan line, using the vertex coordinates of each of the triangles to be drawn and the control bit, and an intensity value of the intersecting portion, based on said control bit, wherein the line intersection data is determined based on trajectories obtained by dragging a diamond-like box between vertices of each of the triangles to be drawn, said diamond-like box having diagonal dimensions in two coordinate axis directions and each of the diagonal dimensions being equal to a grid width, wherein the line intersection data is determined based on trajectories obtained by dragging a diamond-like box between vertices of the polygon to be drawn, said diamond-like box having diagonal dimensions in two coordinate axis directions and each of the diagonal dimensions being equal to a arid width; and a scan line processing step of calculating with respect to said given one scan line the intensity value to be given to each portion of each of the triangles in the scanning direction, based on the line intersection data calculated for said given one scan line by said edge calculating step, wherein said edge calculating step and said scan line processing step operate alternately during processing for said given one scan line, whereby a polygon is drawn.

25. A polygon drawing method according to claim 24, wherein the intensity value is determined by a ratio of an intensity value of a pixel that is to be drawn, to an intensity value of a pixel that is originally located at a position where the pixel to be drawn exists, and wherein when said control bit indicates that said each edge of each of the triangles is not to be drawn, the intensity value of the pixel to be drawn is set to 0.

26. A polygon drawing method of drawing a polygon by combining a plurality of triangles and by performing intensity processing on the plurality of triangles to be drawn using an anti-aliasing method based on an intensity value generated by an intensity value generating step, said intensity value generating step comprising the steps of:

inputting a drawing command including vertex coordinates of each of the triangles to be drawn and a control bit which indicates whether intensity processing is to be performed on each edge of each of the triangles;

an edge calculating step of calculating line intersection data relating to a position of an intersecting portion between said each edge of each of the triangles for a given one scan line, using the vertex coordinates of each of the triangles to be drawn and the control bit, and an intensity value of the intersecting portion, based on said control bit, wherein the line intersection data is determined based on trajectories obtained by dragging a diamond-like box between vertices of each of the triangles to be drawn, said diamond-like box having diagonal dimensions in two coordinate axis directions and each of the diagonal dimensions being equal to a grid width, wherein the line intersection data is determined based on trajectories obtained by dragging a diamond-like box between vertices of the polygon to be drawn, said diamond-like box having diagonal dimensions in two coordinate axis directions and each of the diagonal dimensions being equal to a grid width; and a scan line processing step of calculating with respect to said given one scan line the intensity value to be given to each portion of each of the triangles in the scanning direction, based on the line intersection data calculated for said given one scan line by said edge calculating step, wherein said edge calculating step and said scan line processing step operate alternately during processing for said given one scan line, whereby a polygon is drawn.

27. A polygon drawing method according to claim 26, wherein the intensity value is determined by a ratio of an intensity value of a pixel that is to be drawn to an intensity value of a pixel that is originally located at a position where the pixel to be drawn exists, and wherein when said control bit indicates that the intensity processing is not to be performed on said each edge of each of the triangles, the intensity value of the pixel to be drawn is set to 1.

28. A polygon drawing method of drawing a polygon by combining a plurality of triangles and by performing intensity processing on the plurality of triangles to be drawn using an anti-aliasing method based on an intensity value generated by an intensity value generating step, said intensity value generating step comprising the steps of:

inputting a drawing command including vertex coordinates of each of the triangles to be drawn and a first control bit which indicates whether each edge of each of the triangles is to be drawn, and a second control bit which indicates whether intensity processing is to be performed on each edge of each of the triangles;

an edge calculating step of calculating line intersection data relating to a position of an intersecting portion between said each edge of each of the triangles for a given one scan line, using the vertex coordinates of each of the triangles to be drawn and the control bit, and an intensity value of the intersecting portion, based on said control bit, wherein the line intersection data is determined based on trajectories obtained by dragging a diamond-like box between vertices of each of the triangles to be drawn, said diamond-like box having diagonal dimensions in two coordinate axis directions and each of the diagonal dimensions being equal to a grid width, wherein the line intersection data is determined based on trajectories obtained by dragging a diamond-like box between vertices of the polygon to be drawn, said diamond-like box having diagonal dimensions in two coordinate axis directions and each of the diagonal dimensions being equal to a grid width; and a scan line processing step of calculating with respect to said given one scan line the intensity value to be given to each portion of each of the triangles in the scanning direction, based on the line intersection data calculated for said given one scan line by said edge calculating step, wherein said edge calculating step and said scan line processing step operate alternately during processing for said given one scan line, whereby a polygon is drawn.

29. A polygon drawing method according to claim 28, wherein the intensity value is determined by a ratio of an intensity value of a pixel that is to be drawn, to an intensity value of a pixel that is originally located at a position where the pixel to be drawn exists, and wherein when said control bit indicates that said each edge of each of the triangles is not to be drawn, the intensity value of the pixel to be drawn is set to 0.

30. A polygon drawing method according to claim 28, wherein the intensity value is determined by a ratio of an intensity value of a pixel that is to be drawn to an intensity value of a pixel that is originally located at a position where the pixel to be drawn exists, and wherein when said control bit indicates that the intensity processing is not to be performed on said each edge of each of the triangles, the intensity value of the pixel to be drawn is set to 1.

31. A polygon drawing method according to claim 28, wherein the intensity value is determined by a ratio of an intensity value of a pixel that is to be drawn, to an intensity value of a pixel that is originally located at a position where the pixel to be drawn exists, and wherein when said control bit indicates that each edge of the triangles is not to be drawn, the intensity value of the pixel to be drawn is set to 0.

32. A polygon drawing method according to claim 28, wherein the intensity value is determined by a ratio of an intensity value of a pixel that is to be drawn to an intensity value of a pixel that is originally located at a position where the pixel to be drawn exists, and wherein when said control bit indicates that the intensity processing is not to be performed on said each edge of each of the triangles, the intensity value of the pixel to be drawn is set to 1.

33. A storage medium that stores a program that enables implementation of a polygon drawing method of drawing a plurality of triangles so as to draw a polygon by combining the plurality of triangles and by performing intensity processing on a polygon to be drawn using an anti-aliasing method based on an intensity value generated by an intensity value generating module, said intensity value generating module comprising the modules of:

an inputting module of inputting a drawing command including vertex coordinates of each of the triangles to be drawn and a control bit which indicates whether each edge of each of the triangles is to be drawn;

an edge calculating module of calculating line intersection data relating to a position of an intersecting portion between said each edge of each of the triangles for a given one scan line, using the vertex coordinates of each of the triangles to be drawn and the control bit, and an intensity value of the intersecting portion, based on said control bit, wherein the line intersection data is determined based on trajectories obtained by dragging a diamond-like box between vertices of each of the triangles to be drawn, said diamond-like box having diagonal dimensions in two coordinate axis directions and each of the diagonal dimensions being equal to a grid width, wherein the line intersection data is determined based on trajectories obtained by dragging a diamond-like box between vertices of the polygon to be drawn, said diamond-like box having diagonal dimensions in two coordinate axis directions and each of the diagonal dimensions being equal to a grid width; and a scan line processing module of calculating with respect to said given one scan line the intensity value to be given to each portion of each of the triangles in the scanning direction, based on the line intersection data calculated for said given one scan line by said edge calculating module, wherein said edge calculating module and said scan line processing module operate alternately during processing for said given one scan line, whereby a polygon is drawn.

34. A storage medium that stores a program that enables implementation of a polygon drawing method of drawing a polygon by combining a plurality of triangles and by performing intensity processing on the plurality of triangles to be drawn using an anti-aliasing method based on an intensity value generated by an intensity value generating module, said intensity value generating module comprising the modules of:

an inputting module of inputting a drawing command including vertex coordinates of each of the triangles to be drawn and a control bit which indicates whether intensity processing is to be performed on each edge of each of the triangles;

an edge calculating module of calculating line intersection data relating to a position of an intersecting portion between said each edge of each of the triangles for a given one scan line, using the vertex coordinates of each of the triangles to be drawn and the control bit, and an intensity value of the intersecting portion, based on said control bit, wherein the line intersection data is determined based on trajectories obtained by dragging a diamond-like box between vertices of each of the triangles to be drawn, said diamond-like box having diagonal dimensions in two coordinate axis directions and each of the diagonal dimensions being equal to a grid width, wherein the line intersection data is determined based on trajectories obtained by dragging a diamond-like box between vertices of the polygon to be drawn, said diamond-like box having diagonal dimensions in two coordinate axis directions and each of the diagonal dimensions being equal to a grid width; and a scan line processing module of calculating with respect to said given one scan line the intensity value to be given to each portion of each of the triangles in the scanning direction, based on the line intersection data calculated for said given one scan line by said edge calculating module, wherein said edge calculating module and said scan line processing module operate alternately during processing for said given one scan line, whereby a polygon is drawn.

35. A storage medium that stores a program that enables implementation of a polygon drawing method of drawing a polygon by combining a plurality of triangles and by performing intensity processing on the plurality of triangles to be drawn using an anti-aliasing method based on an intensity value generated by an intensity value generating module, said intensity value generating module comprising the modules of:

an inputting module of inputting a drawing command including vertex coordinates of each of the triangles to be drawn and a first control bit which indicates whether each edge of each of the triangles is to be drawn, and a second control bit which indicates whether intensity processing is to be performed on each edge of each of the triangles;

an edge calculating module of calculating line intersection data relating to a position of an intersecting portion between said each edge of each of the triangles for a given one scan line, using the vertex coordinates of each of the triangles to be drawn and the control bit, and an intensity value of the intersecting portion, based on said control bit, wherein the line intersection data is determined based on trajectories obtained by dragging a diamond-like box between vertices of each of the triangles to be drawn, said diamond-like box having diagonal dimensions in two coordinate axis directions and each of the diagonal dimensions being equal to a grid width, wherein the line intersection data is determined based on trajectories obtained by dragging a diamond-like box between vertices of the polygon to be drawn, said diamond-like box having diagonal dimensions in two coordinate axis directions and each of the diagonal dimensions being equal to a grid width, and a scan line processing module of calculating with respect to said given one scan line the intensity value to be given to each portion of each of the triangles in the scanning direction, based on the line intersection data calculated for said given one scan line by said edge calculating module, wherein said edge calculating module and said scan line processing module operate alternately during processing for said given one scan line, whereby a polygon is drawn.

36. A polygon drawing apparatus which draws a polygon by performing intensity processing on a polygon to be drawn using an anti-aliasing method based on an intensity value generated by an intensity value generating device, said intensity value generating device comprising:

an edge calculating device which calculates line intersection data associated with an intersecting portion between each of edges of the polygon to be drawn, for a given one scan line, using the vertex coordinates of the polygon to be drawn, the line intersection data including a first pair of outside intersection and inside intersection that represent intersecting positions between said given one scan line and one of the edges that is located on an upstream side as viewed in a scanning direction, a second pair of outside intersection and inside intersection that represent intersection positions between said given one scan line and one of the edges that is located on a downstream side as viewed in the scanning direction, an increasing rate at which an intensity value increases from the outside intersection to the inside intersection of said first pair, and a decreasing rate at which the intensity value decreases from the inside intersection to the outside intersection of said second pair, wherein the line intersection data is determined based on trajectories obtained by dragging a diamond-like box between vertices of the polygon to be drawn, said diamond-like box having diagonal dimensions in two coordinate axis directions and each of the diagonal dimensions being equal to a grid width; and a scan line processing device which calculates with respect to said given one scan line the intensity value to be given to each portion of the polygon in the scanning direction, based on the line intersection data calculated for said given one scan line by said edge calculating device, said scan line processing device including means for maintaining the intensity value of said each portion inside the polygon constant while gradually changing the intensity value of said each portion along each edge of the polygon, wherein said edge calculating device and said scan line processing device operate alternately during processing for said given one scan line, whereby a polygon is drawn.

37. A polygon drawing apparatus according to claim 36, wherein said edge calculating device comprises:

means for calculating a first pair of positions on lattice points of displayed grid boxes that are located adjacent, respectively, to a pair of real intersections between said given one scan line and said one of said edges that is located on the upstream side as viewed in the scanning direction, on the downstream side as viewed in the scanning direction, to obtain said first pair of outside intersection and inside intersection;

means for calculating a second pair of positions on lattice points of the displayed grid boxes that are located adjacent, respectively, to a pair of real intersections between said given one scan line and said one of said edges that is located on the downstream side as viewed in the scanning direction, on the upstream side as viewed in the scanning direction, to obtain said second pair of outside intersection and inside intersection; and means for calculating a first initial value from the intensity value at the outside intersection of said first pair, and a second initial value from the intensity value at a lattice point of one of the displayed grid boxes that is located adjacent to the inside intersection of said second pair on the downstream side as viewed in the scanning direction.

38. A polygon drawing apparatus according to claim 37, wherein said scan line processing device comprises:

means for generating the intensity value to be given to each portion of the polygon along the scanning direction in a range from the outside intersection to the inside intersection of said first pair for said given one scan line, by progressively increasing the intensity value at said increasing rate in said range from the outside intersection to the inside intersection of said first pair for said given one scan line;

means for generating a constant intensity value to be given to each portion of said polygon along the scanning direction in a range from the inside intersection of said first pair to the inside intersection of said second pair for said given one scan line; and means for generating the intensity value to be given to each portion of the polygon along the scanning direction in a range from the inside intersection to the outside intersection of said second pair for said given one scan line, by progressively decreasing the intensity value at said decreasing rate in said range from the inside intersection to the outside intersection of said second pair for said given one scan line.

39. A polygon drawing apparatus according to claim 38, wherein said increasing rate is determined based on a slope of the edge on the upstream side as viewed in the scanning direction, and said decreasing rate is determined based on a slope of the edge on the downstream side as viewed in the scanning direction.

40. A polygon drawing apparatus according to claim 36, wherein said scan line processing device comprises:

means for generating the intensity value to be given to each portion of the polygon along the scanning direction in a range from the outside intersection to the inside intersection of said first pair for said given one scan line, by progressively increasing the intensity value at said increasing rate in said range from the outside intersection to the inside intersection of said first pair for said given one scan line;

means for generating a constant intensity value to be given to each portion of said polygon along the scanning direction in a range from the inside intersection of said first pair to the inside intersection of said second pair for said given one scan line; and means for generating the intensity value to be given to each portion of the polygon along the scanning direction in a range from the inside intersection to the outside intersection of said second pair for said given one scan line, by progressively decreasing the intensity value at said decreasing rate in said range from the inside intersection to the outside intersection of said second pair for said given one scan line.

41. A polygon drawing apparatus according to claim 40, wherein said increasing rate is determined based on a slope of the edge on the upstream side as viewed in the scanning direction, and said decreasing rate is determined based on a slope of the edge on the downstream side as viewed in the scanning direction.

42. A polygon drawing method of drawing a polygon by performing intensity processing on a polygon to be drawn using an anti-aliasing method based on an intensity value generated by an intensity value generating step, said intensity value generating step comprising:

an edge calculating step of calculating line intersection data associated with an intersecting portion between each of edges of the polygon to be drawn, for a given one scan line, using the vertex coordinates of the polygon to be drawn, said line intersection data including a first pair of outside intersection and inside intersection that represent intersecting positions between said given one scan line and one of the edges that is located on an upstream side as viewed in a scanning direction, a second pair of outside intersection and inside intersection that represent intersection positions between said given one scan line and one of the edges that is located on a downstream side as viewed in the scanning direction, an increasing rate at which an intensity value increases from the outside intersection to the inside intersection of said first pair, and a decreasing rate at which the intensity value decreases from the inside intersection to the outside intersection of said second pair, wherein the line intersection data is determined based on trajectories obtained by dragging a diamond-like box between vertices of the polygon to be drawn, said diamond-like box having diagonal dimensions in two coordinate axis directions and each of the diagonal dimensions being equal to a grid width; and a scan line processing step of sequentially calculating with respect to said given one scan line the intensity value to be given to each portion of the polygon in the scanning direction, based on the line intersection data calculated for said given one scan line by said edge calculating step, said edge calculating step including a step of maintaining the intensity value of said each portion inside the polygon constant while gradually changing the intensity value of said each portion along each edge of the polygon wherein said edge calculating step and said scan line processing step operate alternately during processing for said given one scan line, whereby a polygon is drawn.

43. A storage medium which stores a program that enables implementation of a method of drawing a polygon by performing intensity processing on a polygon to be drawn using an anti-aliasing method based on an intensity value generated by an intensity value generating module, said intensity value generating module comprising:

an edge calculating module of calculating line intersection data associated with an intersecting portion between each of edges of the polygon to be drawn, for a given one scan line, using the vertex coordinates of the polygon to be drawn, said line intersection data including a first pair of outside intersection and inside intersection that represent intersecting positions between said given one scan line and one of the edges that is located on an upstream side as viewed in a scanning direction, a second pair of outside intersection and inside intersection that represent intersection positions between said given one scan line and one of the edges that is located on a downstream side as viewed in the scanning direction, an increasing rate at which an intensity value increases from the outside intersection to the inside intersection of said first pair, and a decreasing rate at which the intensity value decreases from the inside intersection to the outside intersection of said second pair, wherein the line intersection data is determined based on trajectories obtained by dragging a diamond-like box between vertices of the polygon to be drawn, said diamond-like box having diagonal dimensions in two coordinate axis directions and each of the diagonal dimensions being equal to a grid width; and a scan line processing module of sequentially calculating with respect to said given one scan line the intensity value to be given to each portion of the polygon in the scanning direction, based on the line intersection data calculated for said given one scan line by said edge calculating module, said edge calculating step including a step of maintaining the intensity value of said each portion inside the polygon constant while gradually changing the intensity value of said each portion along each edge of the polygon wherein said edge calculating module and said scan line processing module operate alternately during processing for said given one scan line, whereby a polygon is drawn.

44. A polygon drawing apparatus which draws a polygon by drawing a polygon by performing intensity processing on a polygon to be drawn using an anti-aliasing method based on an intensity value generated by an intensity value generating device, said intensity value generating device comprising:

an edge calculating device which calculates line intersection data associated with an intersecting portion between each of edges of the polygon to be drawn, for a given one scan line, using the vertex coordinates of the polygon to be drawn, said line intersection data including a first pair of outside intersection and inside intersection that represent intersecting positions between said given one scan line and one of the edges that is located on an upstream side as viewed in a scanning direction, a second pair of outside intersection and inside intersection that represent intersection positions between said given one scan line and one of the edges that is located on a downstream side as viewed in the scanning direction, an increasing rate at which an intensity value increases from the outside intersection to the inside intersection of said first pair, and a decreasing rate at which the intensity value decreases from the inside intersection to the outside intersection of said second pair, wherein the line intersection data is determined based on trajectories obtained by dragging a diamond-like box between vertices of the polygon to be drawn, said diamond-like box having diagonal dimensions in two coordinate axis directions and each of the diagonal dimensions being equal to a grid width; and a scan line processing device which calculates with respect to said given one scan line the intensity value to be given to each portion of the polygon in the scanning direction, based on the line intersection data calculated for said given one scan line by said edge calculating device, by performing first processing for calculating changes in the intensity value from the outside intersection to the inside intersection of said first pair for each scan line, second processing for calculating changes in the intensity value from the inside intersection to the outside intersection of said second pair for each scan line, and third processing for combining results obtained in said first processing and said second processing, said first processing, said second processing and said third processing being performed in parallel with each other, said scan line processing device including means for maintaining the intensity value of said each portion inside the polygon constant while gradually changing the intensity value of said each portion along each edge of the polygon, wherein said edge calculating device and said scan line processing device operate alternately during processing for said given one scan line, whereby a polygon is drawn.

45. A polygon drawing apparatus according to claim 44, wherein said edge calculating device comprises:

means for calculating a first pair of positions on lattice points of displayed grid boxes that are located adjacent, respectively, to a pair of real intersections between said given one scan line and said one of said edges that is located on the upstream side as viewed in the scanning direction, on the downstream side as viewed in the scanning direction, to obtain said first pair of outside intersection and inside intersection;

means for calculating a second pair of positions on lattice points of the displayed grid boxes that are located adjacent, respectively, to a pair of real intersections between said given one scan line and said one of said edges that is located on the downstream side as viewed in the scanning direction, to obtain said second pair of outside intersection and inside intersection; and means for calculating a first initial value from the intensity value at the outside intersection of said first pair, and a second initial value from the intensity value at a lattice point of one of displayed grid boxes that is located adjacent to the inside intersection of said second pair on the downstream side as viewed in the scanning direction.

46. A polygon drawing apparatus according to claim 45, wherein said scan processing device comprises:

means for performing said first processing by generating the intensity value by progressively increasing the intensity value at said increasing rate in a range from the outside intersection to the inside intersection of said first pair for said given one scan line and generating a constant intensity value in a range following the inside intersection of said first pair;

means for performing said second processing by generating the intensity value by progressively decreasing the intensity value at an absolute value of said decreasing rate in a range from the inside intersection to the outside intersection of said second pair for said given one scan line and generating said constant intensity value in a range following the outside intersection of said second pair; and means for performing said third processing by subtracting a result of said second processing from a result of said first processing.

47. A polygon drawing apparatus according to claim 45, wherein when a vertex other than vertices at upper and lower ends of the polygon is located between two adjacent scan lines, said scan processing device separately performs processing based on a first distance from the upper one of the two adjacent scan lines to said vertex, and performs processing based on a second distance from the lower one of the two adjacent scan lines to said vertex, and calculates the intensity value by combining results of said processing based on said first distance and said processing based on said second distance.

48. A polygon drawing apparatus according to claim 46, wherein said increasing rate is determined based on a slope of the edge on the upstream side as viewed in the scanning direction, and said decreasing rate is determined based on a slope of the edge on the downstream side as viewed in the scanning direction.

49. A polygon drawing apparatus according to claim 46, wherein when a vertex of the polygon is located between two adjacent scan lines, said scan processing device sets said constant intensity value to a value that depends upon a distance from one of the two adjacent scan lines to said vertex.

50. A polygon drawing apparatus according to claim 44, wherein said scan processing device comprises:

means for performing said first processing by generating the intensity value by progressively increasing the intensity value at said increasing rate in a range from the outside intersection to the inside intersection of said first pair for said given one scan line and generating a constant intensity value in a range following the inside intersection of said first pair;

means for performing said second processing by generating the intensity value by progressively decreasing the intensity value at an absolute value of said decreasing rate in a range from the inside intersection to the outside intersection of said second pair for said given one scan line and generating said constant intensity value in a range following the outside intersection of said second pair; and means for performing said third processing by subtracting a result of said second processing from a result of said first processing.

51. A polygon drawing apparatus according to claim 50, wherein said increasing rate is determined based on a slope of the edge on the upstream side as viewed in the scanning direction, and said decreasing rate is determined based on a slope of the edge on the downstream side as viewed in the scanning direction.

52. A polygon drawing apparatus according to claim 50, wherein when a vertex of the polygon is located between two adjacent scan lines, said scan processing device sets said constant intensity value to a value that depends upon a distance from one of the two adjacent scan lines to said vertex.

53. A polygon drawing apparatus according to claim 44, wherein when a vertex other than vertices at upper and lower ends of the polygon is located between two adjacent scan lines, said scan processing device separately performs processing based on a first distance from the upper one of the two adjacent scan lines to said vertex, and performs processing based on a second distance from the lower one of the two adjacent scan lines to said vertex, and calculates the intensity value by combining results of said processing based on said first distance and said processing based on said second distance.

54. A polygon drawing method of drawing a polygon by performing intensity processing on a polygon to be drawn using an anti-aliasing method based on an intensity value generated by an intensity value generating step, said intensity value generating step comprising:

an edge calculating step of calculating line intersection data associated with an intersecting portion between each of edges of the polygon to be drawn, for a given one scan line, using the vertex coordinates of the polygon to be drawn, said line intersection data including a first pair of outside intersection and inside intersection that represent intersecting positions between said given one scan line and one of the edges that is located on an upstream side as viewed in a scanning direction, a second pair of outside intersection and inside intersection that represent intersection positions between said given one scan line and one of the edges that is located on a downstream side as viewed in the scanning direction, an increasing rate at which an intensity value increases from the outside intersection to the inside intersection of said first pair, and a decreasing rate at which the intensity value decreases from the inside intersection to the outside intersection of said second pair, wherein the line intersection data is determined based on trajectories obtained by dragging a diamond-like box between vertices of the polygon to be drawn, said diamond-like box having diagonal dimensions in two coordinate axis directions and each of the diagonal dimensions being equal to a grid width; and a scan line processing step of calculating with respect to said given one scan line the intensity value to be given to each portion of the polygon in the scanning direction, based on the line intersection data calculated for said given one scan line by said edge calculating step, by performing first processing for calculating changes in the intensity value from the outside intersection to the inside intersection of said first pair for each scan line; second processing for calculating changes in the intensity value from the inside intersection to the outside intersection of said second pair for each scan line, and third processing for combining results obtained in said first processing and said second processing, said first processing, said second processing and said third processing being performed in parallel with each other, said edge calculating step including a step of maintaining the intensity value of said each portion inside the polygon constant while gradually changing the intensity value of said each portion along each edge of the polygon, wherein said edge calculating step and said scan line processing step operate alternately during processing for said given one scan line, whereby a polygon is drawn.

55. A storage medium which stores a program that enables implementation of a method of drawing a polygon by performing intensity processing on a polygon to be drawn using an anti-aliasing method based on an intensity value generated by an intensity value generating module, said intensity value generating module comprising:

an edge calculating module of calculating line intersection data associated with an intersecting portion between each of edges of the polygon to be drawn, for a given one scan line, using the vertex coordinates of the polygon to be drawn, said line intersection data including a first pair of outside intersection and inside intersection that represent intersecting positions between said given one scan line and one of the edges that is located on an upstream side as viewed in a scanning direction, a second pair of outside intersection and inside intersection that represent intersection positions between said given one scan line and one of the edges that is located on a downstream side as viewed in the scanning direction, an increasing rate at which an intensity value increases from the outside intersection to the inside intersection of said first pair, and a decreasing rate at which the intensity value decreases from the inside intersection to the outside intersection of said second pair, wherein the line intersection data is determined based on trajectories obtained by dragging a diamond-like box between vertices of the polygon to be drawn, said diamond-like box having diagonal dimensions in two coordinate axis directions and each of the diagonal dimensions being equal to a grid width; and a scan line processing module of calculating with respect to said given one scan line the intensity value to be given to each portion of the polygon in the scanning direction, based on the line intersection data calculated for said given one scan line by said edge calculating module, by performing first processing for calculating changes in the intensity value from the outside intersection to the inside intersection of said first pair for each scan line, second processing for calculating changes in the intensity value from the inside intersection to the outside intersection of said second pair for each scan line, and third processing for combining results obtained in said first processing and said second processing, said first processing, said second processing and said third processing being performed in parallel with each other, said edge calculating module including a module of maintaining the intensity value of said each portion inside the polygon constant while gradually changing the intensity value of said each portion along each edge of the polygon, wherein said edge calculating module and said scan line processing module operate alternately during processing for said given one scan line, whereby a polygon is drawn.

56. A polygon drawing apparatus which draws a polygon by combining a plurality of triangles and by performing intensity processing on a polygon to be drawn using an anti-aliasing method based on an intensity value generated by an intensity value generating device, said intensity value generating device comprising:

an edge calculating device which receives a drawing command including vertex coordinates of each of the triangles to be drawn and a control bit which indicates whether each edge of each of the triangles is to be drawn, and calculates line intersection data relating to a position of an intersecting portion between said each edge of each of the triangles for a given one scan line, using the vertex coordinates of each of the triangles to be drawn and the control bit, and an intensity value of the intersecting portion, based on said control bit, wherein the line intersection data is determined based on trajectories obtained by dragging a diamond-like box between vertices of each of the triangles to be drawn, said diamond-like box having diagonal dimensions in two coordinate axis directions and each of the diagonal dimensions being equal to a grid width; and a scan line processing device which calculates with respect to said given one scan line the intensity value to be given to each portion of the each of the triangles in the scanning direction, based on the line intersection data calculated for said given one scan line by said edge calculating device, said scan line processing device including means for maintaining the intensity value of said each portion inside each of the triangles constant while gradually changing the intensity value of said each portion along each edge of each of the triangles, wherein said edge calculating device and said scan line processing device operate alternately during processing for said given one scan line, whereby a polygon is drawn.

57. A polygon drawing apparatus which draws a polygon by combining a plurality of triangles and by performing intensity processing on the plurality of triangles to be drawn using an anti-aliasing method based on an intensity value generated by an intensity value generating device, said intensity value generating device comprising:

an edge calculating device which receives a drawing command including vertex coordinates of each of the triangles to be drawn and a control bit which indicates whether intensity processing is to be performed on each edge of each of the triangles, and calculates line intersection data associated with an intersecting portion between each edge of each of the triangles to be drawn for a given one scan line, using the vertex coordinates of each of the triangles to be drawn and the control bit, said line intersection data including a first pair of outside intersection and inside intersection that represent intersecting positions between said given one scan line and one of the edges that is located on an upstream side as viewed in a scanning direction, a second pair of outside intersection and inside intersection that represent intersection positions between said given one scan line and one of the edges that is located on a downstream side as viewed in the scanning direction, an increasing rate at which an intensity value increases from the outside intersection to the inside intersection of said first pair, a decreasing rate at which the intensity value decreases from the inside intersection to the outside intersection of said second pair, and an intensity value that is set to 1 when said control bit indicates that no intensity processing is to be performed on said each edge of each of the triangle, wherein the line intersection data is determined based on trajectories obtained by dragging a diamond-like box between vertices of each of the triangles to be drawn, said diamond-like box having diagonal dimensions in two coordinate axis directions and each of the diagonal dimensions being equal to a grid width; and a scan line processing device which calculates with respect to said given one scan line the intensity value to be given to each portion of the each of the triangles in the scanning direction, based on the line intersection data calculated for said given one scan line by said edge calculating device, said scan line processing device including means for maintaining the intensity value of said each portion inside each of the triangles constant while gradually changing the intensity value of said each portion along each edge of each of the triangles, wherein said edge calculating device and said scan line processing device operate alternately during processing for said given one scan line, whereby a polygon is drawn.

58. A polygon drawing apparatus which draws a polygon by combining a plurality of triangles and by performing intensity processing on the plurality of triangles to be drawn using an anti-aliasing method based on an intensity value generated by an intensity value generating device, said intensity value generating device comprising:

an edge calculating device which receives a drawing command including vertex coordinates of each of the triangles to be drawn and a first control bit which indicates whether each edge of each of the triangles is to be drawn, and a second control bit which indicates whether intensity processing is to be performed on each edge of each of the triangles, and calculates line intersection data associated with an intersecting portion between each edge of each of the triangles to be drawn for a given one scan line, using the vertex coordinates of each of the triangles to be drawn and the first and second control bits, said line intersection data including a first pair of outside intersection and inside intersection that represent intersecting positions between said given one scan line and one of the edges that is located on an upstream side as viewed in a scanning direction, a second pair of outside intersection and inside intersection that represent intersection positions between said given one scan line and one of the edges that is located on a downstream side as viewed in the scanning direction, an increasing rate at which an intensity value increases from the outside intersection to the inside intersection of said first pair, a decreasing rate at which the intensity value decreases from the inside intersection to the outside intersection of said second pair, and an intensity value that is set to 0 when said first control bit indicates that said each edge of each of the triangles is not to be drawn, said intensity value being set to 1 when said second control bit indicates that the intensity processing is not to be performed on said each edge of each of the triangles, wherein the line intersection data is determined based on trajectories obtained by dragging a diamond-like box between vertices of each of the triangles to be drawn, said diamond-like box having diagonal dimensions in two coordinate axis directions and each of the diagonal dimensions being equal to a grid width; and a scan line processing device which calculates with respect to said given one scan line the intensity value to be given to each portion of each of the triangles in the scanning direction, based on the line intersection data calculated for said given one scan line by said edge calculating device, said scan line processing device including means for maintaining the intensity value of said each portion inside each of the triangles constant while gradually changing the intensity value of said each portion along each edge of each of the triangles, wherein said edge calculating device and said scan line processing device operate alternately during processing for said given one scan line, whereby a polygon is drawn.

59. A polygon drawing method of drawing a plurality of triangles so as to draw a polygon by combining the plurality of triangles and by performing intensity processing on a polygon to be drawn using an anti-aliasing method based on an intensity value generated by an intensity value generating step, said intensity value generating step comprising the steps of:

inputting a drawing command including vertex coordinates of each of the triangles to be drawn and a control bit which indicates whether each edge of each of the triangles is to be drawn;

an edge calculating step of calculating line intersection data relating to a position of an intersecting portion between said each edge of each of the triangles for a given one scan line, using the vertex coordinates of each of the triangles to be drawn and the control bit, and an intensity value of the intersecting portion, based on said control bit, wherein the line intersection data is determined based on trajectories obtained by dragging a diamond-like box between vertices of each of the triangles to be drawn, said diamond-like box having diagonal dimensions in two coordinate axis directions and each of the diagonal dimensions being equal to a grid width, wherein the line intersection data is determined based on trajectories obtained by dragging a diamond-like box between vertices of the polygon to be drawn, said diamond-like box having diagonal dimensions in two coordinate axis directions and each of the diagonal dimensions being equal to a grid width:

a scan line processing step of calculating with respect to said given one scan line the intensity value to be given to each portion of each of the triangles in the scanning direction, based on the line intersection data calculated for said given one scan line by said edge calculating step; and maintaining the intensity value of said each portion inside each of the triangles constant while gradually changing the intensity value of said each portion along each edge of each of the triangles, wherein said edge calculating step and said scan line processing step operate alternately during processing for said given one scan line, whereby a polygon is drawn.

60. A polygon drawing method according to claim 59, wherein the intensity value is determined by a ratio of an intensity value of a pixel that is to be drawn, to an intensity value of a pixel that is originally located at a position where the pixel to be drawn exists, and wherein when said control bit indicates that said each edge of each of the triangles is not to be drawn, the intensity value of the pixel to be drawn is set to 0.

61. A polygon drawing method of drawing a polygon by combining a plurality of triangles and by performing intensity processing on the plurality of triangles to be drawn using an anti-aliasing method based on an intensity value generated by an intensity value generating step, said intensity value generating step comprising the steps of:

inputting a drawing command including vertex coordinates of each of the triangles to be drawn and a control bit which indicates whether intensity processing is to be performed on each edge of each of the triangles;

an edge calculating step of calculating line intersection data relating to a position of an intersecting portion between said each edge of each of the triangles for a given one scan line, using the vertex coordinates of each of the triangles to be drawn and the control bit, and an intensity value of the intersecting portion, based on said control bit, wherein the line intersection data is determined based on trajectories obtained by dragging a diamond-like box between vertices of each of the triangles to be drawn, said diamond-like box having diagonal dimensions in two coordinate axis directions and each of the diagonal dimensions being equal to a grid width, wherein the line intersection data is determined based on trajectories obtained by dragging a diamond-like box between vertices of the polygon to be drawn, said diamond-like box having diagonal dimensions in two coordinate axis directions and each of the diagonal dimensions being equal to a grid width;

a scan line processing step of calculating with respect to said given one scan line the intensity value to be given to each portion of each of the triangles in the scanning direction, based on the line intersection data calculated for said given one scan line by said edge calculating step; and maintaining the intensity value of said each portion inside each of the triangles constant while gradually changing the intensity value of said each portion along each edge of each of the triangles, wherein said edge calculating step and said scan line processing step operate alternately during processing for said given one scan line, whereby a polygon is drawn.

62. A polygon drawing method according to claim 61, wherein the intensity value is determined by a ratio of an intensity value of a pixel that is to be drawn to an intensity value of a pixel that is originally located at a position where the pixel to be drawn exists, and wherein when said control bit indicates that the intensity processing is not to be performed on said each edge of each of the triangles, the intensity value of the pixel to be drawn is set to 1.

63. A polygon drawing method of drawing a polygon by combining a plurality of triangles and by performing intensity processing on the plurality of triangles to be drawn using an anti-aliasing method based on an intensity value generated by an intensity value generating step, said intensity value generating step comprising the steps of:

inputting a drawing command including vertex coordinates of each of the triangles to be drawn and a first control bit which indicates whether each edge of each of the triangles is to be drawn, and a second control bit which indicates whether intensity processing is to be performed on each edge of each of the triangles;

an edge calculating step of calculating line intersection data relating to a position of an intersecting portion between said each edge of each of the triangles for a given one scan line, using the vertex coordinates of each of the triangles to be drawn and the control bit, and an intensity value of the intersecting portion, based on said control bit, wherein the line intersection data is determined based on trajectories obtained by dragging a diamond-like box between vertices of each of the triangles to be drawn, said diamond-like box having diagonal dimensions in two coordinate axis directions and each of the diagonal dimensions being equal to a grid width, wherein the line intersection data is determined based on trajectories obtained by dragging a diamond-like box between vertices of the polygon to be drawn, said diamond-like box having diagonal dimensions in two coordinate axis directions and each of the diagonal dimensions being equal to a grid width:

a scan line processing step of calculating with respect to said given one scan line the intensity value to be given to each portion of each of the triangles in the scanning direction, based on the line intersection data calculated for said given one scan line by said edge calculating step; and maintaining the intensity value of said each portion inside each of the triangles constant while gradually changing the intensity value of said each portion along each edge of each of the triangles, wherein said edge calculating step and said scan line processing step operate alternately during processing for said given one scan line, whereby a polygon is drawn.

64. A polygon drawing method according to claim 63, wherein the intensity value is determined by a ratio of an intensity value of a pixel that is to be drawn, to an intensity value of a pixel that is originally located at a position where the pixel to be drawn exists, and wherein when said control bit indicates that said each edge of each of the triangles is not to be drawn, the intensity value of the pixel to be drawn is set to 0.

65. A polygon drawing method according to claim 63, wherein the intensity value is determined by a ratio of an intensity value of a pixel that is to be drawn to an intensity value of a pixel that is originally located at a position where the pixel to be drawn exists, and wherein when said control bit indicates that the intensity processing is not to be performed on said each edge of each of the triangles, the intensity value of the pixel to be drawn is set to 1.

66. A polygon drawing method according to claim 63, wherein the intensity value is determined by a ratio of an intensity value of a pixel that is to be drawn, to an intensity value of a pixel that is originally located at a position where the pixel to be drawn exists, and wherein when said control bit indicates that each edge of the triangles is not to be drawn, the intensity value of the pixel to be drawn is set to 0.

67. A polygon drawing method according to claim 63, wherein the intensity value is determined by a ratio of an intensity value of a pixel that is to be drawn to an intensity value of a pixel that is originally located at a position where the pixel to be drawn exists, and wherein when said control bit indicates that the intensity processing is not to be performed on said each edge of each of the triangles, the intensity value of the pixel to be drawn is set to 1.

68. A storage medium that stores a program that enables implementation of a polygon drawing method of drawing a plurality of triangles so as to draw a polygon by combining the plurality of triangles and by performing intensity processing on a polygon to be drawn using an anti-aliasing method based on an intensity value generated by an intensity value generating module, said intensity value generating module comprising the modules of:

an inputting module of inputting a drawing command including vertex coordinates of each of the triangles to be drawn and a control bit which indicates whether each edge of each of the triangles is to be drawn;

an edge calculating module of calculating line intersection data relating to a position of an intersecting portion between said each edge of each of the triangles for a given one scan line, using the vertex coordinates of each of the triangles to be drawn and the control bit, and an intensity value of the intersecting portion, based on said control bit, wherein the line intersection data is determined based on trajectories obtained by dragging a diamond-like box between vertices of each of the triangles to be drawn, said diamond-like box having diagonal dimensions in two coordinate axis directions and each of the diagonal dimensions being equal to a grid width, wherein the line intersection data is determined based on trajectories obtained by dragging a diamond-like box between vertices of the polygon to be drawn, said diamond-like box having diagonal dimensions in two coordinate axis directions and each of the diagonal dimensions being equal to a grid width;

a scan line processing module of calculating with respect to said given one scan line the intensity value to be given to each portion of each of the triangles in the scanning direction, based on the line intersection data calculated for said given one scan line by said edge calculating module; and a maintaining module of maintaining the intensity value of said each portion inside each of the triangles constant while gradually changing the intensity value of said each portion along each edge of each of the triangles, wherein said edge calculating module and said scan line processing module operate alternately during processing for said given one scan line, whereby a polygon is drawn.

69. A storage medium that stores a program that enables implementation of a polygon drawing method of drawing a polygon by combining a plurality of triangles and by performing intensity processing on the plurality of triangles to be drawn using an anti-aliasing method based on an intensity value generated by an intensity value generating module, said intensity value generating module comprising the modules of:

an inputting module of inputting a drawing command including vertex coordinates of each of the triangles to be drawn and a control bit which indicates whether intensity processing is to be performed on each edge of each of the triangles;

an edge calculating module of calculating line intersection data relating to a position of an intersecting portion between said each edge of each of the triangles for a given one scan line, using the vertex coordinates of each of the triangles to be drawn and the control bit, and an intensity value of the intersecting portion, based on said control bit, wherein the line intersection data is determined based on trajectories obtained by dragging a diamond-like box between vertices of each of the triangles to be drawn, said diamond-like box having diagonal dimensions in two coordinate axis directions and each of the diagonal dimensions being equal to a grid width, wherein the line intersection data is determined based on trajectories obtained by dragging a diamond-like box between vertices of the polygon to be drawn, said diamond-like box having diagonal dimensions in two coordinate axis directions and each of the diagonal dimensions being equal to a grid width;

a scan line processing module of calculating with respect to said given one scan line the intensity value to be given to each portion of each of the triangles in the scanning direction, based on the line intersection data calculated for said given one scan line by said edge calculating module; and a maintaining module of maintaining the intensity value of said each portion inside each of the triangles constant while gradually changing the intensity value of said each portion along each edge of each of the triangles, wherein said edge calculating module and said scan line processing module operate alternately during processing for said given one scan line, whereby a polygon is drawn.

70. A storage medium that stores a program that enables implementation of a polygon drawing method of drawing a polygon by combining a plurality of triangles and by performing intensity processing on the plurality of triangles to be drawn using an anti-aliasing method based on an intensity value generated by an intensity value generating module, said intensity value generating module comprising the modules of:

an inputting module of inputting a drawing command including vertex coordinates of each of the triangles to be drawn and a first control bit which indicates whether each edge of each of the triangles is to be drawn, and a second control bit which indicates whether intensity processing is to be performed on each edge of each of the triangles;

an edge calculating module of calculating line intersection data relating to a position of an intersecting portion between said each edge of each of the triangles for a given one scan line, using the vertex coordinates of each of the triangles to be drawn and the control bit, and an intensity value of the intersecting portion, based on said control bit, wherein the line intersection data is determined based on trajectories obtained by dragging a diamond-like box between vertices of each of the triangles to be drawn, said diamond-like box having diagonal dimensions in two coordinate axis directions and each of the diagonal dimensions being equal to a grid width, wherein the line intersection data is determined based on trajectories obtained by dragging a diamond-like box between vertices of the polygon to be drawn, said diamond-like box having diagonal dimensions in two coordinate axis directions and each of the diagonal dimensions being equal to a grid width;

a scan line processing module of calculating with respect to said given one scan line the intensity value to be given to each portion of each of the triangles in the scanning direction, based on the line intersection data calculated for said given one scan line by said edge calculating module; and a maintaining module of maintaining the intensity value of said each portion inside each of the triangles constant while gradually changing the intensity value of said each portion along each edge of each of the triangles, wherein said edge calculating module and said scan line processing module operate alternately during processing for said given one scan line, whereby a polygon is drawn.

* * * * *